United States Patent
Ives-Halperin et al.

(10) Patent No.: US 9,729,641 B2
(45) Date of Patent: Aug. 8, 2017

(54) EVENT SATURATION NETWORKING

(71) Applicant: Live Nation Entertainment, Inc, Beverly Hills, CA (US)

(72) Inventors: Kenneth Ives-Halperin, Los Angeles, CA (US); Jeffrey Kelsey, West Hollywood, CA (US); Jon Flanders, Monterey Park, CA (US); Yen Hoang, Los Angeles, CA (US)

(73) Assignee: Live Nation Entertainment, Inc., Beverly Hills, CA (US)

( * ) Notice: Subject to any disclaimer, the term of this patent is extended or adjusted under 35 U.S.C. 154(b) by 0 days.

(21) Appl. No.: 15/229,259

(22) Filed: Aug. 5, 2016

(65) Prior Publication Data
US 2017/0041401 A1 Feb. 9, 2017

Related U.S. Application Data

(60) Provisional application No. 62/201,365, filed on Aug. 5, 2015.

(51) Int. Cl.
| G06F 15/16 | (2006.01) |
| H04L 29/08 | (2006.01) |
| H04W 84/22 | (2009.01) |
| H04L 12/781 | (2013.01) |

(52) U.S. Cl.
CPC .............. H04L 67/14 (2013.01); H04L 45/52 (2013.01); H04L 67/28 (2013.01); H04W 84/22 (2013.01)

(58) Field of Classification Search
CPC ......... H04L 67/14; H04L 67/28; H04W 84/22
See application file for complete search history.

(56) References Cited

U.S. PATENT DOCUMENTS

| 2012/0045994 A1* | 2/2012 | Koh .................... H04L 63/0492 455/41.3 |
| 2013/0077527 A1* | 3/2013 | Walley ................ H04W 76/023 370/254 |
| 2013/0266007 A1 | 10/2013 | Pandey et al. |
| 2014/0025833 A1 | 1/2014 | Kiessling |
| 2014/0056176 A1 | 2/2014 | Ramesh et al. |
| 2014/0250204 A1* | 9/2014 | Shalunov ................ H04L 67/02 709/217 |
| 2015/0074287 A1 | 3/2015 | Wang et al. |

OTHER PUBLICATIONS

PCT/US2016/045778, "International Search Report and Written Opinion", Oct. 13, 2016, 14 pages.

\* cited by examiner

*Primary Examiner* — Viet Vu
(74) *Attorney, Agent, or Firm* — Kilpatrick Townsend & Stockton LLP

(57) ABSTRACT

Systems and methods for selecting tiering protocols based on data transmissions over mesh networks within defined spatial areas can be provided. A mesh network can be established within a defined spatial area. Each network device within the mesh network can be a user device or a supernode. Further, a wireless communication link can be established between the user devices and supernodes. A plurality of tiered protocols for tiering data transmissions can be accessed. Data to be transmitted over the mesh network can be analyzed to determine which tiered protocol to select. Path data that identifies a routing path from the a user device to a supernode can be generated, and the data can be transmitted according to the path data.

17 Claims, 20 Drawing Sheets

EVENT SATURATION NETWORKING

CROSS REFERENCE TO RELATED APPLICATIONS

The present application claims the benefit of U.S. Provisional Application No. 62/201,365, filed on Aug. 5, 2015, the disclosure of which is hereby incorporated by reference in its entirety for all purposes.

TECHNICAL FIELD

The present disclosure relates in general to methods and systems for improving connectivity of saturated networks. More specifically, the present disclosure relates to methods and systems for improving connectivity using cloud-based, decentralized mesh networks of user devices.

BACKGROUND

When a large number of user devices connect to a network, significant issues with network connectivity may arise. For example, the network can quickly become saturated, resulting in unreliable data throughput. Further, when the network becomes saturated, no data can be transmitted through the network, regardless of the data type.

SUMMARY

In some embodiments, a computer-implemented method for selecting tiered protocols based on data transmitted over mesh networks within defined spatial areas is provided. A network initiation request can be broadcasted at a first user device. For example, the network initiation request can facilitate establishment of a mesh network within a defined spatial area. In response to the broadcasting, a first acknowledgment message from a first network device and a second acknowledgment message from a second network device can be received at the first user device. The first acknowledgment message can indicate that the first network device is located within a defined proximity from the first user device. The second acknowledgment message can indicate that the second network device is located within the defined proximity from the first user device. Further, a first communication link between the first user device and the first network device can be established. A second communication link between the first user device and the second network device can also be established. The first user device can be configured to relay data transmissions over the mesh network using the first communication link and/or the second communication link. A plurality of tiered protocols can be accessed. In some instances, each tiered protocol of the plurality of tiered protocols can define one or more characteristics for transmitting generated data over the mesh network. First data based on a user input received at the first user device can be generated. The first data can be analyzed using one or more defined parameters. For example, each defined parameter of the one or more defined parameters can include at least one rule for classifying the first data into a data type. Further, the analysis of the first data may include identifying the data type of the first data. A tiered protocol can be selected from amongst the plurality of tiered protocols. The selection of the tiered protocol can be based on a result of identifying the data type of the first data. The selected tiered protocol can correspond to the identified data type of the first data. In response to selecting the tiered protocol, the one or more characteristics associated with the selected tiered protocol can be determined. The first data can be transmitted over the mesh network. The first data can be transmitted in accordance with the determined one or more characteristics.

In some embodiments, a system for selecting tiered protocols based on data transmitted over mesh networks within defined spatial areas is provided. The system can include one or more data processors, and a non-transitory computer-readable storage medium containing instructions which, when executed on the one or more data processors, cause the one or more data processors to perform one or more actions of one or more methods disclosed herein.

In some embodiments, a computer-program product tangibly embodied in a non-transitory machine-readable storage medium is provided. The computer-program product includes instructions configured to cause one or more data processors to perform actions of one or more methods disclosed herein.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
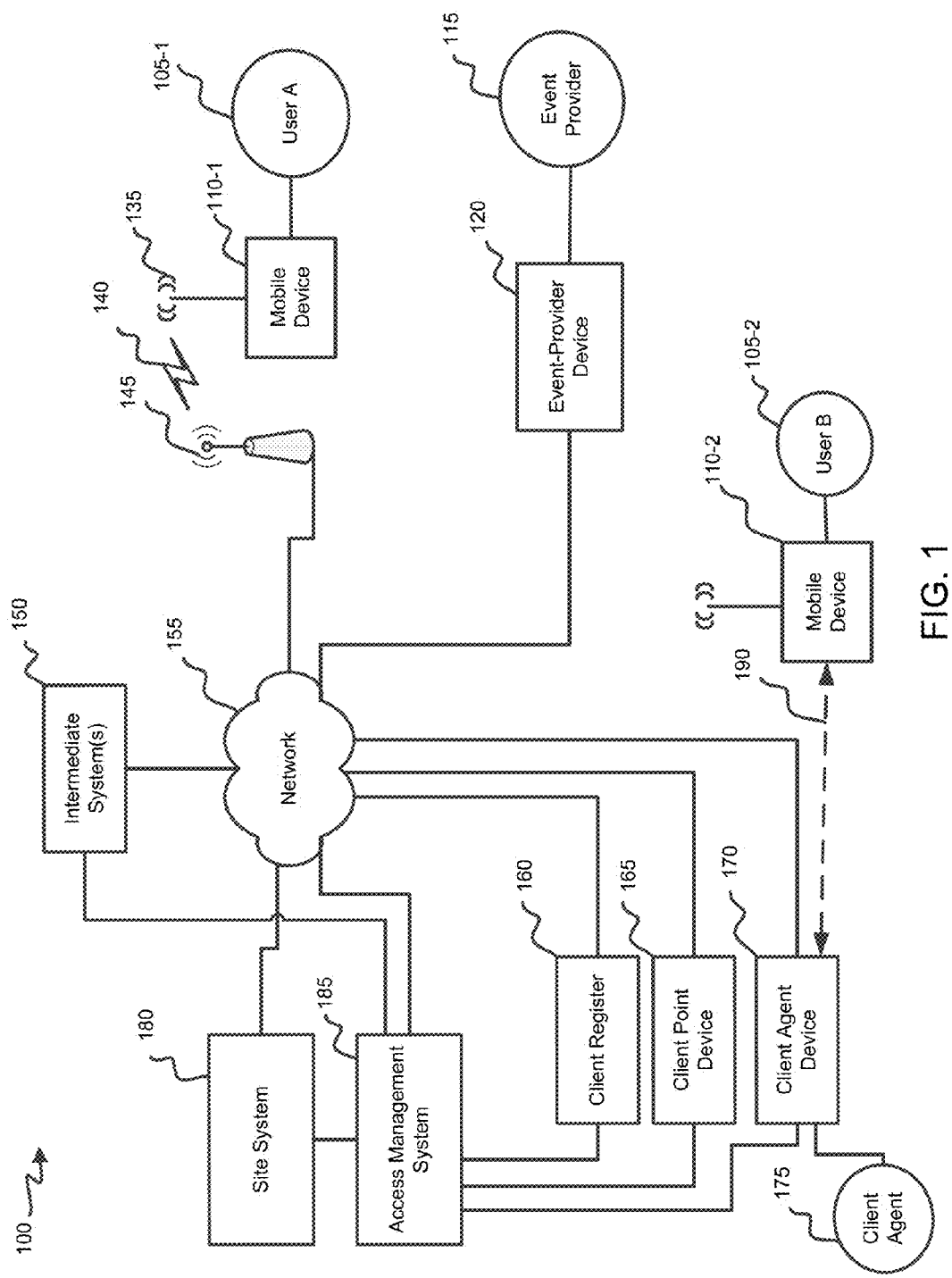
FIG. 1 depicts a block diagram of an embodiment of a resource access-facilitating interaction system.

FIG. 1 depicts a block diagram of an embodiment of a resource management system 100, according to an embodiment of the present disclosure. Mobile device 110 (which can be operated by a user 105) and an event-provider device 120 (which can be operated, controlled, or used by an event provider 115) can communicate with an access management system 185 directly or via another system (e.g., via an intermediate system 150). Mobile device 110 may transmit data to access point 145, which is connected to network 155, over communication channel 140 using antennae 135. While FIG. 1 illustrates mobile device 110 communicating with access point 145 using a wireless connection (e.g., communication channel 140), in some embodiments, mobile device 110 may also communicate with access point 145 using a wired connection (e.g., an Ethernet connection). Mobile device 110 can also communicate with one or more client devices, such as a client agent device 170 operated by a client agent 175, a client register 160 or a client point device 165 using a wired or wireless connection. In addition, using the access management system 185, an event provider 115 can identify an event, a parameter of attending the event, a date or dates of the event, a location or locations of the event, etc. Each inter-system communication can occur over one or more networks 155 and can facilitate transmission of a variety of types of data. It will be understood that, although only one of various systems, devices, entities and network are shown, the resource management system 100 can be extended to include multiple of any given system(s), device(s), entity(ies), and/or networks.

Access management system 185 can be configured to manage a dynamic set of access rights to one or more resources. More specifically, access management system 185 can track which resources are to be made available to users, specifications of the resources and times at which they will be available. Access management system 185 can also allocate access rights for resources and facilitate transmissions of notifications of the available rights to a set of user devices. For example, access management system 185 can alert users of the availability via a website, app page or email. As another example, access management system can transmit data about access rights and resources to one or more intermediate systems 150, which can facilitate distribution of access-right availability and processing of requests for such rights.

In some instances, access management system 185 can facilitate the establishment of a mesh network within a defined spatial area. For example, the mesh network can include a plurality of network devices that are located within the defined spatial area. Wireless communication channels or links can be established between the network devices such that a mesh network is established. Accordingly, if a public Wi-Fi access point within the defined spatial area becomes saturated, then the mesh network can facilitate data transmissions between the network devices. In this case, the more network devices within the defined spatial area, the stronger the mesh network becomes. A network device can be a user device or a supernode. Further, a supernode can be connected to the Internet (e.g., an Internet-facing proxy server) and the user devices can communicate with the Internet using the supernodes. In some instances, access management system 185 can perform processes 1400 through 1800 described below.

Notifications of available access rights can be accompanied by options to request that one or more access rights be assigned to a user. Therefore, user 105 can provide input to mobile device 110 via an interface to request such assignment and provide other pertinent information. Intermediate system 150 and/or access management system 185 can process the request to ensure that the requested access right(s) remain available and that all required information has been received and, in some instances, verified. Thereafter, access management system 185 can assign one or more access rights to the user, e.g., matching the access rights requested by the user.

Assigning an access right can include, for example, associating an identifier of the right with an identifier of a user, changing a status of the right from available to assigned, facilitating a cease in notifications that the access right is available, generating an access-enabling code to use such that the corresponding access will be permitted and/or generating a notification to be received at mobile device 110 confirming the assignment and/or including data required for corresponding access to be permitted.

In some instances, a resource is at least partly controlled, by a client. The resource may be accessed at a particular location or structure, and a variety of client devices may be present at the location so as to facilitate usage of an access right. Exemplary client devices can include client agent device 170, which can be one operated by a client agent 175 (e.g., a human client agent), a client register 160 (e.g., which can operate independently of an agent and/or can be connected to or include a device that, while in a locked mode, can impede resource access, such as a turnstile) and client point device 165 (e.g., which can operate independently of an agent and/or can be positioned at or around the resource-associated location. For example, in some instances client agent device 170 can be operated by an agent at a location for a resource that is an event ("event resource") taking place at the location. In this example, client agent device 170 is used by an agent that is manning an entrance to the location (e.g., which can include, for example, a location of a structure or a geographic region) or a part thereof; client register 160 can be or can be connected to a turnstile, gate or lockable door that is positioned along a perimeter or entrance to a resource-associated location or part thereof;

and client point device 165 can be an electronic device positioned at or within a resource-associated location.

In some instances, mobile device 110 performs particular functions upon detecting a client device and/or the contrary. For example, mobile device 110 may locally retrieve or request (e.g., from an external source) an access-enabling code. The access-enabling code can be transmitted to the client device or a remote server (e.g., a server hosting access management system 185) for evaluation and/or can be locally evaluated. The evaluation can include, for example, confirming that the access-enabling code has a particular characteristic or format (e.g., generally or one characteristic corresponding to a particular resource or type of access), matches one in an access-enabling code data store and/or has not been previously redeemed. A result of the evaluation can be locally displayed at an evaluating device, can control a device component (e.g., a physical access control module), and/or can be transmitted to another device, such as mobile device 110.

In some instances, user 105 can use multiple mobile devices 110 to perform various operations (e.g., using one device to request an access right and another to interact with client devices). Some instances of mobile device 110, access management system 185, intermediate system 150, client agent device 170, client register 160 and/or client point device 165 can include a portable electronic device (e.g., a smart phone, tablet, laptop computer or smart wearable device) or a non-portable electronic device (e.g., one or more desktop computers, servers and/or processors).

In exemplary embodiments, access rights can be represented in data maintained at a client device or at access management system 185. For example, a database or data store include a list of identifiers for each user or user device having an assigned access right for a resource or associating an identifier for each user or user device with an identifier of a particular access right. In some instances, indicia can be transmitted to a user device that indicates that an access right is availed. In various instances, it may be permitted or prohibited for the indicia to be transferred. The indicia may be provided as part of an electronic or physical object (e.g., a right to access an event) or independently. The indicia may include an access-enabling code.

In some instances, access management system 185 communicates with one or more intermediate systems 150, each of which may be controlled by a different entity as compared to an entity controlling access management system 185. For example, access management system 185 may assign access rights to intermediate systems 150 (e.g., upon acceptance of terms). Intermediate system 150 can then collect data pertaining to the assigned access rights and/or a corresponding event, can format and/or edit the data, generate a notification of availability of the access rights that includes the formatted and/or edited data and facilitate presentation of the notification at a mobile device 110. When intermediate system 150 receives a communication from the mobile device 110 indicative of an access-right request, intermediate system 150 can facilitate assignment (or reassignment) of an access right to the user (e.g., by transmitting relevant information to access management system 185 identifying the user and/or user device and/or by transmitting relevant information to mobile device 110 pertaining to the access right).

A resource can include one managed or provided by a client, such as a performing entity or an entity operating a venue. A mobile device 110 can transmit data corresponding to the access right (e.g., an access-enabling code) to a client device upon, for example, detecting the client device, detecting that a location of the mobile device 110 is within a prescribed geographical region, or detecting particular input. The receiving client device may include, for example, a client agent device 170 operated at an entrance of a defined geographical location or a client register 160 that includes or is attached to a locking turnstile. The client device can then analyze the code to confirm its validity and applicability for a particular resource and/or access type, and admittance to the event can be accordingly permitted. For example, a turnstile may change from a locked to an unlocked mode upon confirmation of the code's validity and applicability.

Each of the depicted devices and/or systems may include a software agent or application ("app") that, when executed, performs one or more actions as described herein. In some instances, a software agent or app on one device is, at least in part, complementary to a software agent or app on another device (e.g., such that a software agent or app on mobile device 110 is, at least in part, complementary to at least part of one on access management system 185 and/or a client device; and/or such that a software agent or app on intermediate system 150 is, at least in part, complementary to at least part of one on access management system 185).

In some instances, a network in the one or more networks 155 can include an open network, such as the Internet, personal area network, local area network (LAN), campus area network (CAN), metropolitan area network (MAN), wide area network (WAN), wireless local area network (WLAN), a private network, such as an intranet, extranet, or other backbone. In some instances, a network in the one or more networks 155 includes a short-range communication channel, such as Bluetooth or Bluetooth Low Energy channel. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications.

In one embodiment, communications between two or more systems and/or devices can be achieved by a secure communications protocol, such as secure sockets layer (SSL), transport layer security (TLS). In addition, data and/or transactional details may be encrypted based on any convenient, known, or to be developed manner, such as, but not limited to, DES, Triple DES, RSA, Blowfish, Advanced Encryption Standard (AES), CAST-128, CAST-256, Decorrelated Fast Cipher (DFC), Tiny Encryption Algorithm (TEA), eXtended TEA (XTEA), Corrected Block TEA (XX-TEA), and/or RC5, etc.

It will be appreciated that, while a variety of devices and systems are shown in FIG. 1, in some instances, resource management system 100 can include fewer devices and/or systems. Further, some systems and/or devices can be combined. For example, a client agent device 170 may also serve as an access management system 185 or intermediate system 150 so as to as to facilitate assignment of access rights.

As described in further detail herein, an interaction between mobile device 110 and a client device (e.g., client agent device 170, client register 160 or client point device 165) can facilitate, for example, verification that user 105 has a valid and applicable access right, obtaining an assignment of an access right, and/or obtaining an assignment of an upgraded access right.

In addition, mobile device 110-2, which is operated by user 125-2, may include a user device that is located at a stadium or concert hall during an event. Mobile device 110-2 may directly interact with a client device (e.g., client agent device 170, client register 160 or client point device 165), which is also located at the stadium or concert hall during the event. As such, the access management system 185 may be updated or accessed by mobile device 110-2 via the client agent device 170. For example, mobile device 110-2 may communicate with the client agent device 170 over a short-range communication channel 190, such as Bluetooth or Bluetooth Low Energy channel, Near Field Communication (NFC), Wi-Fi, RFID, Zigbee, ANT, etc. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications. After the short-range communication link 190 is established, mobile device 110-2 may communicate with the access management system 185 and access the item or items of resources. That is, while mobile device B is configured to communicate over network 155, mobile device 110-2 may communicate with the access management system 185 via the client agent device 170, instead of the network 155.

It will be appreciated that various parts of system 100 can be geographically separated. It will further be appreciated that system 100 can include a different number of various components rather than a number depicted in FIG. 1. For example, two or more of access assignment systems 185; one or more site systems 180; and intermediate system 150 may be located in different geographic locations (e.g., different cities, states or countries).

Figure 2:
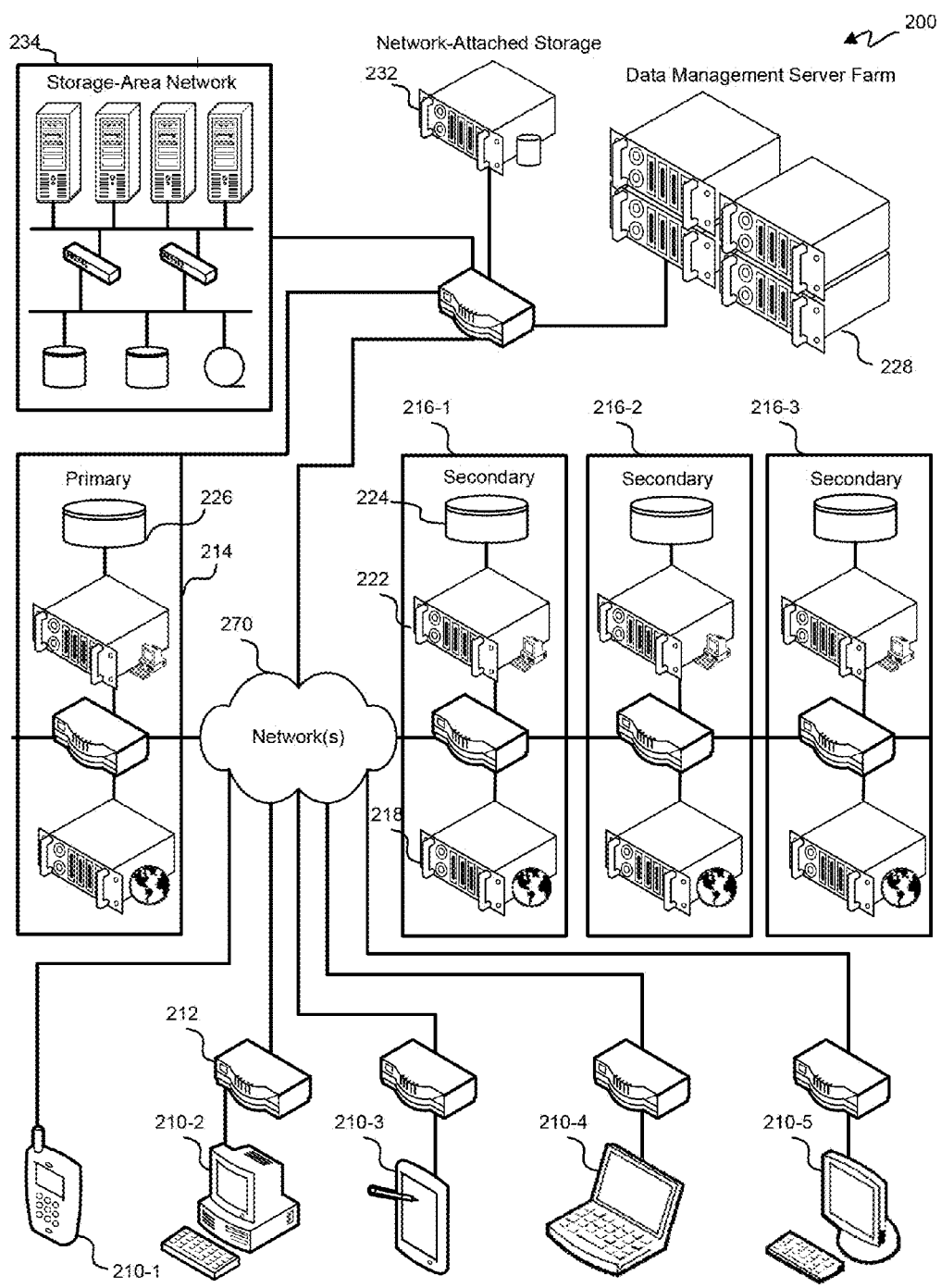
FIG. 2 shows an illustration of hardware and network connections of a resource access-facilitating interaction system according to an embodiment of the invention.

FIG. 2 shows an illustration of hardware and network connections of a resource access-facilitating interaction system 200 according to an embodiment of the invention. Each of various user devices 210-1, 210-2, 210-3, 210-4 and 210-5 can connect, via one or more inter-network connection components (e.g., a router 212) and one or more networks 270 to a primary assignment management system 214 or a secondary assignment management system 216-1, 216-2 or 216-3.

Primary assignment management system 214 can be configured to coordinate and/or control initial assignment of access rights. Secondary assignment management system 216 can be configured to coordinate and/or control reassignment and/or transfer of access rights (e.g., from one user or user device to another or from an intermediate agent to a user or user device). Such transfer may occur as a result of a sale or fee payment. Secondary assignment management system 216 may also manage transfer offers (e.g., to allow a first user to identify a price at which a transfer request would be granted and to detect if a valid request is received). It will be appreciated that, although primary assignment management system 214 is shown to be separate from each secondary assignment management system 216, in some instances, an assignment management system may relate to both a primary and secondary channel, and a single data store or a localized cluster of data stores may include data from both channels.

Each of primary access assignment system 214 and secondary access assignment system 216 can include a web server 218 that processes and responds to HTTP requests. Web server 218 can retrieve and deliver web-page data to a user device 210 that, for example, identify a resource, identify a characteristic of each of one or more access rights for the resource, include an invitation to request assignment of an access right, facilitate establishment or updating of an account, and/or identify characteristics of one or more assigned access rights. Web server 218 can be configured to support server-side scripting and/or receive data from user devices 210, such as data from forms or file uploads.

In some instances, a web server 218 can be configured to communicate data about a resource and an indication that access rights for the resource are available. Web server 218 can receive a request communication from a user device 210 that corresponds to a request for information about access rights. The request can include one or more constraints, which can correspond to (for example) values (e.g., to be matched or to define a range) of particular fields.

A management server 222 can interact with web server 218 to provide indications as to which access rights' are available for assignment, characteristics of access rights and/or what data is needed to assign an access right. When requisite information is received (e.g., about a user and/or user device, identifying a final request for one or more access rights, including payment information, and so on), management server 222 can coordinate an assignment of the one or more access rights. The coordination can include updating an access-right data store to change a status of the one or more access rights (e.g., to assigned); to associate each of the one or more access rights with a user and/or user device; to generate or identify one or more access-enabling codes for the one or more access rights; and/or to facilitate transmission reflecting the assignment (e.g., and including the one or more access-enabling codes) to a user device.

Management server 222 can query, update and manage an access-right data store to identify access rights' availability and/or characteristic and/or to reflect a new assignment. The data store can include one associated with the particular assignment system. In some instances, the data store includes incomplete data about access rights for a resource. For example, a data store 224 at and/or used by a secondary access assignment system 216 may include data about an incomplete subset of access rights that have been allocated for a particular resource. To illustrate, a client agent may have indicated that an independent intermediary system can (exclusively or non-exclusively) coordinate assignment of a portion of access rights for a resource but not the remainder. A data store 224 may then, for example, selectively include information (e.g., characteristics, statuses and/or assignment associations) for access rights in the portion.

Data store 224 or 226 associated with a particular primary or secondary access assignment system can include assignment data for a set of access rights that are configured to be set by the particular primary or secondary access assignment system or by another system. For example, a rule can indicate that a given access right is to have an available status until a first of a plurality of access assignment systems assigns the access right. Accordingly, access assignment systems would then need to communicate to alert each other of assignments.

In one instance, management server 222 (or another server in an access assignment system) sends a communication to a central data management server farm 228 reflecting one or more recent assignments. The communication may include an identification of one or more access rights, an indication that the access right(s) have been assigned, an identification of a user and/or user device associated with the assignment and/or one or more access-enabling codes generated or identified to be associated with the assignment. The communication can be sent, for example, upon assigning the access right(s), as a precursor to assigning the access right(s) (e.g., to confirm availability and/or request assignment authorization), at defined times or time intervals and/or in response to an assignment-update request received from data management server farm 228.

Data management server farm 228 can then update a central data store to reflect the data from the communication. The central data store can be part of, for example, a network-attached storage 232 and/or a storage-area network 234.

In some instances, a data store 224 or 226 can include a cache, that includes data stored based on previous communications with data management server farm 228. For example, data management server farm 228 may periodically transmit statuses of a set of access rights (e.g., those initially configured to be assignable by an access assignment system) or an updated status (e.g., indicating an assignment) of one or more access rights. As another example, data management server farm 228 may transmit statuses upon receiving a request from an access assignment system for statuses and/or authorization to assign one or more access rights.

An access assignment system may receive statuses less frequently or at times unaligned with requests received from user devices requesting information about access rights and/or assignments. Rather than initiate a central data store query responsive to each user-device request, a management server 222 can rely on cached data (e.g., locally cached data) to identify availability of one or more access rights, as reflect in webpage data and/or communications responsive to request communications for access-right information. After requisite information has been obtained, management server 222 can then communicate with data management server farm 228 to ensure that one or more particular access rights have remained available for assignment.

In some instances, one or more of primary access assignment system 214 and/or a secondary access assignment system 214 need not include a local or system-inclusive data store for tracking access-right statuses, assignments and/or characteristics. Instead, the access assignment system may communicate with a remote and/or central data store (e.g., network-attached storage 232 or storage-area network 234).

Access management system 185 can include a primary access assignment system 214 and/or a secondary access assignment system 214; data management server farm 228; and/or a central data store (e.g., network-attached storage 232 or storage-area network 234). Each of one or more intermediate systems 130 can include a primary access assignment system 214 and/or a secondary access assignment system 214.

Data management server farm 228 may periodically and/or routinely assess a connection with an access assignment system 214. For example, a test communication can be sent that is indicative of a request to respond (e.g., with particular data or generally). If a response communication is not received, if a response communication is not received within a defined time period and/or if a response communication includes particular data (e.g., reflecting poor data integrity, network speed, processing speed, etc.), data management server farm 228 may reconfigure access rights and/or permissions and/or may transmit another communication indicating that assignment rights of the access assignment system are limited (e.g., to prevent the system from assigning access rights).

It will be appreciated that various parts of system 200 can be geographically separated. For example, two or more of primary access assignment system 214; one or more of secondary access assignment systems 214; and data management server farm 228 may be located in different geographic locations (e.g., different cities, states or countries).

It will further be appreciated that system 200 can include a different number of various components rather than a number depicted in FIG. 2. For example, system 200 can include multiple data management server farms 228, central data stores and/or primary access assignment systems 214 (e.g., which can be geographically separated, such as being located in different cities, states or countries). In some instances, processing may be split (e.g., according to a load-balancing technique) across multiple data management server farms 228 and/or across multiple access assignment systems 214. Meanwhile, the farms and/or systems can be configured to accept an increased or full load should another farm and/or system be unavailable (e.g., due to maintenance). Data stored in a central data store may also be replicated in geographically separated data stores.

Figure 3:
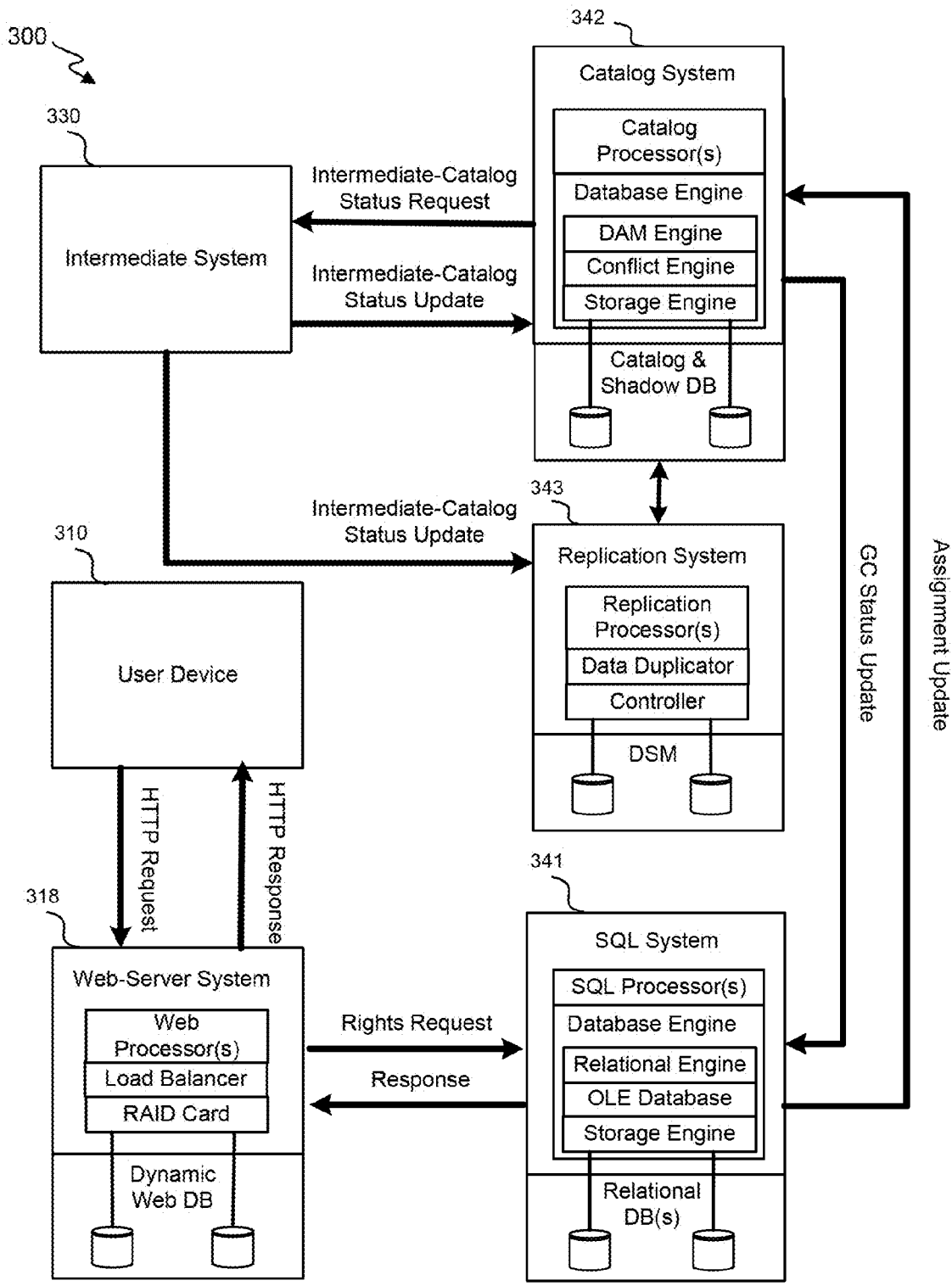
FIG. 3 shows an illustration of a communication exchange between components involved in a resource access-facilitating interaction system according to an embodiment of the invention.

FIG. 3 shows an illustration of a communication exchange between components involved in a resource access-facilitating interaction system 300 according to an embodiment of the invention. A user device 310 can send one or more HTTP requests to a web-server system 318, and web-server system 318 can respond with one or more HTTP responses that include webpage data. The webpage data can include, for example, information about one or more resources, characteristics of a set of access rights for each of the one or more resources, availability of one or more access rights, an invitation to request an assignment of one or more access rights and/or indications as to what information is required for an access-right assignment. HTTP requests can include assignment-request data (e.g., a resource identification, requisite information, and/or an identification of an access-right constraint or access right).

Web-server system 318 can include one or more web processors (e.g., included in one or more server farms, which may be geographically separated) to, for example, map a path component of a URL to web data (e.g., stored in a local file system or generated by a program); retrieve the web data; and/or generate a response communication including the web data. Web processor can further parse communication to identify input-corresponding data in HTTP requests, such as field values required for an access-right assignment.

Web-server system 318 can also include a load balancer to distribute processing tasks across multiple web processors. For example, HTTP requests can be distributed to different web processors. Load-balancing techniques can be configured so as, for example, to distribute processing across servers or server farms, decrease a number of hops between a web server and user device, decrease a geographical location between a user device and web server, etc.

Web-server system 318 can further include a RAID component, such as a RAID controller or card. A RAID component can be configured, for example, to stripe data across multiple drives, distribute parity across drives and/or mirror data across multiple drives. The RAID component can be configured to improve reliability and increase request-processing speeds.

Web-server system 318 can include one or more distributed, non-distributed, virtual, non-virtual, local and/or remote data stores. The data stores can include web data, scripts and/or content object (e.g., to be presented as part or web data).

Some HTTP requests include requests for identifications of access-right characteristics and/or availability. To provide web data reflecting such information, web-server system 318 can request the information from another server, such as an SQL system 341 (e.g., which may include one or more servers or one or more server farms).

SQL system 341 can include one or more SQL processors (e.g., included in one or more server farms, which may be geographically separated). SQL processors can be configured to query, update and otherwise use one or more relational data stores. SQL processors can be configured to execute (and, in some instances, generate) code (e.g., SQL code) to query a relational data store.

SQL system 341 can include a database engine, that includes a relational engine, OLE database and storage engine. A relational engine can process, parse, compile, and/or optimize a query and/or make query-associated calls. The relational engine can identify an OLE DB row set that identifies the row with columns matching search criteria and/or a ranking value. A storage engine can manage data access and use the rowset (e.g., to access tables and indices) to retrieve query-responsive data from one or more relational databases.

SQL system 341 can include one or more distributed, non-distributed, virtual, non-virtual, local and/or remote relational data stores. The relational databases can include linked data structures identifying, for example, resource information, access-right identifications and characteristics, access-right statuses and/or assignments, and/or user and/or user account data. Thus, for example, use of the relational structures may facilitate identifying, for a particular user, a characteristic of an assigned access right and information about a resource associated with the access right.

One or more data structures in a relational data structure may reflect whether particular access rights have been assigned or remain available. This data may be based on data received from a catalog system 342 that monitors and tracks statuses of resource access rights. Catalog system 342 can include one or more catalog processors (e.g., included in one or more server farms, which may be geographically separated). Catalog processors can be configured to generate status-update request communications to be sent to one or more access assignment systems and/or intermediate systems and/or to receive status-update communications from one or more access assignment systems and/or intermediate systems. A status-update communication can, for example, identify an access right and/or resource and indicate an assignment of the access right. For example, a status-update communication can indicate that a particular access right has been assigned and is thus no longer available. In some instances, a status-update communication identifies assignment details, such as a user, account and/or user device associated with an access-right assignment; a time that the assignment was made; and/or a price associated with the assignment.

In some instances, a status update is less explicit. For example, a communication may identify an access right and/or resource and request a final authorization of an assignment of the access right. Catalog system 342 can then verify that the access right is available for assignment (e.g., and that a request-associated system or entity is authorized to coordinate the assignment) and can transmit an affirmative response. Such a communication exchange can indicate (in some instances) that the access right is assigned and unavailable for other assignment.

In some instances, catalog system 342 can also be integrated with a non-intermediate access assignment system, such that it can directly detect assignments. For example, an integrated access assignment system can coordinate a message exchange with a user device, can query a catalog data store to identify available access rights and can facilitate or trigger a status-change of an access right to reflect an assignment (e.g., upon having received all required information.

Whether a result of a direct assignment detection or a status update from an intermediate system, a database engine of catalog system 342 can manage one or more data stores so as to indicate a current status of each of a set of access rights for a resource. The one or more data stores may further identify any assignment constraints. For example, particular access rights may be earmarked so as to only allow one or more particular intermediate systems to trigger a change to the access rights' status and/or to assign the access rights.

The database engine can include a digital asset management (DAM) engine to receive, transform (e.g., annotate, reformat, introduce a schema, etc.) status-update communications, and identify other data (e.g., an identifier of an assigning system and/or a time at which a communication was received) to associate with a status update (e.g., an assignment). Therefore, the DAM engine can be configured to prepare storage-update tasks so as to cause a maintained data store to reflect a recent data change.

Further, the DAM engine can facilitate handling of data-store queries. For example, a status-request communication or authorization-request communication can be processed to identify variables and/or indices to use to query a data store. A query can then be generated and/or directed to a data store based on the processing. The DAM engine can relay (e.g., and, potentially, perform intermediate processing to) a query result to a request-associate system.

The database engine can also include a conflict engine, which can be configured to access and implement rules indicating how conflicts are to be handled. For example, catalog system 342 may receive multiple requests within a time period requesting an assignment authorization (or a hold) for a particular access right. A rule may indicate that a first request is to receive priority, that a request associated with a more highly prioritized requesting system (e.g., intermediate system) is to be prioritized, that a request associated with a relatively high (or low) quantity of access rights identified in the request for potential assignment are to be prioritized, etc.

The database engine can further include a storage engine configured to manage data access and/or data updates (e.g., modifying existing data or adding new data). The data managed by and/or accessible to the storage engine can be included in one or more data stores. The data stores can include, for example, distributed, non-distributed, virtual, non-virtual, local and/or remote data stores. The data stores can include, for example, a relational, non-relational, object, non-object, document and/or non-document data store. Part or all of a data store can include a shadow data store, that shadows data from another data store. Part or all of a data store can include an authoritative data store that is (e.g., directly and/or immediately) updated with access-right assignment changes (e.g., such that a primary or secondary access assignment system updates the data store as part of an access-right assignment process, rather than sending a post-hoc status-update communication reflecting the assignment). In some instances, a data store an authoritative data store identifies a status for each of a set (e.g., or all) of access rights for a given resource. Should there be any inconsistency between an authoritative data store and another data store (e.g., at an intermediate system), system 300 can be configured such that the authoritative data store is controlling.

System 300 can further include a replication system 343. Replication system 343 can include one or more replication processors configured to identify new or modified data, to identify one or more data stores and/or location at which to store the new or modified data and/or to coordinate replication of the data. In some instances, one or more of these identifications and/or coordination can be performed using a replication rule. For example, a replication rule may indicate that replication is to be performed in a manner biased towards storing replicated data at a data store geographically separated from another data store storing the data.

A data duplicator can be configured to read stored data and generate one or more write commands so as to store the data at a different data store. A controller can manage transmitting write commands appropriately so as to facilitate storing replicated data at identified data stores. Further, a controller can manage data stores, such as a distributed memory or distributed shared memory, to ensure that a currently active set of data stores includes a target number of replications of data.

Accordingly, web-server system 318 can interact with user device 310 to identify available access rights and to collect information needed to assign an access right. Web-server system 318 can interact with SQL system 341 so as to retrieve data about particular resources and/or access rights so as to configure web data (e.g., via dynamic web-pages or scripts) to reflect accurate or semi-accurate information and/or statuses. SQL system 341 can use relational data stores to quickly provide such data. Meanwhile, catalog system 342 may manage one or more non-relational and/or more comprehensive data stores may be tasked with more reliably and quickly tracking access-right statuses and assignments. The tracking may include receiving status updates (e.g., via a push or pull protocol) from one or more intermediate systems and/or by detecting assignment updates from non-intermediate systems, such as an integrated access assignment system and/or SQL system 341. Catalog system 342 may provide condensed status updates (e.g., reflecting a binary indication as to whether an access right is available) to SQL system 341 periodically, at triggered times and/or in response to a request from the SQL system. A replication system 343 can further ensure that data is replicated at multiple data stores, so as to improve a reliability and speed of system 300.

It will be appreciated that various parts of system 300 can be geographically separated. For example, each of user device 310, intermediate system 330, web-server system 318, SQL system 341, catalog system 342 and replication 343 may be located in different geographic locations (e.g., different cities, states or countries).

Figure 4:
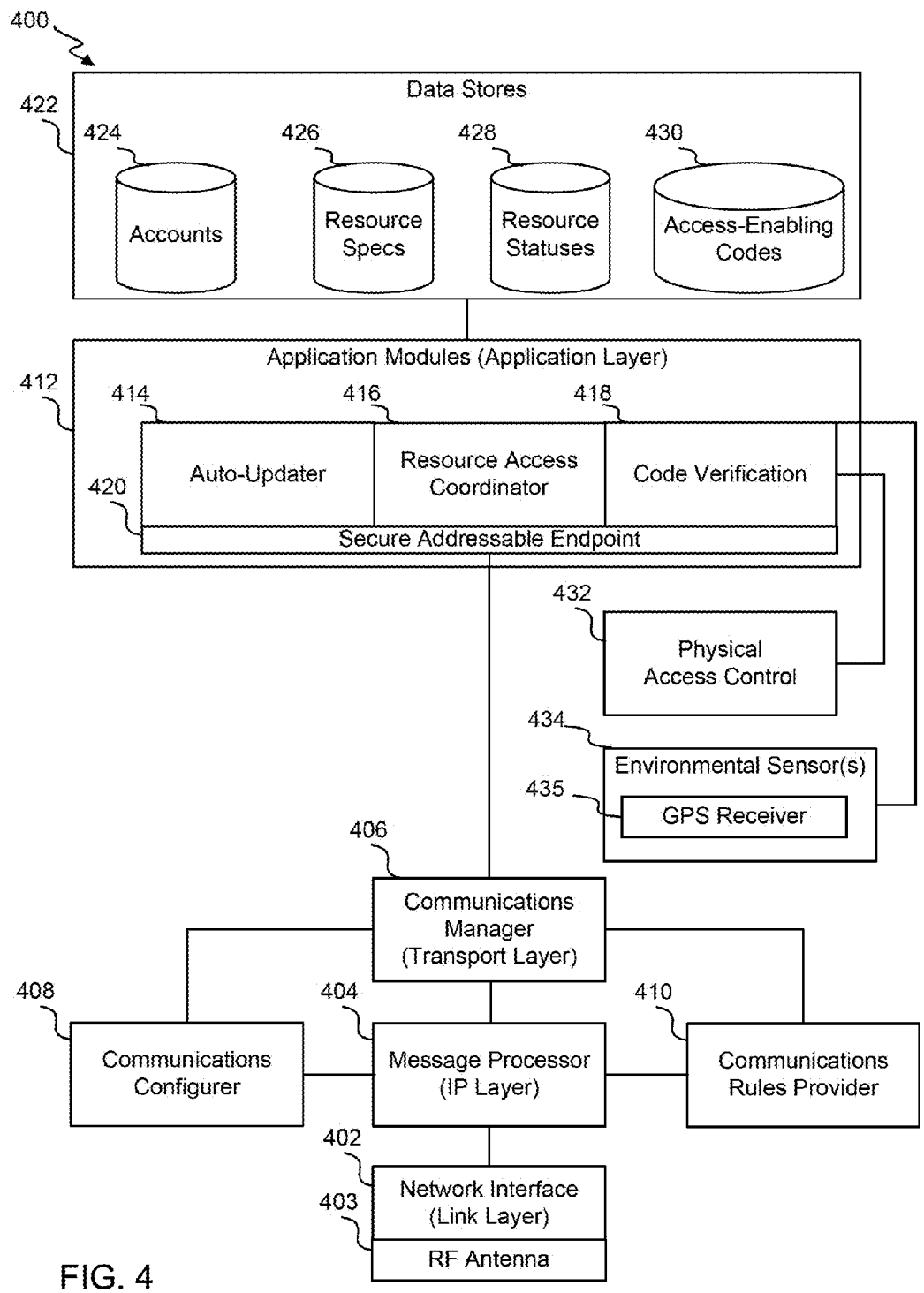
FIG. 4 illustrates example components of a device.

FIG. 4 illustrates example components of a device 400, such as a client device (e.g., client agent device 170, client register 160 and/or client point device 165), an intermediate system (e.g., intermediate system 130) and/or an access management system (e.g., access management system 185) according to an embodiment of the invention.

The components can include one or more modules that can be installed on device 400. Modules can include some or all of the following: a network interface module 402 (which can operate in a link layer of a protocol stack), a message processor module 404 (which can operate in an IP layer of a protocol stack), a communications manager module 406 (which can operate in a transport layer of a protocol stack), a communications configure module 408 (which can operate in a transport and/or IP layer in a protocol stack), a communications rules provider module 410 (which can operate in a transport and/or IP layer in a protocol stack), application modules 412 (which can operate in an application layer of a protocol stack), a physical access control module 432 and one or more environmental sensors 434.

Network interface module 402 receives and transmits messages via one or more hardware components that provide a link-layer interconnect. The hardware component(s) can include, for example, RF antenna 403 or a port (e.g., Ethernet port) and supporting circuitry. In some embodiments, network interface module 402 can be configured to support wireless communication, e.g., using Wi Fi (IEEE 802.11 family standards), Bluetooth® (a family of standards promulgated by Bluetooth SIG, Inc.), BLE, or near-field communication (implementing the ISO/IEC 18092 standards or the like).

RF antenna 403 can be configured to convert electric signals into radio and/or magnetic signals (e.g., to radio waves) to transmit to another device and/or to receive radio and/or magnetic signals and convert them to electric signals. RF antenna 403 can be tuned to operate within a particular frequency band. In some instances, a device includes multiple antennas, and the antennas can be, for example, physically separated. In some instances, antennas differ with respect to radiation patterns, polarizations, take-off angle gain and/or tuning bands. RF interface module 402 can include one or more phase shifters, filters, attenuators, amplifiers, switches and/or other components to demodulate received signals, coordinate signal transmission and/or facilitate high-quality signal transmission and receipt.

In some instances, network interface module 402 includes a virtual network interface, so as to enable the device to utilize an intermediate device for signal transmission or reception. For example, network interface module 402 can include VPN software.

Network interface module 402 and one or more antennas 403 can be configured to transmit and receive signals over one or more connection types. For example, network interface module 402 and one or more antennas 403 can be configured to transmit and receive WiFi signals, cellular signals, Bluetooth signals, Bluetooth Low Energy (BLE) signals, Zigbee signals, or Near-Field Communication (NFC) signals.

Message processor module 404 can coordinate communication with other electronic devices or systems, such as one or more servers or a user device. In one instance, message processor module 404 is able to communicate using a plurality of protocols (e.g., any known, future and/or convenient protocol such as, but not limited to, XML, SMS, MIMS, and/or email, etc.). Message processor module 404 may further optionally serialize incoming and/or outgoing messages and facilitate queuing of incoming and outgoing message traffic.

Message processor module 404 can perform functions of an IP layer in a network protocol stack. For example, in some instances, message processor module 404 can format data packets or segments, combine data packet fragments, fragment data packets and/or identify destination applications and/or device addresses. For example, message processor module 404 can defragment and analyze an incoming message to determine whether it is to be forwarded to another device and, if so, can address and fragment the message before sending it to the network interface module 402 to be transmitted. As another example, message processor module 404 can defragment and analyze an incoming message to identify a destination application that is to receive the message and can then direct the message (e.g., via a transport layer) to the application.

Communications manager module 406 can implement transport-layer functions. For example, communications manager module 406 can identify a transport protocol for an outgoing message (e.g., transmission control protocol (TCP)

or user diagram protocol (UDP)) and appropriately encapsulate the message into transport protocol data units. Message processor module 404 can initiate establishment of connections between devices, monitor transmissions failures, control data transmission rates and monitoring transmission quality. As another example, communications manager module 406 can read a header of an incoming message to identify an application layer protocol to receive the message's data. The data can be separated from the header and sent to the appropriate application. Message processor module 404 can also monitor the quality of incoming messages and/or detect out of order incoming packets.

In some instances, characteristics of message-receipt or message-transmission quality can be used to identify a health status of an established communications link. In some instances, communications manager module 406 can be configured to detect signals indicating the health status of an established communications link (e.g., a periodic signal from the other device system, which if received without dropouts, indicates a healthy link).

In some instances, a communication configurer module 408 is provided to track attributes of another system so as to facilitate establishment of a communication session. In one embodiment, communication configurer module 408 further ensures that inter-device communications are conducted in accordance with the identified communication attributes and/or rules. Communication configurer module 408 can maintain an updated record of the communication attributes of one or more devices or systems. In one embodiment, communications configurer module 408 ensures that communications manager module 406 can deliver the payload provided by message processor module 404 to the destination (e.g., by ensuring that the correct protocol corresponding to the client system is used).

A communications rules provider module 410 can implement one or more communication rules that relate to details of signal transmissions or receipt. For example, a rule may specify or constrain a protocol to be used, a transmission time, a type of link or connection to be used, a destination device, and/or a number of destination devices. A rule may be generally applicable or conditionally applicable (e.g., only applying for messages corresponding to a particular app, during a particular time of day, while a device is in a particular geographical region, when a usage of a local device resource exceeds a threshold, etc.). For example, a rule can identify a technique for selecting between a set of potential destination devices based on attributes of the set of potential destination devices as tracked by communication configure module 408. To illustrate, a device having a short response latency may be selected as a destination device. As another example, communications rules provider 410 can maintain associations between various devices or systems and resources. Thus, messages corresponding to particular resources can be selectively transmitted to destinations having access to such resources.

A variety of application modules 412 can be configured to initiate message transmission, process incoming transmissions, facilitate selective granting of resource access, facilitate processing of requests for resource access, and/or performing other functions. In the instance depicted in FIG. 4, application modules 412 include an auto-updater module 414, a resource access coordinator module 416, and/or a code verification module 418.

Auto-updater module 414 automatically updates stored data and/or agent software based on recent changes to resource utilization, availability or schedules and/or updates to software or protocols. Such updates can be pushed from another device (e.g., upon detecting a change in a resource availability or access permit) or can be received in response to a request sent by device 400. For example, device 400 can transmit a signal to another device that identifies a particular resource, and a responsive signal can identify availabilities of access to the resource (e.g., available seat reservations for a sporting event or concert). As another example, device 400 can transmit a signal that includes an access access-enabling code, and a responsive signal can indicate whether the code is applicable for access of a particular resource and/or is valid.

In some instances, auto-updater module 414 is configured to enable the agent software to understand new, messages, commands, and/or protocols, based on a system configuration/change initiated on another device. Auto-updater module 414 may also install new or updated software to provide support and/or enhancements, based on a system configuration change detected on device 400. System configuration changes that would necessitate changes to the agent software can include, but are not limited to, a software/hardware upgrade, a security upgrade, a router configuration change, a change in security settings, etc. For example, if auto-updater module 414 determines that a communication link with another device has been lost for a pre-determined amount of time, auto-updater module 414 can obtain system configuration information to help re-establish the communication link. Such information may include new settings/configurations on one or more hardware devices or new or upgraded software on or connected to device 400. Thus, auto-updater module 414 can detect or be informed by other software when there is a new version of agent software with additional functionality and/or deficiency/bug corrections or when there is a change with respect to the software, hardware, communications channel, etc.), and perform updates accordingly.

Based on the newly obtained system configuration for device 400, auto-updater module 414 can cause a new communication link to be re-established with another device. In one embodiment, upon establishment of the communication link, system configuration information about device 400 can also be provided to another device to facilitate the connection to or downloading of software to device 400.

In one embodiment, when a poor health signal is detected by another device (e.g., when the health signal is only sporadically received but the communication link is not necessarily lost), the other device can send a command to auto-updater module 414 to instruct auto-updater module 414 to obtain system configuration information about device 400. The updated system configuration information may be used in an attempt to revive the unhealthy communications link (e.g., by resending a resource request). For example, code can utilize appropriate system calls for the operating system to fix or reestablish communications. By way of example and not limitation, model and driver information is optionally obtained for routers in the system in order querying them. By way of further example, if the code determines that a new brand of router has been installed, it can adapt to that change, or to the change in network configuration, or other changes.

Instead or in addition, the host server (e.g., via communications manager 406) can send specific instructions to auto-updater module 414 to specify tests or checks to be performed on device 400 to determine the changes to the system configurations (e.g., by automatically performing or requesting an inventory check of system hardware and/or software). For example, the components involved in the chain of hops through a network can be queried and analyzed. Thus, for example, if a new ISP (Internet service provider) is being used and the management system traffic is being filtered, or a new router was installed and the software needs to change its configuration, or if someone made a change to the operating system that affects port the management system is using to communicate, the management system (or operator) can communicate with the ISP, change it back, or choose from a new available port, respectively.

The specific tests may be necessary to help establish the communication link, if, for example, the automatic tests fail to provide sufficient information for the communication link to be re-established, if additional information is needed about a particular configuration change, and/or if the client system is not initially supported by the auto-updater module 414, etc.

Auto-updater module 414 can also receive signals identifying updates pertaining to current or future availability of resources and/or access permits. Based on the signals, auto-updater module 414 can modify, add to or delete stored data pertaining to resource availabilities, resource schedules and/or valid access permits. For example, upon receiving an update signal, auto-updater 414 can modify data stored in one or more data stores 422, such as an account data store 424, resource specification data store 426, resource status data store 428 and/or access-enabling code data store 430.

Account data store 424 can store data for entities, such as administrators, intermediate-system agents and/or users. The account data can include login information (e.g., username and password), identifying information (e.g., name, residential address, phone number, email address, age and/or gender), professional information (e.g., occupation, affiliation and/or professional position), preferences (e.g., regarding event types, performers, seating areas, and/or resource types), purchase data (e.g., reflecting dates, prices and/or items of past purchases) and/or payment data (e.g., credit card number and expiration date or payment account information). The account data can also or alternatively include technical data, such a particular entity can be associated with one or more device types, IP addresses, browser identifier and/or operating system identifier).

Resource specification data store 426 can store specification data characterizing each of one or more resources. For example, specification data for a resource can include a processing power, available memory, operating system, compatibility, device type, processor usage, power status, device model, number of processor cores, types of memories, date and time of availability, a performing entity, a venue of the event and/or a set of seats (e.g., a chart or list). Specification data can further identify, for example, a cost for each of one or more access rights.

Resource status data store 428 can store status data reflecting which resources are available (or unavailable), thereby indicating which resources have one or more open assignments. In some instances, the status data can include schedule information about when a resource is available. Status data can include information identifying an entity who requested, reserved or was assigned a resource. In some instances, status information can indicate that a resource is being held or reserved and may identify an entity associated with the hold or reserve and/or a time at which the hold or reservation will be released.

Access-enabling code data store 430 can store access-enabling code data that includes one or more codes and/or other information that can be used to indicate that an entity is authorized to use, have or receive a resource. An access-enabling code can include, for example, a numeric string, an alphanumeric string, a text string, a 1-dimensional code, a 2-dimensional code, a barcode, a quick response (QR) code, an image, a static code and/or a temporally dynamic code. An access-enabling code can be, for example, unique across all instances, resource types and/or entities. For example, access-enabling codes provided in association for tickets to a particular event can be unique relative to each other. In some instances, at least part of a code identifies a resource or specification of a resource. For example, for a ticket to a concert, various portions of a code may reflect: a performing entity, resource location, date, section and access-permitted location identifier.

One or more of data stores 424, 426, 428, and 430 can be a relational data store, such that elements in one data store can be referenced within another data store. For example, resource status data store 428 can associate an identifier of a particular ticket with an identifier of a particular entity. Additional information about the entity can then be retrieved by looking up the entity identifier in account data store 424.

Updates to data stores 424, 426, 428, and 430 facilitated and/or initiated by auto-updater module 414 can improve cross-device data consistency. Resource access coordinator module 416 can coordinate resource access by, for example, generating and distributing identifications of resource availabilities; processing requests for resource access; handling competing requests for resource access; and/or receiving and responding to resource-offering objectives.

Figure 5:
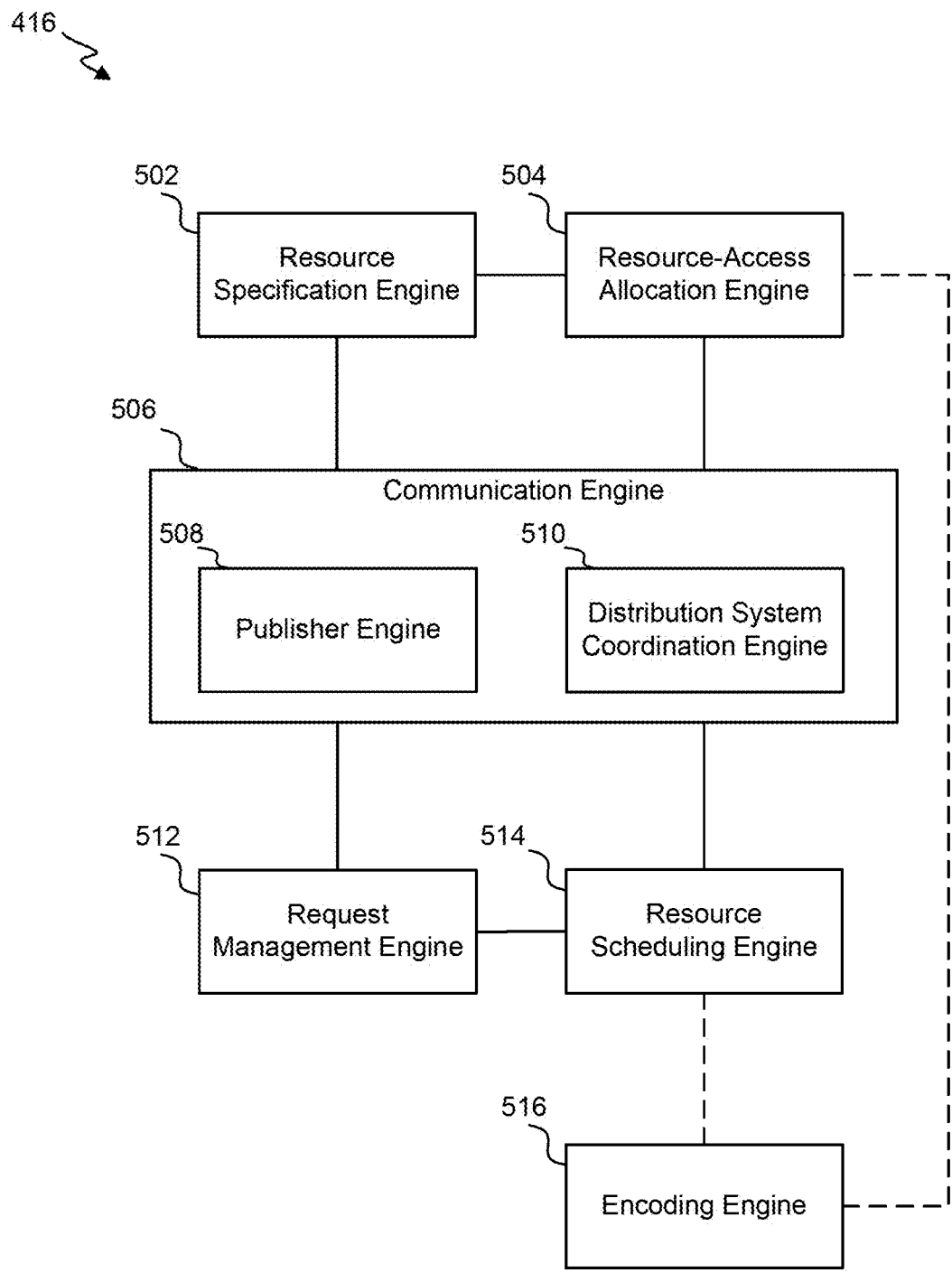
FIG. 5 illustrates example components of resource access coordinator module.

FIG. 5 illustrates example components of resource access coordinator module 416 that may operate, at least in part, at an access management system (e.g., access management system) according to an embodiment of the invention. A resource specification engine 502 can identify one or more available resources. For example, resource specification engine 502 can detect input that identifies a current or future availability of a new resource.

Resource specification engine 502 can identify one or more specifications of each of one or more resources. A specification can include an availability time period. For example, resource specification engine 502 can determine that a resource is available, for example, at a particular date and time (e.g., as identified based on input), for a time period (e.g., a start to end time), as identified in the input, and/or from a time of initial identification until another input indicating that the resource is unavailable is detected. A specification can also or alternatively include a location (e.g., a geographic location and/or venue) of the resource. A specification can also or alternatively include one or more parties associated with the resource (e.g., performing acts or teams). Resource specification engine 502 can store the specifications in association with an identifier of the resource in resource specifications data store 426.

A resource-access allocation engine 504 can allocate access rights for individual resources. An access right can serve to provide an associated entity with the right or a priority to access a resource. Because (for example) association of an access right with an entity can, in some instances, be conditioned on fee payment or authorization thereof, an allocated access right can be initially unassociated with particular entities (e.g., users). For example, an allocated right can correspond to one or more access characteristics, such as an processor identifier, a usage time, a memory allocation, a geographic location (e.g., section or seat identifier), and/or a fee. For an allocated access right, resource-access allocation engine 504 can store an identifier of the right in resource statuses data store 428 in association with an identifier for the resource and an indication that it has not yet been assigned to a particular entity.

A communication engine 506 can facilitate communicating the availability of the resource access rights to users. In some instances, a publisher engine 508 generates a presentation that identifies a resource and indicates that access rights are available. Initially or in response to user interaction with the presentation, the presentation can identify access characteristics about available access rights. The presentation can include, for example, a chart that identifies available access rights for an event and corresponding fees. Publisher engine 508 can distribute the presentation via, for example, a website, app page, email and/or message. The presentation can be further configured to enable a user to request assignments of one or more access rights.

In some instances, an intermediate system coordination engine 510 can facilitate transmission of information about resource availability (e.g., resource specifications and characteristics of resource-access rights) to one or more intermediate systems (e.g., by generating one or more messages that include such information and/or facilitating publishing such information via a website or app page). Each of the one or more intermediate systems can publish information about the resource and accept requests for resource access. In some instances, intermediate system coordination engine 510 identifies different access rights as being available to individual intermediate systems to coordinate assignment. For example, access rights for seats in Section 1 may be provided for a first intermediate system to assign, and access rights for seats in Section 2 may be provided to a second intermediate system to assign.

In some instances, overlapping access rights are made available to multiple intermediate systems to coordinate assignments. For example, some or all of a first set of resource rights (e.g., corresponding to a section) may be provided to first and second intermediate systems. In such instances, intermediate system coordination engine 510 can respond to a communication from a first intermediate system indicating that a request has been received (e.g., and processed) for an access right in the set) by sending a notification to one or more other intermediate systems that indicates that the access right is to be at least temporarily (or entirely) made unavailable.

Intermediate system coordination engine 510 can monitor communication channels with intermediate systems to track the health and security of the channel. For example, a healthy connection can be inferred when scheduled signals are consistently received. Further, intermediate system coordination engine 510 can track configurations of intermediate systems (e.g., via communications generated at the intermediate systems via a software agent that identifies such configurations) so as to influence code generation, communication format, and/or provisions or access rights.

Thus, either via a presentation facilitated by publisher engine 508 (e.g., via a web site or app page) or via communication with an intermediate system, a request for assignment of an access right can be received. A request management engine 512 can process the request. Processing the request can include determining whether all other required information has been received, such as user-identifying information (e.g., name), access-right identifying information (e.g., identifying a resource and/or access-right characteristic) user contact information (e.g., address, phone number, and/or email address), and/or user device information (e.g., type of device, device identifier, and/or IP address).

When all required information has not been received, request management engine 512 can facilitate collection of the information (e.g., via a webpage, app page or communication to an intermediate system). Request management engine 512 can also or alternatively collect payment information, determine that payment information has been received, obtain authorization of payment, determine that payment has been authorized (e.g., via an intermediate system), collect payment, and/or determine that payment has been collected. For example, publisher engine 508 may receive a credit card number and expiration date via a webpage, and request management engine 512 can request authorization for an amount of the requested access rights. In some instances, payment assessments are performed subsequent to at least temporary assignments of access rights. In some instances, request management engine 512 retrieves data from a user account. For example, publisher engine 508 may indicate that a request for an access right has been received while a user was logged into a particular account. Request management engine 512 may then retrieve, for example, contact information, device information, and/or preferences and/or payment information associated with the account from account data store 424.

In some instances, request management engine 512 prioritizes requests, such as requests for overlapping, similar or same access rights (e.g., requests for access rights associated with a same section) received within a defined time period. The prioritization can be based on, for example, times at which requests were received (e.g., prioritizing earlier requests), a request parameter (e.g., prioritizing requests for a higher or lower number of access rights above others), whether requests were received via an intermediate system (e.g., prioritizing such requests lower than others), intermediate systems associated with requests (e.g., based on rankings of the systems), whether requests were associated with users having established accounts, and/or whether requests were associated with inputs indicative of a bot initiating the request (e.g., shorter inter-click intervals, failed CAPTCHA tests, purchase history departing from a human profile).

Upon determining that required information has been received and request-processing conditions have been met, request management engine 512 can forward appropriate request information to a resource scheduling engine 514. For a request, resource scheduling engine 514 can query resource status data store 428 to identify access rights matching parameters of the request.

In some instances, the request has an access-right specificity matching a specificity at which access rights are assigned. In some instances, the request is less specific, and resource scheduling engine 514 can then facilitate an identification of particular rights to assign. For example, request management engine 512 can facilitate a communication exchange by which access right characteristics matching the request are identified, and a user is allowed to select particular rights. As another example, request management engine 512 can itself select from amongst matching access rights based on a defined criterion (e.g., best summed or averaged access-right ranking, pseudo-random selection, or a selection technique identified based on user input).

Upon identifying appropriately specific access rights, resource scheduling engine 514 can update resource status data store 428 so as to place the access right(s) on hold (e.g., while obtaining payment authorization and/or user confirmation) and/or to change a status of the access right(s) to indicate that they have been assigned (e.g., immediately, upon receiving payment authorization or upon receiving user confirmation). Such assignment indication may associate information about the user (e.g., user name, device information, phone number and/or email address) and/or assignment process (e.g., identifier of any intermediate system and/or assignment date and time) with an identifier of the access right(s).

For individual assigned access rights, an encoding engine 516 can generate an access-enabling code. The access-enabling code can include, for example, an alphanumeric string, a text string, a number, a graphic, a barcode (e.g., a 1-dimensional or 2-dimensional barcode), a static code, a dynamic code (e.g., with a feature depending on a current time, current location or communication) and/or a technique for generating the code (e.g., whereby part of the code may be static and part of the code may be determined using the technique). The code may be unique across all access rights, all access rights for a given resource, all access rights associated with a given location, all access rights associated with a given time period, all resources and/or all users. In some instances, at least part of the code is determined based on or is thereafter associated with an identifier of a user, user device information, a resource specification and/or an access right characteristic.

In various embodiments, the code may be generated prior to allocating access rights (e.g., such that each of some or all allocated access rights are associated with an access-enabling code), prior to or while assigning one or more access right(s) responsive to a request (e.g., such that each of some or all assigned access rights are associated with an access-enabling code), at a prescribed time, and/or when the device is at a defined location and/or in response to user input. The code may be stored at or availed to a user device. In various instances, at the user device, an access-enabling code may be provided in a manner such that it is visibly available for user inspection or concealed from a user. For example, a ticket document with a barcode may be transmitted to a user device, or an app on the user device can transmit a request with a device identifier for a dynamic code.

Encoding engine 516 can store the access-enabling codes in access-enabling code data store 430. Encoding engine 516 can also or alternatively store an indication in account data store 424 that the access right(s) have been assigned to the user. It will again be appreciated that data stores 424, 426, 428, and 430 can be relational and/or linked, such that, for example, an identification of an assignment can be used to identify one or more access rights, associated access-enabling code(s) and/or resource specifications.

Resource scheduling engine 514 can facilitate one or more transmissions of data pertaining to one or more assigned access rights to a device of a user associated with the assignment and/or to an intermediate system facilitating the assignment and/or having transmitted a corresponding assignment request. The data can include an indication that access rights have been assigned and/or details as to which rights have been assigned. The data can also or alternatively include access-enabling codes associated with assigned access rights.

While FIG. 5 depicts components of resource access coordinator module 516 that may be present on an access management system 185, it will be appreciated that similar or complementary engines may be present on other systems. For example, a communication engine on a user device can be configured to display presentations identifying access right availability, and a request management engine on a user device can be configured to translate inputs into access-right requests to send to an intermediate system or access management system.

Returning to FIG. 4, code verification module 418 (e.g., at a user device or client device) can analyze data to determine whether an access-enabling code is generally valid and/or valid for a particular circumstance. The access-enabling code can include one that is received at or detected by device 400. The analysis can include, for example, determining whether all or part of the access-enabling code matches one stored in access-enabling code data store 430 or part thereof, whether the access-enabling code has previously been applied, whether all or part of the access-enabling code is consistent with itself or other information (e.g., one or more particular resource specifications, a current time and/or a detected location) as determined based on a consistency analysis and/or whether all or part of the access-enabling code has an acceptable format.

For example, access-enabling code data store 430 can be organized in a manner such that access-enabling codes for a particular resource, date, resource group, client, etc. can be queried to determine whether any such access-enabling codes correspond to (e.g. match) one being evaluated, which may indicate that the code is verified. Additional information associated with the code may also or alternatively be evaluated. For example, the additional information can indicate whether the code is currently valid or expired (e.g., due to a previous use of the code).

As another example, a portion of an access-enabling code can include an identifier of a user device or user account, and code verification module 418 can determine whether the code-identified device or account matches that detected as part of the evaluation. To illustrate, device 400 can be a client device that electronically receives a communication with an access-enabling code from a user device. The communication can further include a device identifier that identifies, for example, that the user device is a particular type of smartphone. Code verification module 418 can then determine whether device-identifying information in the code is consistent with the identified type of smartphone.

As yet another example, code verification module 418 can identify a code format rule that specifies a format that valid codes are to have. To illustrate, the code format rule may identify a number of elements that are to be included in the code or a pattern that is to be present in the code. Code verification module 418 can then determine that a code is not valid if it does not conform to the format.

Verification of an access-enabling code can indicate that access to a resource is to be granted. Conversely, determining that a code is not verified can indicate that access to a resource is to be limited or prevented. In some instances, a presentation is generated (e.g., and presented) that indicates whether access is to be granted and/or a result of a verification analysis. In some instances, access granting and/or limiting is automatically affected. For example, upon a code verification, a user device and/or user may be automatically permitted to access a particular resource. Accessing a resource may include, for example, using a computational resource, possessing an item, receiving a service, entering a geographical area, and/or attending an event (e.g., generally or at a particular location).

Verification of an access-enabling code can further trigger a modification to access-enabling code data store 430. For example, a code that has been verified can be removed from the data store or associated with a new status. This modification may limit attempts to use a same code multiple times for resource access.

A combination of modules 414, 416, 418 comprise a secure addressable endpoint agent 420 that acts as an adapter and enables cross-device interfacing in a secure and reliable fashion so as to facilitate allocation of access-enabling codes and coordinate resource access. Secure addressable endpoint agent 420 can further generate a health signal that is transmitted to another device for monitoring of a status of a communication channel. The health signal is optionally a short message of a few bytes or many bytes in length that may be transmitted on a frequent basis (e.g., every few milliseconds or seconds). A communications manager 406 on the receiving device can then monitors the health signal provided by the agent to ensure that the communication link between the host server and device 400 is still operational.

In some instances, device 400 can include (or can be in communication with) a physical access control 432. Physical access control 432 can include a gating component that can be configured to provide a physical barrier towards accessing a resource. For example, physical access control 432 can include a turnstile or a packaging lock.

Physical access control 432 can be configured such that it can switch between two modes, which differ in terms of a degree to which user access to a resource is permitted. For example, a turnstile may have a locked mode that prevents movement of an arm of the turnstile and an unlocked mode that allows the arm to be rotated. In some instances, a default mode is the mode that is more limiting in terms of access.

Physical access control 432 can switch its mode in response to receiving particular results from code verification module 418. For example, upon receiving an indication that a code has been verified, physical access control 432 can switch from a locked mode to an unlocked mode. It may remain in the changed state for a defined period of time or until an action or event is detected (e.g., rotation of an arm).

Device 400 can also include one or more environmental sensors 434. Measurements from the sensor can processed by one or more application modules. Environmental sensor(s) 434 can include a global positioning system (GPS) receiver 435 that can receive signals from one or more GPS satellites. A GPS chipset can use the signals to estimate a location of device 400 (e.g., a longitude and latitude of device 400). The estimated location can be used to identify a particular resource (e.g., one being offered at or near the location at a current or near-term time). The identification of the particular resource can be used, for example, to identify a corresponding (e.g., user-associated) access-enabling code or to evaluate an access-enabling code (e.g., to determine whether it corresponds to a resource associated with the location).

The estimated location can further or alternatively be used to determine when to perform a particular function. For example, at a user device, detecting that the device is in or has entered a particular geographical region (e.g., is within a threshold distance from a geofence perimeter or entrance gate) can cause the device to retrieve or request an access-enabling code, conduct a verification analysis of the code and/or transmit the code to a client device.

It will be appreciated that environmental sensor(s) 434 can include one or more additional or alternative sensors aside from GPS receiver 435. For example, a location of device 400 can be estimated based on signals received by another receive from different sources (e.g., base stations, client point devices or Wi Fi access points). As another example, an accelerometer and/or gyroscope can be provided. Data from these sensors can be used to infer when a user is attempting to present an access-enabling code for evaluation.

It will also be appreciated that the components and/or engines depicted in figures herein are illustrative, and a device need not include each depicted component and/or engine and/or can include one or more additional components and/or engines. For example, a device can also include a user interface, which may include a touch sensor, keyboard, display, camera and/or speakers. As another example, a device can include a power component, which can distribute power to components of the device. The power component can include a battery and/or a connection component for connecting to a power source. As yet another example, a module in the application layer can include an operating system. As still another example, an application-layer control processor module can provide message processing for messages received from another device. The message processing can include classifying the message and routing it to the appropriate module. To illustrate, the message can be classified as a request for resource access or for an access-enabling code, an update message or an indication that a code has been redeemed or verified. The message processing module can further convert a message or command into a format that can interoperate with a target module.

It will further be appreciated that the components, modules and/or agents could be implemented in one or more instances of software. The functionalities described herein need not be implemented in separate modules, for example, one or more functions can be implemented in one software instance and/or one software/hardware combination. Other combinations are similarly be contemplated.

Further yet, it will be appreciated that a storage medium (e.g., using magnetic storage media, flash memory, other semiconductor memory (e.g., DRAM, SRAM), or any other non-transitory storage medium, or a combination of media, and can include volatile and/or non-volatile media) can be used to store program code for each of one or more of the components, modules and/or engines depicted in FIGS. 4 and 5 and/or to store any or all data stores depicted in FIG. 4 or described with reference to FIGS. 4 and/or 5. Any device or system disclosed herein can include a processing subsystem for executing the code. The processing system can be implemented as one or more integrated circuits, e.g., one or more single-core or multi-core microprocessors or microcontrollers, examples of which are known in the art.

Figure 6:
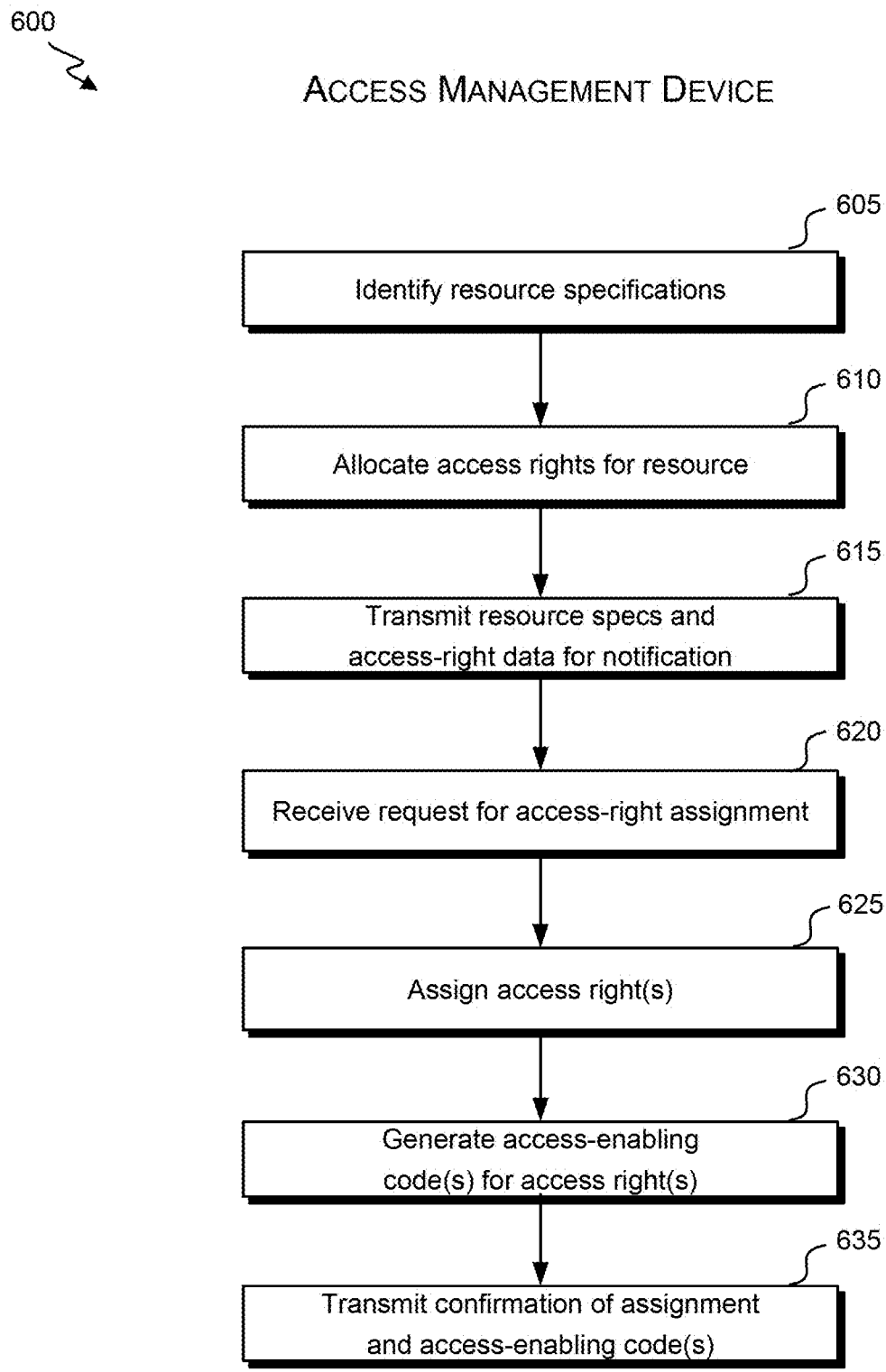
FIG. 6 illustrates a flowchart of an embodiment of a process for assigning access rights for resources.

FIG. 6 illustrates a flowchart of an embodiment of a process 600 for assigning access rights for resources. Process 600 can be performed by an access management system, such as access management system 185. Process 600 begins at block 605 where resource specification engine 502 identifies one or more specifications for a resource. The specifications can include, for example, a time at which the resource is to be available, a location of the resource, a capacity of the resources and/or one or more entities (e.g., performing entities) associated with the resource.

At block 610, resource-access allocation engine 504 allocates a set of access rights for the resource. In some instances, each of at least some of the access rights corresponds to a different access parameter, such as a different location (e.g., seat) assignment. Upon allocation, each of some or all of the access rights may have a status as available. A subset of the set of access rights can be immediately (or at a defined time) assigned or reserved according to a base assignment or reservation rule (e.g., assigning particular access rights to particular entities, who may be involved in or related to provision of the resource and/or who have requested or been assigned a set of related access rights.

At block 615, communication engine 506 transmits the resource specifications and data about the access rights. The transmission can occur in one or more transmissions. The transmission can be to, for example, one or more user devices and/or intermediate systems. In some instances, a notification including the specifications and access-right data is transmitted, and in some instances, a notification can be generated at a receiving device based on the specifications and access-right data. The notification can include, for example, a website that identifies a resource (via, at least in part, its specifications) and indicates that access rights for the resource are available for assignment. The notification can include an option to request assignment of one or more access rights.

At block 620, request management engine 512 receives a request for one or more access rights to be assigned to a user. The request can, for example, identify particular access rights and/or access parameters. The request can include or be accompanied by other information, such as identifying information. In some instances, the access management system can use at least some of such information to determine whether a fee for the access rights has been authorized. In some instances, the request is received via an intermediate system that has already handled such authorization.

At block 625, resource scheduling engine 514 assigns the requested one or more access rights to the user. The assignment can be conditioned on receipt of all required information, confirmation that the access right(s) have remained available for assignment, determining using data corresponding to the request that a bot-detection condition is not satisfied, fee provision and/or other defined conditions. Assignment of the access right(s) can include associating an identifier of each of the one or more rights with an identifier of a user and/or assignment and/or changing a status of the access right(s) to assigned. Assignment of the access right(s) can result in impeding or preventing other users from requesting the access right(s), being assigned the access right(s) and/or being notified that the access right(s) are available for assignment. Assignment of the access right(s) can, in some instances, trigger transmission of one or more communications to, for example, one or more intermediate systems identifying the access right(s) and indicating that they have been assigned and/or with an instruction to cease offering the access rights.

At block 630, encoding engine 516 generates an access-enabling code for each of the one or more access rights. The code can be generated, for example, as part of the assignment, as part of the allocation or subsequent to the assignment (e.g., upon detecting that a user is requesting access to the resource). Generating an access-enabling code can include applying a code-generation technique, such on one that generates a code based on a characteristic of a user, user device, current time, access right, resource, intermediate system or other variable. The access-enabling code can include a static code that will not change after it has been initially generated or a dynamic code that changes in time (e.g., such that block 630 can be repeated at various time points).

At block 635, communication engine 506 transmits a confirmation of the assignment and the access-enabling code(s) in one or more transmissions. The transmission(s) may be sent to one or more devices, such as a user device having initiated the request from block 620, a remote server or an intermediate system having relayed the request from block 620.

Figure 7A:
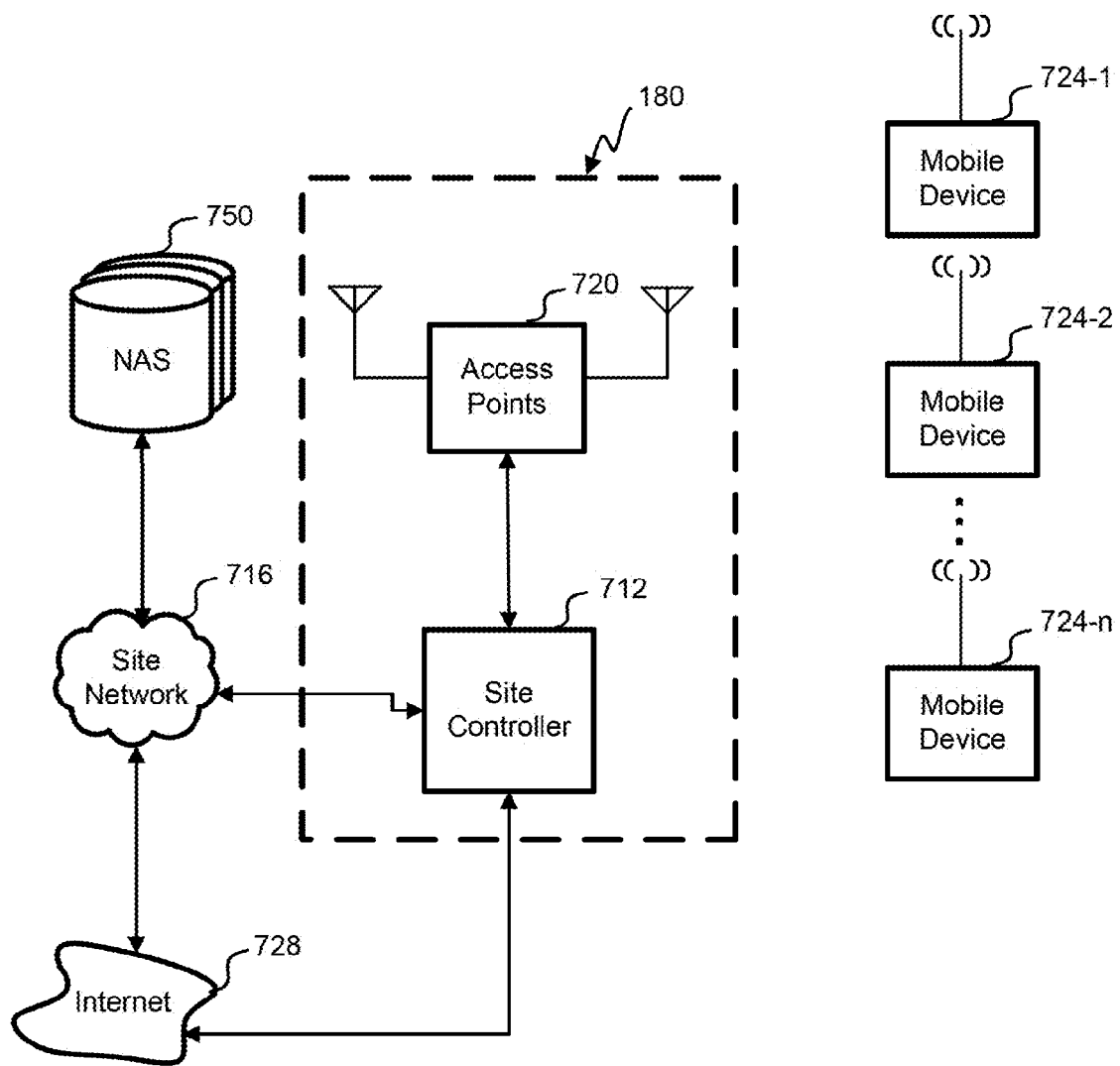
FIGS. 7A and 7B show embodiments of site systems in relations to mobile devices.

Referring to FIG. 7A, an embodiment of a site system 180 is shown in relation to mobile devices 724-n, Network Attached Storage (NAS) 750, site network 716 and the Internet 728. In some embodiments, for attendees of a live event or concert, site network 716 and site system 180 provide content, services and/or interactive engagement using mobile devices 724. Connections to site system 180 and site network 716 can be established by mobile devices 724 connecting to access points 720. Mobile devices 724 can be a type of end user device 110 that is portable, e.g., smartphones, mobile phones, tablets, and/or other similar devices.

Site network 716 can have access to content (information about attendees, videos, pictures, music, trivia information, etc.) held by NAS 750. Additionally, as described herein, content can be gathered from attendees both before and during the event. By connecting to site network 716, mobile device 724 can send content for use by site system 180 or display content received from NAS 750.

Figure 7B:
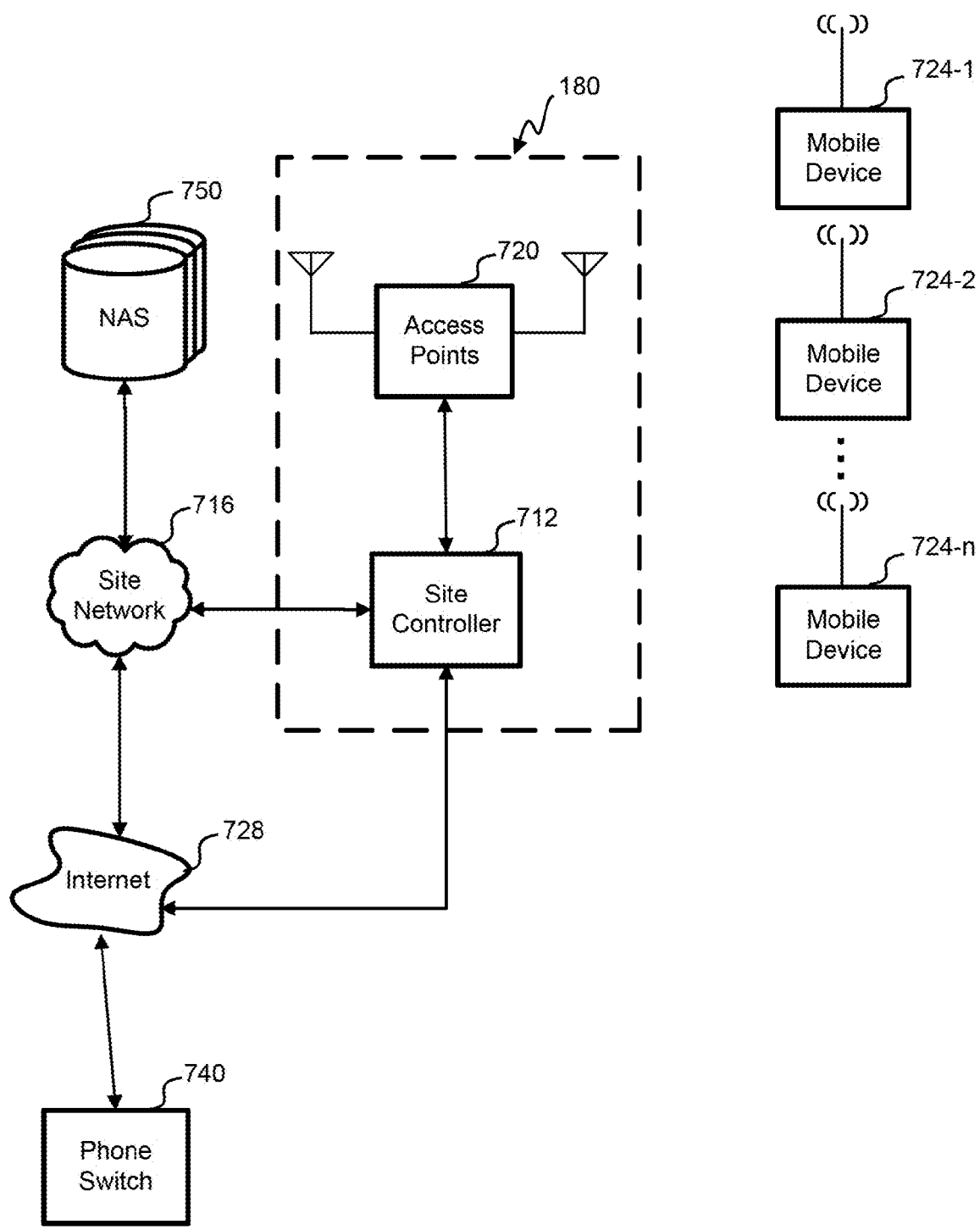

Referring to FIG. 7B, another embodiment of a site system 180 is shown in relation to mobile devices 724-n, Network Attached Storage (NAS) 750, site network 716 and the Internet 728, in an embodiment. FIG. 7B additionally includes phone switch 740. In some embodiments, phone switch 740 can be a private cellular base station configured to spoof the operation of conventionally operated base stations. Using phone switch 740 at an event site allows site system 180 to provide additional types of interactions with mobile devices 724. For example, without any setup or configuration to accept communications from site controller 712, phone switch 740 can cause connected mobile devices 724 to ring and, when answered, have an audio or video call be established. When used with other embodiments described herein, phone switch 740 can provide additional interactions. For example, some embodiments described herein use different capabilities of mobile devices 724 to cause mass sounds and/or establish communications with two or more people. By causing phones to ring and by establishing cellular calls, phone switch can provide additional capabilities to these approaches.

Figure 8:
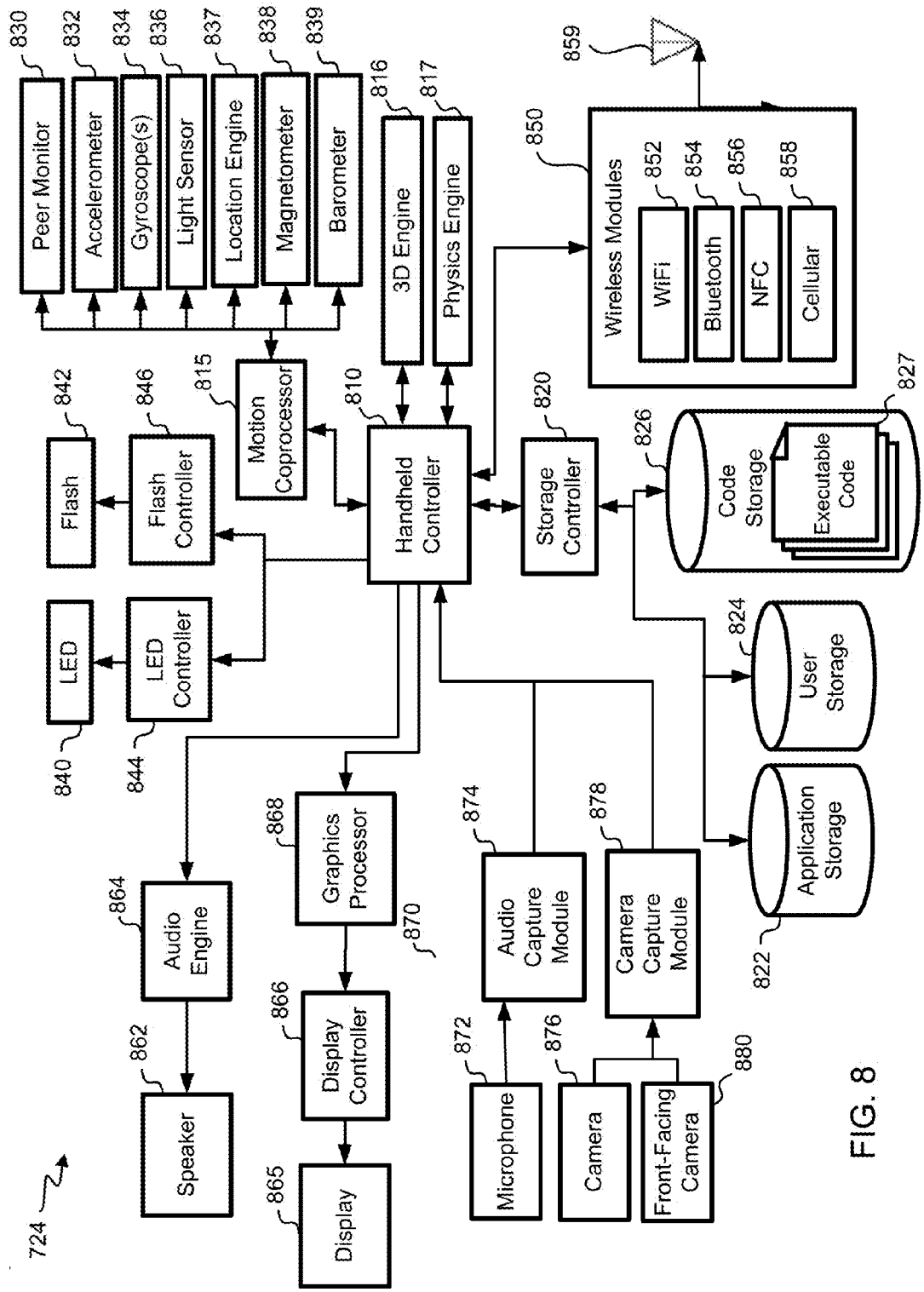
FIG. 8 shows a block diagram of user device according to an embodiment.

FIG. 8 shows a block diagram of user device 110 according to an embodiment. User device 110 includes a handheld controller 810 that can be sized and shaped so as enable the controller and user device 110 in a hand. Handheld controller 810 can include one or more user-device processors that can be configured to perform actions as described herein. In some instances, such actions can include retrieving and implementing a rule, retrieving an access-enabling code, generating a communication (e.g., including an access-enabling code) to be transmitted to another device (e.g., a nearby client-associated device, a remote device, a central server, a web server, etc.), processing a received communication (e.g., to perform an action in accordance with an instruction in the communication, to generate a presentation based on data in the communication, or to generate a response communication that includes data requested in the received communication) and so on.

Handheld controller 810 can communicate with a storage controller 820 so as to facilitate local storage and/or retrieval of data. It will be appreciated that handheld controller 810 can further facilitate storage and/or retrieval of data at a remote source via generation of communications including the data (e.g., with a storage instruction) and/or requesting particular data.

Storage controller 820 can be configured to write and/or read data from one or more data stores, such as an application storage 822 and/or a user storage 824. The one or more data stores can include, for example, a random access memory (RAM), dynamic random access memory (DRAM), read-only memory (ROM), flash-ROM, cache, storage chip, and/or removable memory. Application storage 822 can include various types of application data for each of one or more applications loaded (e.g., downloaded or pre-installed) onto user device 110. For example, application data can include application code, settings, profile data, databases, session data, history, cookies and/or cache data. User storage 824 can include, for example, files, documents, images, videos, voice recordings and/or audio. It will be appreciated that user device 110 can also include other types of storage and/or stored data, such as code, files and data for an operating system configured for execution on user device 110.

Handheld controller 810 can also receive and process (e.g., in accordance with code or instructions generated in correspondence to a particular application) data from one or more sensors and/or detection engines. The one or more sensors and/or detection engines can be configured to, for example, detect a presence, intensity and/or identify of (for example) another device (e.g., a nearby device or device detectable over a particular type of network, such as a Bluetooth, Bluetooth Low-Energy or Near-Field Communication network); an environmental, external stimulus (e.g., temperature, water, light, motion or humidity); an internal stimulus (e.g., temperature); a device performance (e.g., processor or memory usage); and/or a network connection (e.g., to indicate whether a particular type of connection is available, a network strength and/or a network reliability).

FIG. 8 shows several exemplary sensors and detection engines, including a peer monitor 830, accelerometer 832, gyroscope 834, light sensor 836 and location engine 838. Each sensor and/or detection engine can be configured to collect a measurement or make a determination, for example, at routine intervals or times and/or upon receiving a corresponding request (e.g., from a processor executing an application code).

Peer monitor 830 can monitor communications, networks, radio signals, short-range signals, etc., which can be received by a receiver of user device 110) Peer monitor 830 can, for example, detect a short-range communication from another device and/or use a network multicast or broadcast to request identification of nearby devices. Upon or while detecting another device, peer monitor 830 can determine an identifier, device type, associated user, network capabilities, operating system and/or authorization associated with the device. Peer monitor 530 can maintain and update a data structure to store a location, identifier and/or characteristic of each of one or more nearby user devices.

Accelerometer 832 can be configured to detect a proper acceleration of user device 110. The acceleration may include multiple components associated with various axes and/or a total acceleration. Gyroscope 834 can be configured to detect one or more orientations (e.g., via detection of angular velocity) of user device 110. Gyroscope 834 can include, for example, one or more spinning wheels or discs, single- or multi-axis (e.g., three-axis) MEMS-based gyroscopes.

Light sensor 836 can include, for example, a photosensor, such as photodiode, active-pixel sensor, LED, photoresistor, or other component configured to detect a presence, intensity and/or type of light. In some instances, the one or more sensors and detection engines can include a motion detector, which can be configured to detect motion. Such motion detection can include processing data from one or more light sensors (e.g., and performing a temporal and/or differential analysis).

Location engine 838 can be configured to detect (e.g., estimate) a location of user device 110. For example, location engine 838 can be configured to process signals (e.g., a wireless signal, GPS satellite signal, cell-tower signal, iBeacon, or base-station signal) received at one or more receivers (e.g., a wireless-signal receiver and/or GPS receiver) from a source (e.g., a GPS satellite, cellular tower or base station, or WiFi access point) at a defined or identifiable location. In some instances, location engine 838 can process signals from multiple sources and can estimate a location of user device 110 using a triangulation technique. In some instances, location engine 838 can process a single signal and estimate its location as being the same as a location of a source of the signal.

User device 110 can include a flash 842 and flash controller 846. Flash 842 can include a light source, such as (for example), an LED, electronic flash or high-speed flash. Flash controller 846 can be configured to control when flash 842 emits light. In some instances, the determination includes identifying an ambient light level (e.g., via data received from light sensor 836) and determining that flash 842 is to emit light in response to a picture- or movie-initiating input when the light level is below a defined threshold (e.g., when a setting is in an auto-flash mode). In some additional or alternative instances, the determination includes determining that flash 846 is, or is not, to emit light in accordance with a flash on/off setting. When it is determined that flash 846 is to emit light, flash controller 846 can be configured to control a timing of the light so as to coincide, for example, with a time (or right before) at which a picture or video is taken.

User device 110 can also include an LED 840 and LED controller 844. LED controller 844 can be configured to control when LED 840 emits light. The light emission may be indicative of an event, such as whether a message has been received, a request has been processed, an initial access time has passed, etc.

Flash controller 846 can control whether flash 846 emits light via controlling a circuit so as to complete a circuit between a power source and flash 846 when flash 842 is to emit light. In some instances, flash controller 846 is wired to a shutter mechanism so as to synchronize light emission and collection of image or video data.

User device 110 can be configured to transmit and/or receive signals from other devices or systems (e.g., over one or more networks, such as network(s) 170). These signals can include wireless signals, and accordingly user device 110 can include one or more wireless modules 850 configured to appropriately facilitate transmission or receipt of wireless signals of a particular type. Wireless modules 850 can include a Wi-Fi module 852, Bluetooth module 854, near-field communication (NFC) module 856 and/or cellular module 856. Each module can, for example, generate a signal (e.g., which may include transforming a signal generated by another component of user device 110 to conform to a particular protocol and/or to process a signal (e.g., which may include transforming a signal received from another device to conform with a protocol used by another component of user device 110).

Wi-Fi module 854 can be configured to generate and/or process radio signals with a frequency between 2.4 gigahertz and 5 gigahertz. Wi-Fi module 854 can include a wireless network interface card that includes circuitry to facilitate communicating using a particular standard (e.g., physical and/or link layer standard).

Bluetooth module 854 can be configured to generate and/or process radio signals with a frequency between 2.4 gigahertz and 2.485 gigahertz. In some instances, bluetooth module 854 can be configured to generate and/or process Bluetooth low-energy (BLE or BTLE) signals with a frequency between 2.4 gigahertz and 2.485 gigahertz.

NFC module 856 can be configured to generate and/or process radio signals with a frequency of 13.56 megahertz.

NFC module 856 can include an inductor and/or can interact with one or more loop antenna.

Cellular module 858 can be configured to generate and/or process cellular signals at ultra-high frequencies (e.g., between 698 and 2690 megahertz). For example, cellular module 858 can be configured to generate uplink signals and/or to process received downlink signals.

The signals generated by wireless modules 850 can be transmitted to one or more other devices (or broadcast) by one or more antennas 859. The signals processed by wireless modules 850 can include those received by one or more antennas 859. One or more antennas 859 can include, for example, a monopole antenna, helical antenna, intenna, Planar Inverted-F Antenna (PIFA), modified PIFA, and/or one or more loop antennae.

User device 110 can include various input and output components. An output component can be configured to present output. For example, a speaker 862 can be configured to present an audio output by converting an electrical signal into an audio signal. An audio engine 864 can effect particular audio characteristics, such as a volume, event-to-audio-signal mapping and/or whether an audio signal is to be avoided due to a silencing mode (e.g., a vibrate or do-not-disturb mode set at the device).

Further, a display 866 can be configured to present a visual output by converting an electrical signal into a light signal. Display 866 may include multiple pixels, each of which may be individually controllable, such that an intensity and/or color of each pixel can be independently controlled. Display 866 can include, for example, an LED- or LCD-based display.

A graphics engine 868 can determine a mapping of electronic image data to pixel variables on a screen of user device 110. It can further adjust lighting, texture and color characteristics in accordance with, for example, user settings.

In some instances, display 866 is a touchscreen display (e.g., a resistive or capacitive touchscreen) and is thus both an input and an output component. A screen controller 870 can be configured to detect whether, where and/or how (e.g., a force of) a user touched display 866. The determination may be made based on an analysis of capacitive or resistive data.

An input component can be configured to receive input from a user that can be translated into data. For example, as illustrated in FIG. 8, user device 110 can include a microphone 872 that can capture audio data and transform the audio signals into electrical signals. An audio capture module 874 can determine, for example, when an audio signal is to be collected and/or any filter, equalization, noise gate, compression and/or clipper that is to be applied to the signal.

User device 110 can further include one or more cameras 876, 880, each of which can be configured to capture visual data (e.g., at a given time or across an extended time period) and convert the visual data into electrical data (e.g., electronic image or video data). In some instances, user device 110 includes multiple cameras, at least two of which are directed in different and/or substantially opposite directions. For example, user device 110 can include a rear-facing camera 876 and a front-facing camera 880.

A camera capture module 878 can control, for example, when a visual stimulus is to be collected (e.g., by controlling a shutter), a duration for which a visual stimulus is to be collected (e.g., a time that a shutter is to remain open for a picture taking, which may depend on a setting or ambient light levels; and/or a time that a shutter is to remain open for a video taking, which may depend on inputs), a zoom, a focus setting, and so on. When user device 110 includes multiple cameras, camera capture module 878 may further determine which camera(s) is to collect image data (e.g., based on a setting).

Figure 9:
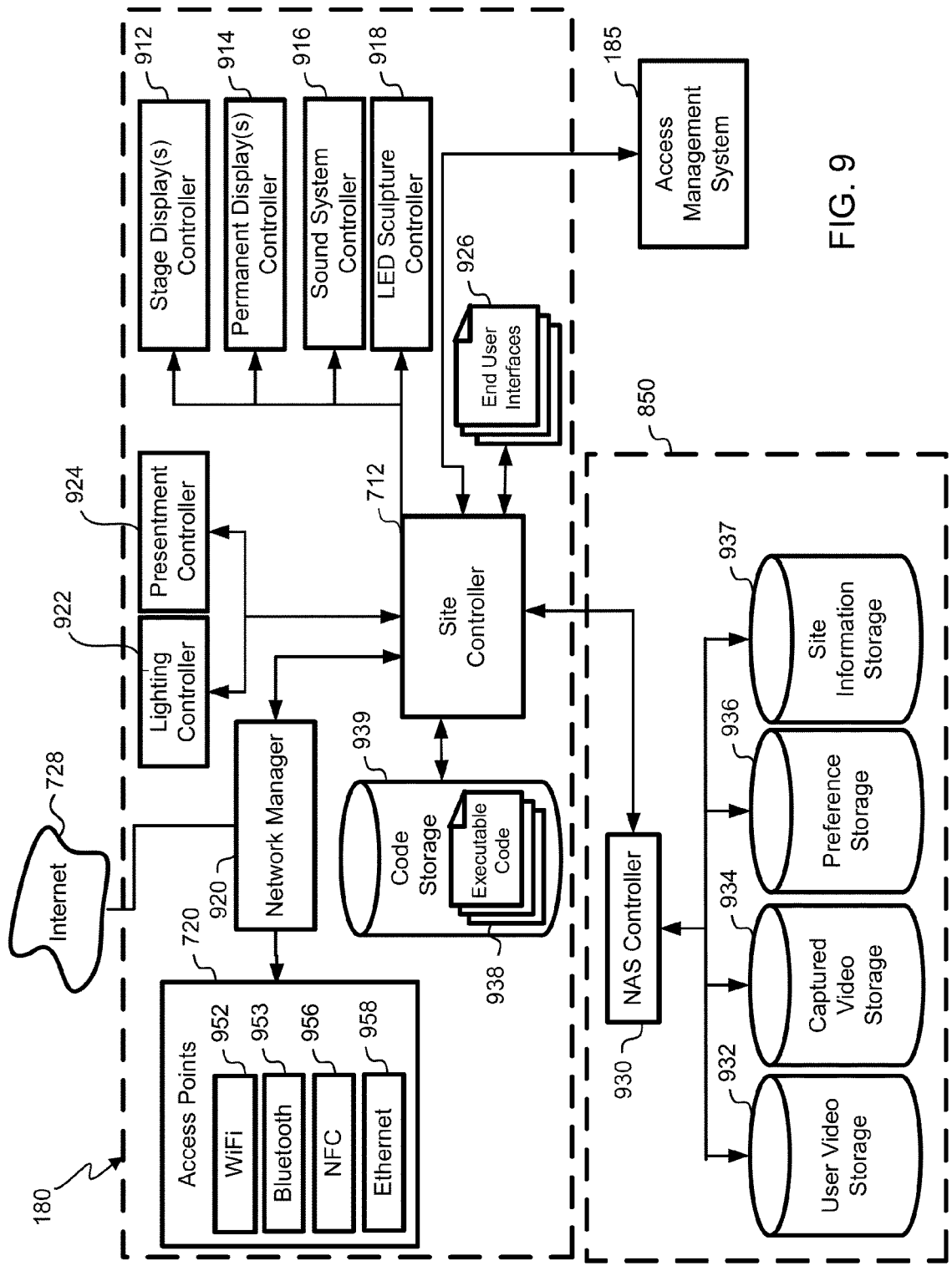
FIG. 9 illustrates sample components of an embodiment of site system 180, including connections to a NAS and access management system.

FIG. 9 illustrates sample components of an embodiment of site system 180, including connections to NAS 750 and access management system 185. Embodiments of site controller 712 use network manager 920 to connect via access points 720 (using e.g., WiFi 952, Bluetooth 953, NFC 956, Ethernet 958, and/or other network connections) to other network components, such as site network 716 and mobile devices 724. In some embodiments, site system 280 uses site controller 712 to control aspects of an event venue. A broad variety of venue features can be controlled by different embodiments, including: permanent lights (e.g., with lighting controller 922), stage lights (e.g., with presentment controller 924), stage display screens (e.g., with stage display(s) controller 912), permanent display screens (e.g., with permanent display(s) controller 914), and the venue sound system (e.g., with the sound system controller 916).

A more detailed view of NAS 750 is shown, including NAS controller 930 coupled to user video storage 932, captured video storage 934, preference storage 936, and 3D model 938. Captured video storage 934 can receive, store and provide user videos received from mobile devices 724. In some embodiments, site controller 712 triggers the automatic capture of images, audio and video from mobile devices 724, such triggering being synchronized to activities in an event. Images captured by this and similar embodiments can be stored on both the capturing mobile device 724 and user video storage 932. In an embodiment, site controller 712 can coordinate the transfer of information from mobile devices to NAS 750 (e.g., captured media) with activities taking place during the event. When interacting with mobile devices 724, some embodiments of site controller 712 can provide end user interfaces 926 to enable different types of interaction. For example, as a part of engagement activities, site controller may offer quizzes and other content to the devices. Additionally, with respect to location determinations discussed herein, site controller can supplement determined estimates with voluntarily provided information using end user interfaces 926, stored in a storage that is not shown.

In some embodiments, to guide the performance of different activities, site controller 712 and/or other components may use executable code 938 tangibly stored in code storage 939. In some embodiments, site information storage 937 can provide information about the site, e.g., events, seat maps, attendee information, geographic location of destinations (e.g., concessions, bathrooms, exits, etc.), as well as 3D models of site features and structure.

Figure 10A:
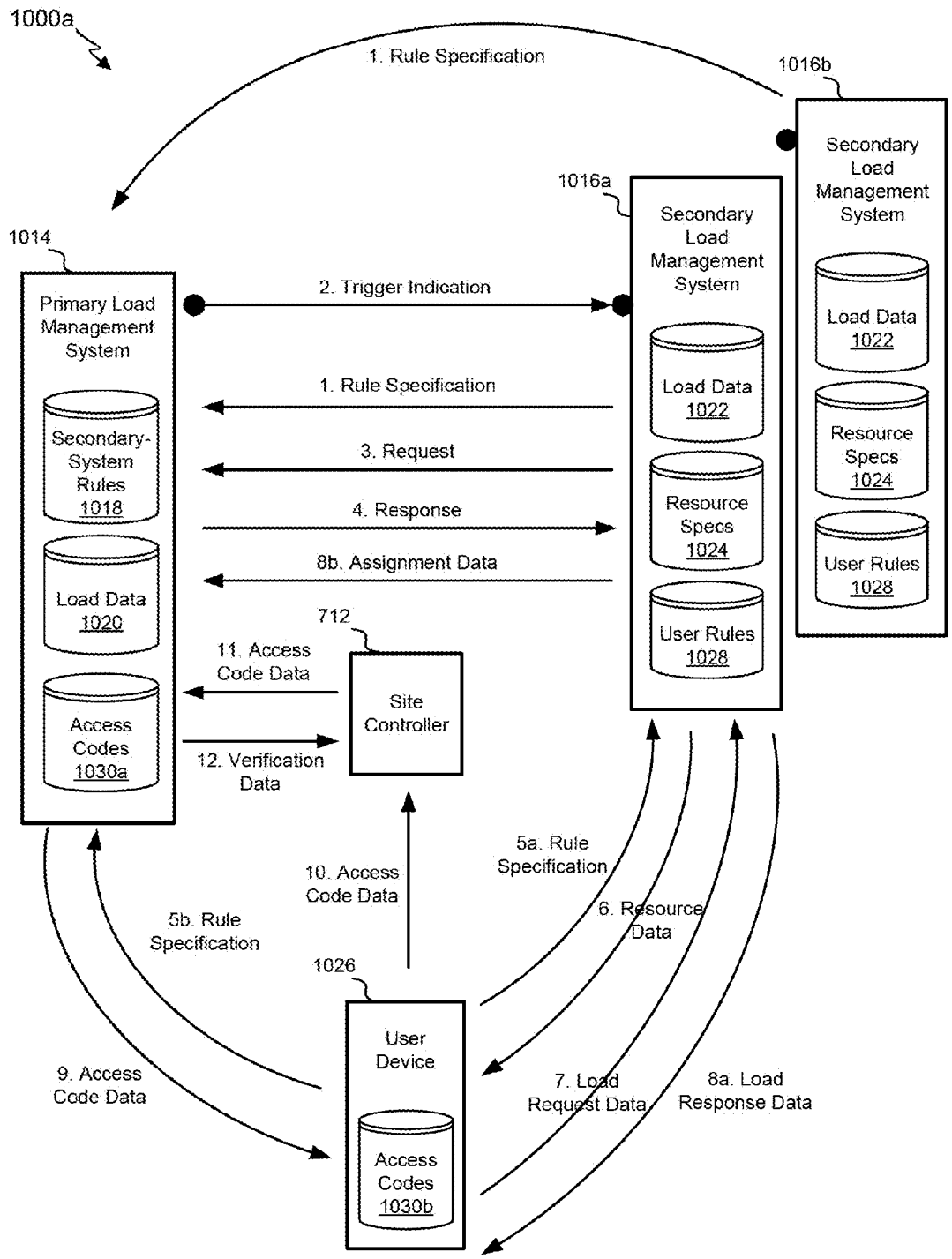
FIGS. 10A and 10B illustrate examples of communication exchanges involving primary and secondary load management systems.

Referring next to FIG. 10A, an example of a communication exchange 1000a involving primary load management system 1014 and each of a plurality of secondary load management systems 1016a, 1016b is shown. In some instances, secondary load management system 1016a is managed by an entity different than an entity that manages secondary load management system 1016b. Primary load management system 1014 may include and/or share properties with a primary assignment management system 214. Each of one or both of secondary load management system 1016a and 1016b may include or correspond to a secondary assignment system 216. Communications shown in FIG. 10 may be transmitted over one or more networks, such as network 270, the Internet and/or a short-range network.

In one instance, one of secondary load management system 1016a or 1016b is managed by a same entity as manages primary load management system 1014. In one instance, each of secondary load management system 1016 and 1016b is managed by an entity different than an entity managing primary load management system 1014. Primary load management system 1014 can include a system that, for example, manages a master access-right assignment data store, distributes access codes, performs verification data for access attempts, and so on. Secondary load management systems 1016a, 1016b can include systems that, for example, facilitate assignment of access codes to users. For example, secondary load management systems 1016a, 1016b can be configured to request allocation of access-right slots, which may result in a temporary or final allocation or assignment to the system, a hold on the access-right slots, and/or a distribution of data pertaining to the slot(s). Secondary load management systems 1016a, 1016b may then facilitate transmission of the access-right slots to one or more users and identify a user that has requested (e.g., and provided payment information for) one or more particular access-right slots. The secondary load management system can then facilitate an assignment of the access-right slots by (for example) transmitting one or more access codes to the user device, identifying the user to primary load management system 1014 or updating assignment data.

Communication exchange 1000a begins with transmission of one or more rule specifications from each secondary load management system 1016a, 1016b to primary load management system 1014. The rule specification can include one or more request parameters identify parameters of a load requested for allocation. For example, a rule specification can include a specification pertaining to a size of a desired load (e.g., corresponding to a number of access-right slots, such as seats). The specification may include a particular number or a threshold. A rule specification can include a specification of a type of at least part of the load, such as one that identifies a resource or type of resource and/or one that identifies a characteristic of one or more access-right slots (e.g., a location). The specification may include a first allocation parameter that may identify a value for which access-right slots are being requested.

In some instances, a rule and/or request corresponds to a single resource, while in others, the rule and/or request corresponds to multiple resources. For example, a request may be for access-right results pertaining to each of three resources or to each resource available at a location in a season. Thus, in some instances, a rule specification identifies or is indicative of a number of resources. Resources may, but need not, be specifically identified in a rule specification, rule and/or request. For example, a rule specification may indicate that a defined number or range (e.g., 100-200) of access-right slots is requested for any given resource within a defined time period (e.g., year).

A rule specification can include an allocation parameter that identifies a parameter for allocating a load should it be allocated to the secondary load management system. To illustrate, secondary load management system 1016a, 1016b may be configured to receive allocations of access-right slots but to attempt to facilitate assignment of the access-right slots to users. Communication exchange 1000a can be configured so as to promote facilitated distribution to users upon allocation of access-right slots to a secondary load management system. Early provision of allocation parameters by a secondary load management system can promote such quick facilitated distribution.

For example, an allocation parameter can identify one or more communication channels (e.g., webpages, portals, information-distribution protocols, email addresses, etc.) for transmitting information pertaining to at least part of the load to each of one or more devices and/or an a second allocation parameter. This information may enable primary load management system 1014 to (for example) automatically provide information pertaining to allocated access-right slots via the communication channel(s) and/or to verify that allocation parameters comply with one or more primary-system rules (e.g., that may include an upper and/or lower threshold for an allocation parameter and/or limits on which communication channels may be used).

Primary load management system 1014 can define a rule for each secondary load management system 1016a, 1016b based on the rule specifications. The rules can be stored in a secondary system rules data store 1018.

Primary load management system 1014 can further include a load data store 1020. Load data store 1020 can include, for example, information pertaining to which access-right slots for a given resource are available and information pertaining to each of those slots. Load data store 1020 can further identify information pertaining to one or more defined loads, such as which access-right slots are corresponding to the load, to which secondary load management system a load has been allocated, whether an allocation includes any restrictions (e.g., time limits).

Primary load management system 1014 can assess whether a set of available access-right slots corresponds to request parameters identified in any secondary-system rules. For example, it can be determined whether a resource type corresponds to that specified in a request parameter, whether a quantity (and/or contiguous quantity) corresponds to that specified in a request parameter, whether a type of the access-right slots corresponds to that specified in a request parameter, and/or whether the quantity of access-right slots can be allocated for a value that corresponds to a first allocation parameter specified in a request parameter (e.g., the determination being based on defined values or thresholds associated with the access-right slots and/or a primary-system rule).

In some instances, it may be determined that request parameters identified in rules for multiple secondary load management system correspond to a same load or to a same at least part of a load. Primary load management system 1014 may include a switch, such as a content switch, that may evaluate a load, rules and/or systems to determine to which secondary load management system 1016 a load is to be allocated or identified. In these instances, the rules and/or systems may be prioritized to determine to which entity the load is to be allocated. The prioritization may depend on, for example, defined prioritizations of the systems, a time at which rule specifications were submitted (e.g., prioritizing early submission), a size parameter (e.g., prioritizing either lower or larger size requests), and/or first allocation parameters (e.g., prioritizing larger first allocation parameters).

It will be appreciated that, in various instances, a load may be generated in response to evaluation of a load (e.g., in an attempt to define a load that accords with request parameters), or a load may be first defined (e.g., based on which access-right slots remain available and/or distribution priorities of the primary load management system) and it is then determined which rule to which the load corresponds. In some instances, a primary-system rule as to which access-right slots are to be included in a load and/or a secondary-system rule as to which access-right slots are requested may depend on information, such as an environmental characterization (e.g., weather forecast) corresponding to a resource, a throughput monitor (e.g., identifying a probability of a performing entity in being positioned in a playoff or other game) and/or a discrepancy associated with a resource (e.g., a spread or line associated with a resource). In some instances, a primary-system rule and/or secondary-system rule may include a function that relates an environmental characteristic, throughput characteristic and/or discrepancy with an allocation parameter (e.g., such that larger discrepancies, poorer environmental characteristics and/or lower throughput prospects result in lower allocation parameters).

When it is determined that a load corresponds to a secondary-system rule (and/or any prioritization is performed), primary load management system can transmit a trigger indication to the associated secondary load management system 1016*a*. The trigger indication may identify characteristics of the load (e.g., a size, type of one or more access-right slots, resource, and/or allocation value). In some instances, the trigger indication may identify a rule and/or what specifications were defined in the triggered rule.

In some instances, communication exchange 1000*a* is configured so as to provide a secondary load management system 1016*a* a defined time period for transmitting a request responsive to a trigger indication. Access-right slots may, but need not, be placed on hold for the time period. Should a request not be received within the time period, primary load management system 1014 may transmit a same or different trigger indication to another secondary load management system with a rule corresponding to the load or may redefine a load so as to correspond with a rule of another secondary load management system and transmit a trigger indication accordingly. In some instances, a trigger indication is simultaneously transmitted to multiple secondary load management systems 1016, and a load may be allocated to a system that thereafter requests the load (e.g., in accordance with a first-responder or other secondary-system selection technique).

Secondary load management system 1016*a* can then transmit a request communication back to primary load management system that requests the load. Primary load management system 1014 can then transmit a response communication that confirms that the load is being allocated. In some instances, the response communication is transmitted subsequent to or in temporal proximity of a time at which a charge is issued or collected for the load. In some instances, then response communication includes further information about the load. For example, location of access-right slots in the load may be more precisely identified.

Secondary load management system 1016*a* can store data pertaining to the load in a load data store 1022. Load data store 1022 may further track statuses of access-right slots so as to be able to identify which access-right slots have been assigned to users. Secondary load management system 1016*a* can further manage and/or have access to a resource specification data store 1024 that can associate identifiers of various resources with corresponding information. The resource specifications may be, for example, included in a trigger-information or response communication from primary load management system 1014; identified via an external search (e.g., web crawl), and so on. Resource specifications may include, for example, a location, one or more performing entities and/or a date and time.

A user device 1026 can also transmit rule specifications to one or more of primary load management system 1014 and 1016*a*. The rule specifications may include request parameters, such as a size specification, type specification and/or assignment value (e.g., that may be precisely identified or a threshold). When rule specifications are transmitted and/or availed to secondary load management system 1016*a*, a corresponding user rule can be defined for the user device and/or user.

Secondary load management system 1016*a* can distribute data of a resource (or multiple resources) corresponding to the load allocated to the system. The resource data can include one or more resource specifications stored at resource specification data store 1024. The resource data may further include data associated with one or more access-right slots included in the load. For example, the resource data may identify a time and location of a resource and a location of each of one or more access-right slots. In some instances, the resource data further includes an allocation parameter, such as the second allocation parameter and/or one defined based thereupon included in a secondary-system rule specification or included in a rule associated with secondary load management system 1016*a*.

In some instances, secondary load management system 1016*a* controls the transmission of the resource data to one or more user devices 1026. In some instances, primary load management system 1014 facilitates the transmission. For example, the data may be identified in a webpage hosted, controlled and/or managed by secondary load management system 1016*a*, but primary load management system 1016 may have authorization to update the webpage, and thus primary load management system can update the secondary-system to include the resource data.

In some instances, resource data is selectively transmitted to user devices. For example, resource data may be transmitted only to the user devices associated with user rules corresponding with at least part of the load.

User device 1026 can request assignment of at least part of the load. The user request can identify, for example, one or more access-right slots (e.g., and/or one or more resources). Secondary load management system 1016*a* can evaluate the request and respond with load response data. Such a response may be conditioned (for example) on confirming payment information. The load response data may (for example) indicate that the assignment has been accepted and/or include confirmation data. Upon such acceptance, secondary load management system 1016*a* can also transmit assignment data to primary load management system. The load data can include an identification of the user device (or corresponding information, such as a name, email, account, device identifier or phone number of a corresponding user) and/or one or more access-right slots being assigned. Primary assignment management system can update an assignment data store and/or load data store 1020 to reflect the assignment.

Primary load management system 1014 can then retrieve access code data from an access code data store 1030 and transmit the access code data to user device 1026. The access code data can correspond to the one or more access rights being assigned to the user. The access code data can be transmitted (for example) immediately, at a defined time (e.g., relative to a time of a resource), or upon receiving a request (e.g., triggered by a user input or detecting that a user device has crossed a geofence corresponding to a resource).

User device 1026 can store the access code(s) in an access-code data store 1030*b*. Subsequently, user device 1026 can retrieve the access-code data and transmitting it to a site controller 712 (e.g., upon detecting the site controller, upon receiving a request from the site controller or in response to detecting a corresponding user input). Site controller 712 can include one located at a resource location. Site controller 712 can transmit the access-code data to primary load management system 1014, which can then determine whether the code is a valid code, has not been previously redeemed and/or corresponds to one or more characteristics (e.g., a resource associated with or identified by the site controller, a time, a device characteristic, etc.). A result of such determination(s) can be transmitted back to site controller 712 such that a user can then be granted or denied requested access to a resource.

It will be appreciated that one, more or all communications represented in communication exchange 1000a can be transmitted via (for example) a web site, a web portal, another portal, an email exchange, a message (e.g., SMS message) exchange, and/or an API.

It will be appreciated that part or all of a communication exchange can be performed in an automated or semi-automated manner. For example, one or more rules (e.g., secondary-system rules or user rules) can be defined so as to trigger automatic allocation or assignment upon detecting data that corresponds to request parameters in the rules. As another example, the one or more rules can be defined so as to trigger a notification communication to the user device or secondary load management system that includes an alert that the request parameters are satisfied and enable to user device or secondary load management system to transmit a request for allocation or assignment.

It will also be appreciated that various modifications to communication exchange 1000a are contemplated. For example, in one instance, secondary load management system 1016a may at least partly manage access codes. For example, one or more access codes corresponding to a load may be transmitted from primary load management system 1014 to secondary load management system 1016a as part of a response. Secondary load management system 1016a may then transmit select access codes to a user device 1026, and (in various instances) either primary load management system 1014 or secondary load management system 1016a may provide verification of the code to site controller 712.

Figure 10B:
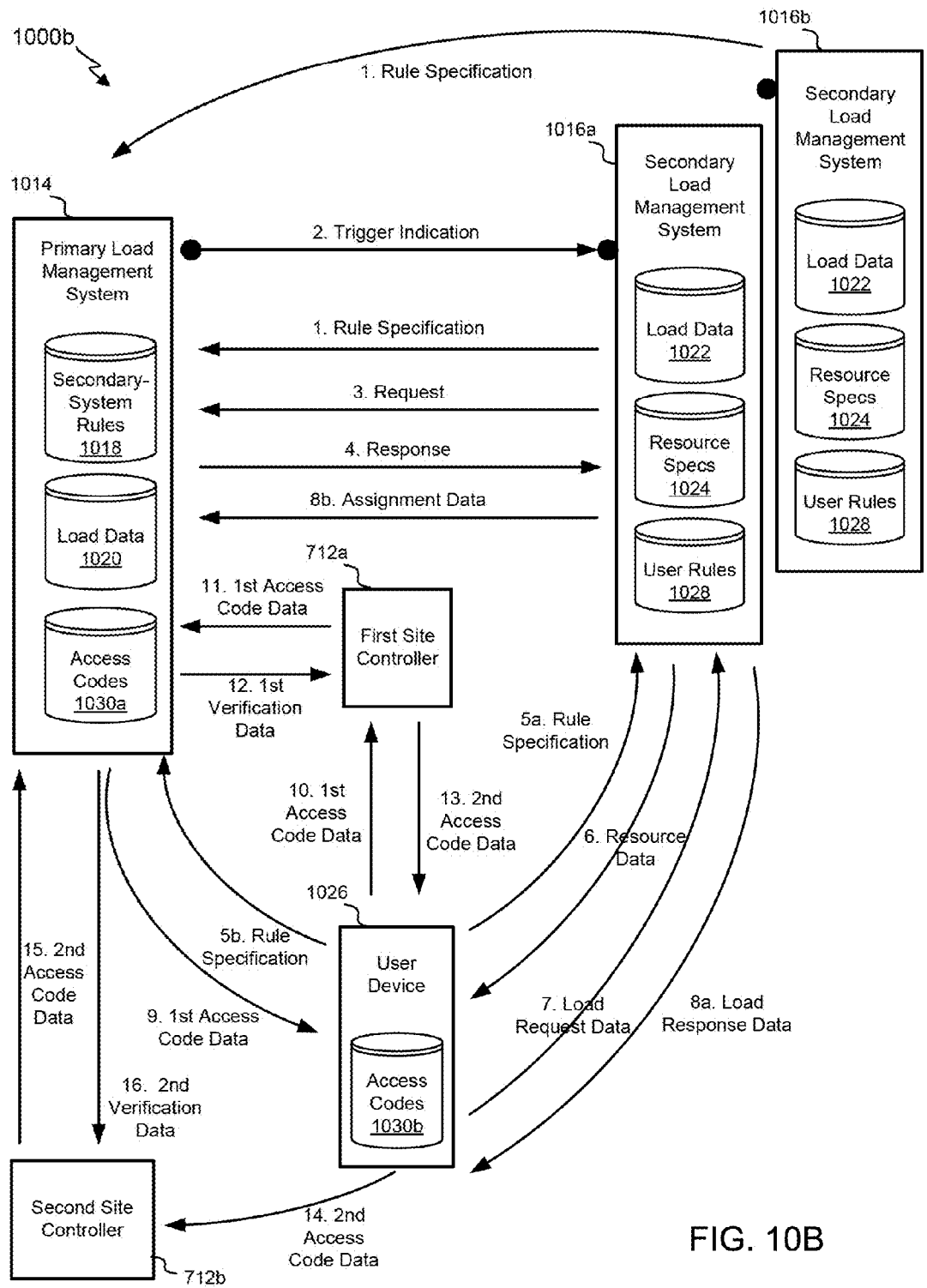

Referring next to FIG. 10B, another example of a communication exchange 1000b involving primary load management system 1014 and each of a plurality of secondary load management systems 1016a, 1016b is shown. In this instance, two different types of access code data are associated with an assignment.

As shown, in response to an initial assignment of an access-right slot, primary load management system 1014 transmits first access code data to user device 1026. The first access code data may include data representing that access to a resource has been authorized. However, in this instance, the first access code data may lack a precision of association that would associate the first access code data with one or more particular access characteristics. For example, the data may lack information that would identify a particular location within a resource area for which access is to be granted.

Subsequently (e.g., after a predefined time period, such as within a defined period from a resource time; and/or when a user device 1026 crosses a geofence corresponding to a resource, and/or when a user device 1026 receives input or a site-controller request indicating that access data is to be transmitted to a nearby site controller), user device 1026 may retrieve the first access code data and transmit it (e.g., via a short-range communication) to a first site controller 712a.

First site controller 712a may communicate with primary load management system 1014 to verify the data, in a manner similar to that described herein. Upon detecting that the first access code data has been verified, first site controller 712a can transmit second access code data to user device 1026. The second access code data have a precision of association that associates the data with one or more particular access characteristics (e.g., one or more seats). The second access code data may be, for example, generated at first site controller 712a or received from primary load management system (e.g., as part of the verification communication or as part of another communication). The particular access characteristics may be identified based on, for example, a technique described in U.S. application Ser. No. 14/063,929, filed on Oct. 25, 2013, which is hereby incorporated by reference in its entirety for all purposes. The particular access characteristics may be identified based on, for example, for which and/or how many access-right results first access code data had been previously verified and/or which and/or how many second access codes had been generated and/or transmitted.

The second access code data may indicate where access to a resource is authorized, and user device 1026 may thus move to a corresponding location. In some instance, a second site controller 712b is associated with the corresponding location. User device 1026 may then transmit the second access code data (e.g., when user device 1026 detects that it has crossed a geofence corresponding to the location and/or when user device 1026 receives input or a site-controller request indicating that access data is to be transmitted to a nearby site controller) to second site controller 712b. Second site controller 712b can determine whether the code is verified (e.g., valid, has not been previously used, and/or corresponds to the user device 1026 and/or location). The determination can include (for example) transmitting the second access code data to another device (e.g., primary load management system 1014, a local server, or another site controller, such as first site controller 712a) and receiving second verification data that indicates whether the second access code data is verified. The determination can, alternatively or additionally, include a local determination, which may be based (for example) on comparing the second access code data to data in a local access-code data store to determine whether there is a match and/or whether the second access code data (or corresponding access code data that is associated with same one or more particular characteristics) has been previously verified. The local access-code data store may be populated by second site controller 712b, for example, in response to communications from one or more other site controllers and/or primary load management system 1014 that identify second access code data that have been issued.

Figure 11:
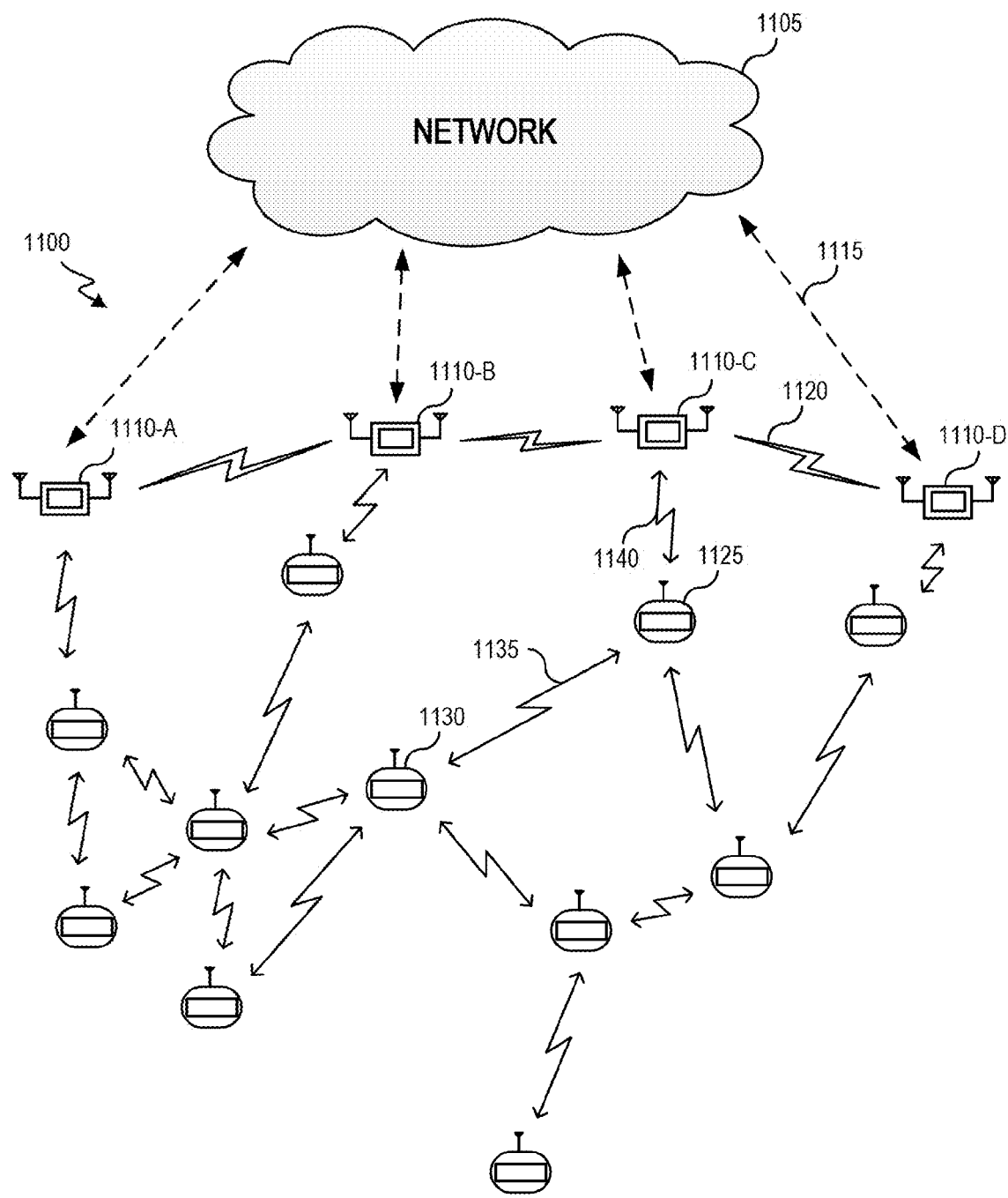
FIG. 11 is a block diagram illustrating a network interaction system according to an embodiment of the present disclosure.

FIG. 11 is a block diagram illustrating network interaction system 1100 according to an embodiment of the present disclosure. Network interaction system 1100 can facilitate long or short-range communication between network devices that are located within a defined spatial area (e.g., a venue). In some instances, network interaction system 1100 can include a mesh network that facilitates Internet access for user devices that are connected to the mesh network. Network interaction system 1100 can include or be connected to network 1105 (which can be a cloud-based network as shown in FIG. 11), supernodes 1110-A through 1110-D, and user devices (e.g., user devices 1125 and 1130). For example, network interaction system 1100 can include a plurality of network devices that are wirelessly connected in a mesh network. In this example, each network device of the plurality of network devices can be a user device or a supernode. Further, for example, a network device can be configured to receive data from a first network device over a first communication link (e.g., Bluetooth, Wi-Fi, Zigbee, etc.), and to forward (e.g., relay) the data to a second network device over a second communication link (e.g., Bluetooth, Wi-Fi, Zigbee, etc.). In this example, the data can be transmitted along a path of network devices towards a supernode within the mesh network. Further, while network interaction system 1100 can include supernodes 1110-A through 1110-D and a plurality of user devices, the present disclosure is not limited thereto. Network interaction system 1100 can include any number of supernodes and user devices.

In some instances, network interaction system 1100 (e.g., a mesh network) can be established when a user device broadcasts a network initiation request that facilitates establishment of a mesh network within a defined spatial area (e.g., a venue). For example, a network initiation request can include an identifier (e.g., a MAC address) of the transmitting user device and data representing a request to establish a wireless communication channel. The network initiation request can be broadcasted wirelessly (e.g., over a Bluetooth channel). If a surrounding supernode or user device receives the broadcasted network initiation request, the supernode or user device can transmit an acknowledgment message to the broadcasting user device indicating that the supernode or user device is within a defined proximity (e.g., the range of the wireless communication channel, such as 100 feet for Wi-Fi, 30 feet for Bluetooth, etc.) from the broadcasting user device. For example, the network initiation request can include an identifier (e.g., a MAC address) of the network device that received the network initiation request and data representing an acceptance of the request to establish a wireless communication link. In some instances, the defined proximity can be a physical proximity (e.g., 30 feet, 100 feet, etc.). In other instances, the defined proximity can be a functional proximity. For example, a functional proximity can refer to proximity of communication over a particular type of network. In this example, network devices that are functionally proximate to a user device are network devices that can communication with the user device over a particular network (e.g., user devices connected to a particular Wi-Fi access point).

Network 1105 may be one or more networks installed in a defined spatial area (e.g., a venue or stadium) to facilitate network connectivity for a small or large number of user devices. As illustrated in the example of FIG. 11, network 1105 can include a cloud-based network including one or more remote servers and data stores. Other examples of network 1105 can include an open network, such as the Internet, personal area network, local area network (LAN), campus area network (CAN), metropolitan area network (MAN), wide area network (WAN), wireless local area network (WLAN), a private network, such as an intranet, extranet, or other backbone. Further, network 1105 may include any number of routers, access points, switches, bridges, repeaters, workstations, servers, etc.

Supernodes 1110-A, 1110-B, 1110-C, and 1110-D may include electronic devices that are located in the spatial region. For example, supernodes 1110-A, 1110-B, 1110-C, and 1110-D may include portable electronic devices (e.g., smart phones, tablets, laptop computers or smart wearable devices) or non-portable electronic devices (e.g., one or more desktop computers, electronic kiosks, servers and/or processors). Supernodes 1110-A, 1110-B, 1110-C, and 1110-D may be the same type of device or different types of devices. In addition, supernodes 1110-A, 1110-B, 1110-C, and 1110-D may be configured as Internet-facing proxy servers. An Internet-facing proxy server is as an intermediary server for handling requests from user devices seeking resources from other servers. Further, supernodes 1110-A, 1110-B, 1110-C, and 1110-D may be configured to directly connect to an access point (not shown) of network 1105. In some embodiments, supernodes 1110-A, 1110-B, 1110-C, and 1110-D may be configured to include network interface cards to facilitate the connection to the access points of network 1105. For example, the network interface cards may be Ethernet cards (e.g., in the case of a wired connection to the access point) or wireless adapters (e.g., in the case of a wireless connection to the access point).

In addition, the network interface cards of supernodes 1110-A, 1110-B, 1110-C, and 1110-D may be configured to directly communicate with other supernodes. For example, supernode 1110-A may wirelessly connect to surrounding supernodes 1110-B, 1110-C, and 1110-D over wired connections and/or wireless communication links (e.g., communication link 1120). Communication link 1120 may include a short-range communication channel, such as Bluetooth, Bluetooth Low Energy channel, Wi-Fi, Zigbee, etc. Communicating using short-range communication such as BLE channel can provide advantages, such as consuming less power, being able to communicate across moderate distances, being able to detect levels of proximity, achieving high-level security based on encryption and short ranges, and not requiring pairing for inter-device communications. In some embodiments, supernodes 1110-A, 1110-B, 1110-C, and 1110-D may be connected to each other via a wired network connection (e.g., Intranet or Ethernet).

When supernodes 1110-A, 1110-B, 1110-C, and 1110-D communicate directly with each other (e.g., transmitting and receiving data packets from one supernode to another), a decentralized mesh network (e.g., network interaction system 1100) can be established. Each of supernodes 1110-A, 1110-B, 1110-C, and 1110-D can be connected to two networks (i.e., network 1105 and network interaction system 1100 (e.g., a mesh network)). For example, supernode 1110-D can be connected to network interaction system 1100 (e.g., through one or more user devices or other supernodes), and can also be connected to network 1105 using communication link 1115 (e.g., that is connected to a Wi-Fi access point of network 1105).

Supernodes 1110-A, 1110-B, 1110-C, and 1110-D may each be located within a defined spatial area. Further, supernodes 1110-A, 1110-B, 1110-C, and 1110-D may be configured to execute various applications to facilitate various tasks. Supernodes 1110-A, 1110-B, 1110-C, and 1110-D may or may not include displays for displaying information relating to the various applications.

The user devices illustrated in FIG. 11 can include user devices 1125 and 1130. User devices 1125 and 1130 can also be located in the same spatial region as supernodes 1110-A through 1110-D. In some instances, user devices 1125 and 1130 may include portable electronic devices (e.g., smart phones, tablets, laptop computers or smart wearable devices) that are operated by users (e.g., User A 105, etc.) within the defined spatial area. For example, user devices 1125 and 1130 may be smartphones, which facilitate execution of an application and/or presentation of a webpage for accessing the Internet and/or other functions. User devices 1125 and 1130 may be the same type of device, or optionally, may be different types of devices. In some instances, user devices 1125 and 1130 are configured with network interface cards to facilitate the connection to the access points of network 1105. For example, the network interface cards may be Ethernet cards (e.g., in the case of a wired connection to the access point) or wireless adapters (e.g., in the case of a wireless connection to the access point).

Although user devices 1125 and 1130 may be configured to directly connect to an access point of network 1105 (e.g., a Wi-Fi network) provided in the defined spatial area, at times, user devices 1125 and 1130 may not be located within range of the access point of network 1105, or access points of network 1105 may be saturated with connections to other user devices within the defined region. According to as aspect of the present application, user devices 1125 and 1130 may be configured to connect to network interaction system 1100 in order to transmit data to network 1105 by way of one or more supernodes. In some examples, user devices 1125 and 1130 may be configured to relay data packets transmitted over network interaction system 1100 to supernodes 1110-A through 1110-D. For example, user device 1125 may receive data packets or data streams from user device 1130. User device 1125 may then forward the received data packets or data streams to another user device or a supernode (e.g., supernode 1110-C using communication link 1140).

A user operating user device 1130 (e.g., User A 105) may execute an application stored on user device 1130 to connect to network interaction system 1100. The application can control one or more components (e.g., the network interface card, wireless adapter, etc.) of user device 1130 to facilitate the connection to network interaction system 1100. For example, when the user executes the application, the application controls the wireless adapter of user device 1130 to detect signals from surrounding user devices (e.g., user device 1125). Upon detecting signals from surrounding user devices, the wireless adapter facilitates the connection to network interaction system 1100 by establishing a short-range communication link with the surrounding user devices.

Once connected to network interaction system 1100, the user may transmit data packets to network 1105 via one or more user devices and/or one or more supernodes of network interaction system 1100 (e.g., over the mesh network of network interaction system 1100). For example, user device 1130 may wirelessly connect to surrounding user device 1125 over communication link 1135. Communication link 1135 may include a short-range communication channel, such as Bluetooth, Bluetooth Low Energy channel, Wi-Fi, Zigbee, etc. As such, the wireless adapter of user device 1130 may be configured to facilitate the establishment of communication link 1135. Communicating using short-range communication such as BLE channel can provide advantages such as consuming less power, being able to communicate across moderate distances, being able to detect levels of proximity, achieving high-level security based on encryption and short ranges, and not requiring pairing for inter-device communications.

User device 1130 may store one or more forwarding tables, which include information relating to available paths from user device 1130 to a supernode. For example, user device 1130 may store a forwarding table that indicates a path to supernode 1110-C via user device 1125. The one or more forwarding tables are periodically shared between user devices so as to update the forwarding tables when a particular user devices leaves the mesh network or a new user devices joins the mesh network.

In some instances, the forwarding tables can be constantly updated (e.g., every 1-2 seconds). For instance, each user device in the mesh network can continuously transmit a low bandwidth signal broadcasting the known nearby user devices. As a user device moves around the defined spatial area, the nearby user devices will change. The forwarding tables can be managed by a remote server so that the remote server can apply one or more algorithms to the forwarding table to constantly update the path to a supernode for a given user device.

In some instances, network interaction system 1100 (e.g., the mesh network) can facilitate the transmission of various types of data from user device to user device, user device to network 1105, or one or more remote or local servers to a user device. In some instances, the application that is being executed in each of the user devices within network interaction system 1100 can facilitate the transmission of data throughout the mesh network. Examples of data types can include text messages, video files, streaming video content, audio files, streaming audio content, images, documents, chat messages, data relating to a resource (e.g., an event) that is ongoing within the defined spatial area, and other suitable types of data. Network interaction system 1100 may implement tiering protocols (interchangeably referred to as tiered protocols) that can tier different types of data that are being transmitted through the mesh network. In some instances, the tiering protocols can be defined by an administrator and stored in one or more remote or local servers. For example, a tiering protocol can include data representing a decision tree, workflow, or a set of operations for routing data transmitted from the user devices. A plurality of tiering protocols can be defined and stored in a remote server (e.g., a cloud-based server).

In some instances, a hierarchy can exist within the plurality of tiering protocols. For example, the plurality of tiering protocols can include at least a first tiering protocol, a second tiering protocol, and a third tiering protocol. In this example, the first tiering protocol can correspond to a first type of data, the second tiering protocol can correspond to a second type of data, and the third tiering protocol can correspond to a third type of tiering protocol. As a non-limiting example, the first type of data can be text data (e.g., text of chat messages, etc.), the second type of data can be audio data, and the third type of data can be video data (e.g., streaming video). The first protocol can prioritize the first data type over the second and third data types within network interaction system 1100 so that the first data type reliably is transmitted through the mesh network (e.g., to network 1105). For example, the first protocol can include a set of operations that are configured to find all available communication mediums for transmitting the first type of data through the mesh network. In this example, the mesh network can reliably transmit the first type of data through the mesh network. The second protocol can prioritize the second data type below the first data type but above the third data type. Further, the third protocol can prioritize the third data type below the first and second data types.

Prioritizing data types over other data types can include biasing data transmissions of higher-prioritized data types over lower-prioritized data types. For example, nodes (e.g., user devices) of a mesh network can relay, forward, or transmit the first data type in all situations. However, if a node must decide which data type to forward first in time, the node can be configured to forward or relay data packets of the first data type first before forwarding data packets of the second data type. In some instances, this decision making performed by a node can be executed by the tiering protocols. For example, if a node has a decision of which data packets to forward first, the node can execute the first tiering protocol and the second tiering protocol. The first tiering protocol can determine that the data packets are of the first data type and will, therefore, be forwarded reliably first in time over other non-first-data types.

In addition, certain nodes can be automatically configured to forward specific data types. For example, a first node can be configured to transmit, forward, or relay the first data type only. A second node can be configured to transmit, forward, or relay the first data type and the second data type only. Although nodes can be configured to forward different data types, this configuration can be modified or updated dynamically by one or more remote servers. Further, in some instances, the path of nodes from a user device transmitting a first data type to a supernode can include nodes that are configured to forward at least the first data type. Similarly, the path of nodes from a user device transmitting a second data type to a supernode can include nodes that are configured to forward at least the second data type, and so on.

Figure 12:
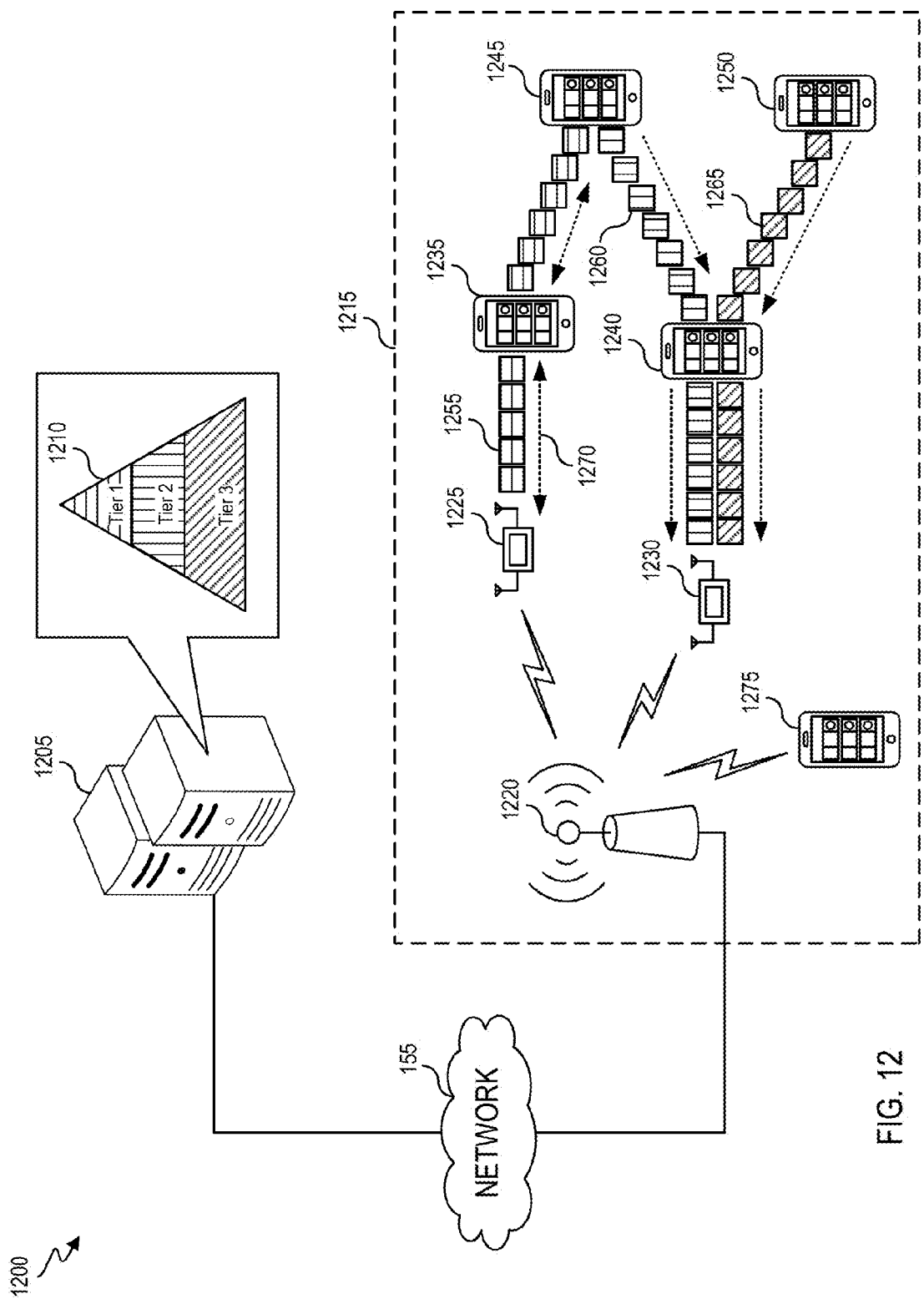
FIG. 12 is a block diagram illustrating a network interaction system according to another embodiment of the present disclosure.

FIG. 12 is a block diagram illustrating network interaction system 1200 according to another embodiment of the present disclosure. Network interaction system 1200 can include servers 1205, network 155, and defined spatial area 1215. A number of user devices and supernodes can be located within the defined spatial area at a given time. For example, at a given time, user devices 1235, 1240, 1245, 1250, and 1285 can be located within defined spatial area 1215. Further, at the given time, supernodes 1225 and 1230 can also be located within defined spatial area 1215. Since user devices can be portable, at any given time, defined spatial area 1215 can include any number of user devices.

Servers 1205 can include one or more servers connected to network 155. In some instances, the one or more servers can be distributed at different locations. In other instances, the one or more servers can be collated. It will be appreciated that some of the one or more servers can be distributed geographically, and some of the one or more servers can be collocated. Further, servers 1205 can be remote or local to defined spatial area 1215. In addition, servers can store a plurality of tiering protocols in data structure 1210. For example, an administrator or client device can access servers 1205 to define the plurality of tiering protocols. As a non-limiting example, data structure 1210 can store a first tiering protocol (corresponding to "Tier 1" of data structure 1210), a second tiering protocol (corresponding to "Tier 2" of data structure 1210), and a third tiering protocol (corresponding to "Tier 3" of data structure 1210). It will be appreciated that any number of tiering protocols can be stored in data structure 1210 of servers 1205. Discussed further herein, the plurality of tiering protocols can facilitate the tiered transmission of data through the mesh network established within defined spatial area 1215.

Defined spatial area 1215 can be any spatial area (e.g., venues, stadiums, lots, and so on). In some instances, users can visit defined spatial area 1215 to attend an event. When the users are located within defined spatial area 1215 during the event, there can be many user devices (corresponding to the users) also located within defined spatial area 1215. In the example illustrating in FIG. 12, at least user devices 1235, 1240, 1245, 1250, and 1285 can be located within defined spatial area 1215. To facilitate a network connection for the user devices, access point 1220 can also be located within defined spatial area 1215. It will be appreciated that any number of access points can be located within defined spatial area 1215. For example, access point 1220 can be a public Wi-Fi access point. However, as more user devices connect to access point 1220 for Internet access, over time, access point 1220 may become saturated. When saturated, the data throughput of access point 1220 can be drastically reduced, such that user devices no longer have a reliable connection to the Internet through access point 1220. Accordingly, a saturated public access point can cause significant connectivity issues for user devices.

To address a saturated access point, a mesh network can be established within defined spatial area 1215. For example, the mesh network within defined spatial area 1215 can be similar to the mesh network of network interaction system 1100 of FIG. 11. The mesh network can be comprised of user devices (e.g., nodes), supernodes, and access points. As illustrated in the example of FIG. 12, the mesh network can include supernodes 1225 and 1230, and user devices 1235, 1240, 1245, 1250, and 1285. In some instances, user devices (e.g., user device 1235) can transmit data to supernodes (e.g., supernode 1225) so that the supernode can forward the data to access point 1220, which is connected to network 155.

Further, transmission of data throughout the mesh network can be optimized using the plurality of tiering protocols stored in the servers 1205. In some instances, different types of data can use different tiering protocols to facilitate routing through the mesh network towards a supernode. For example, user device 1245 can transmit a first data stream 1255. The first data stream 1255 can include a first type of data. For example, the first type of data can include text data representing strings of characters representing human-readable text (e.g., in the English language). User device 1245 can also transmit a second data stream 1260. The second data stream 1260 can include a second type of data. For example, the second type of data can include audio data representing an audio file. User device 1250 can transmit a third data stream 1265. The third data stream 1265 can include a third type of data. For example, the third type of data can include video data representing a video file. Each data stream can include a continuous stream of data elements (e.g., data packets) representing content (e.g., text, music, or video).

In a first example, user device 1245 can receive user input from the user operating user device 1245. For example, the input can include first data (also referred to as first input data) that corresponds to the first data type. In this example, a user can type in letters on a keyboard displayed on user device 1245, and user device 1245 can generate first data that corresponds to the inputted letters. In some instances, the application being executed on user device 1245 can evaluate the first data and identify that the first data corresponds to the first data type. User device can access (or have previously accessed) the plurality of tiering protocols to determine to which tier of data the first data type corresponds. In this example, the application being executed on user device 1245 can determine that the first data corresponds to the first data type. Further, the user device 1245 can identify that the first tiering protocol corresponds to the first data type. The routing of data within the mesh network is configured to prioritize transmission of the first data type, such that the first data type is reliably transmitted over the mesh network.

In this case, user device 1245 has identified that the first tiering protocol is to apply when the first data type is being transmitted. The first tiering protocol can include operations of searching nearby nodes to identify which tiering protocol the nearby nodes are configured to support. In this example, the first tiering protocol can perform operations that identify a path of nodes to a supernode. However, the path of nodes to the supernodes can include nodes that are configured to support "Tier 1" (e.g., first data type) data transmissions. In this case, user device 1235, which is nearby, can support transmission of the first data type. Accordingly, the first tiering protocol can include operations that determine that the path to supernode 1225 includes a hop to user device 1235 and then a hop to supernode 1225. User device 1240 can also be evaluated to determine whether user device 1240 can support data transmissions of the first data type. However, in this example, user device 1240 is configured to support transmissions of the second data type and the third data type. In this case, the path to a supernode for the first data stream 1255 would not include user device 1240 because user device 1240 does not support transmission of the first data type.

In a second example, user device 1245 can also receive second data (also referred to as second input data). For example, the second input data can be received from the user operating user device 1245 (e.g., a typing of letters on a keyboard displayed on user device 1245 or a selection of a file). Further, second input data can be received and/or transmitted from user device 1245 at the same time or sequentially as the first input data. Similar to the first example, the application being executed on user device 1245 can determine that the second input data corresponds to a second data type (e.g., a selection of an audio file). Further, user device 1245 can identify that the second tiering protocol corresponds to the second data type. For example, user device 1245 can access a lookup table and query which tiering protocol corresponds to the second data type. As another example, user device 1245 can determine which data type corresponds to the input data by evaluating the input data. For example, user device 1245 can apply one or more rules to determine which type of data corresponds to the input data. In some instances, the one or more rules that determine which type of data corresponds to the input data (e.g., first data, second data, etc.) can include analyzing the input data using one or more defined parameters. A defined parameter can be a parameter or rule defined by a client or event provider associated with the resource. As a non-limiting example, a parameter can include a file extension of a file selected by a user operating the user device. For example, a defined parameter can include be used to classify the first data into a data type, and the analysis of the first data using the defined parameter can include identifying the data type of the first data. For example, a rule can include analyzing the file extension (e.g., parameter) of a file stored on user device 1245 (e.g., a user can click a file that the user wants to send over the mesh network). The routing of data within the mesh network is configured to prioritize transmission of the second data type below transmission of the first data type. Further, examples of parameters can include identifying the input at the user device (e.g., a tap, a swipe, a selection of a letter on a keyboard displayed on the user device, a selection of a button), an operation of a camera associated with the user device, an operation of a wearable user device (e.g., smartwatch) associated with the user device, and other suitable parameters.

In this case, user device 1245 has identified that the second tiering protocol is to apply when the second data type is being transmitted. The second tiering protocol can include operations of searching nearby nodes to identify which tiering protocol the nearby nodes are configured to support. In this example, the second tiering protocol can perform operations that identify a path of nodes to a supernode. However, the path of nodes to the supernodes can include nodes that are configured to support "Tier 2" (e.g., second data type) data transmissions. In this case, user device 1240, which is nearby user device 1245, can support transmission of the second data type. Accordingly, the second tiering protocol can include operations that determine that the path to supernode 1230 includes a hop to user device 1240 from user device 1245, and then a hop to supernode 1230. User device 1235 can also be evaluated to determine whether user device 1235 can support data transmissions of the second data type. However, in this example, user device 1235 is configured to support transmissions of the first data type only. In this case, the path to a supernode for the second data stream 1260 would not include user device 1235 because user device 1235 does not support transmission of the second data type.

In a third example, user device 1250 can receive third input data. For example, the third input data can be received from the user operating user device 1250 (e.g., a typing of letters on a keyboard displayed on user device 1250 or a selection of a file). Similar to the first and second examples, the application being executed on user device 1250 can determine that the third input data corresponds to a third data type (e.g., a selection of a video file). Further, user device 1250 can identify that the third tiering protocol corresponds to the third data type. For example, user device 1250 can access a lookup table and query which tiering protocol corresponds to the third data type. As another example, user device 1250 can determine which data type corresponds to the input data by evaluating the input data. For example, user device 1250 can apply one or more rules to determine which type of data corresponds to the input data. As a non-limiting example, a rule can include analyzing the file extension of a file stored on user device 1250 (e.g., a user can click a file that the user wants to send over the mesh network), or whether the input data includes identifiable text characters. The routing of data within the mesh network is configured to prioritize transmission of the third data type below transmissions of the first data type and the second data type.

In this case, user device 1250 has identified that the third tiering protocol is to apply when the third data type is being transmitted. The third tiering protocol can include operations of searching nearby nodes to identify which tiering protocol the nearby nodes are configured to support. In this example, the third tiering protocol can perform operations that identify a path of nodes to a supernode. However, the path of nodes to the supernodes can include nodes that are configured to support "Tier 3" (e.g., third data type) data transmissions. In this case, user device 1240, which is nearby user device 1250, can support transmission of the second data type and the third data type. Accordingly, the third tiering protocol can include operations that determine that the path to supernode 1230 includes a hop to user device 1240 from user device 1250, and then a hop to supernode 1230. User device 1245, which is also nearby user device 1250, can also be evaluated to determine whether user device 1245 can support data transmissions of the third data type. However, in this example, user device 1245 is too far away from any supernodes. In this case, the path to a supernode for the third data stream 1265 would not include user device 1245 because user device 1245 is not near any supernodes, and thus, it would be inefficient to route the third data type through user device 1245.

It will be appreciated that user devices can also connect directly to access points (e.g., access point 1220) instead of or in addition to being connected to the mesh network. For example, user device 1275 can connect directly to access point 1220. It will also be appreciated that data can be bilaterally communicated through mesh network. For instance, while user device 1235 can transmit the first data stream 1255 to supernode 1225 over communication link 1270 for transmission to the Internet, supernode 1225 can also transmit data to user device 1235 over communication link 1270. As a non-limiting example, information relating to the event associated with defined spatial area 1215 can be transmitted to user devices (e.g., updated score of a game, etc.) using the mesh network. It will also be appreciated that the present disclosure is not limited to the first, second, and third examples described above. Other examples are possible.

Figure 13:
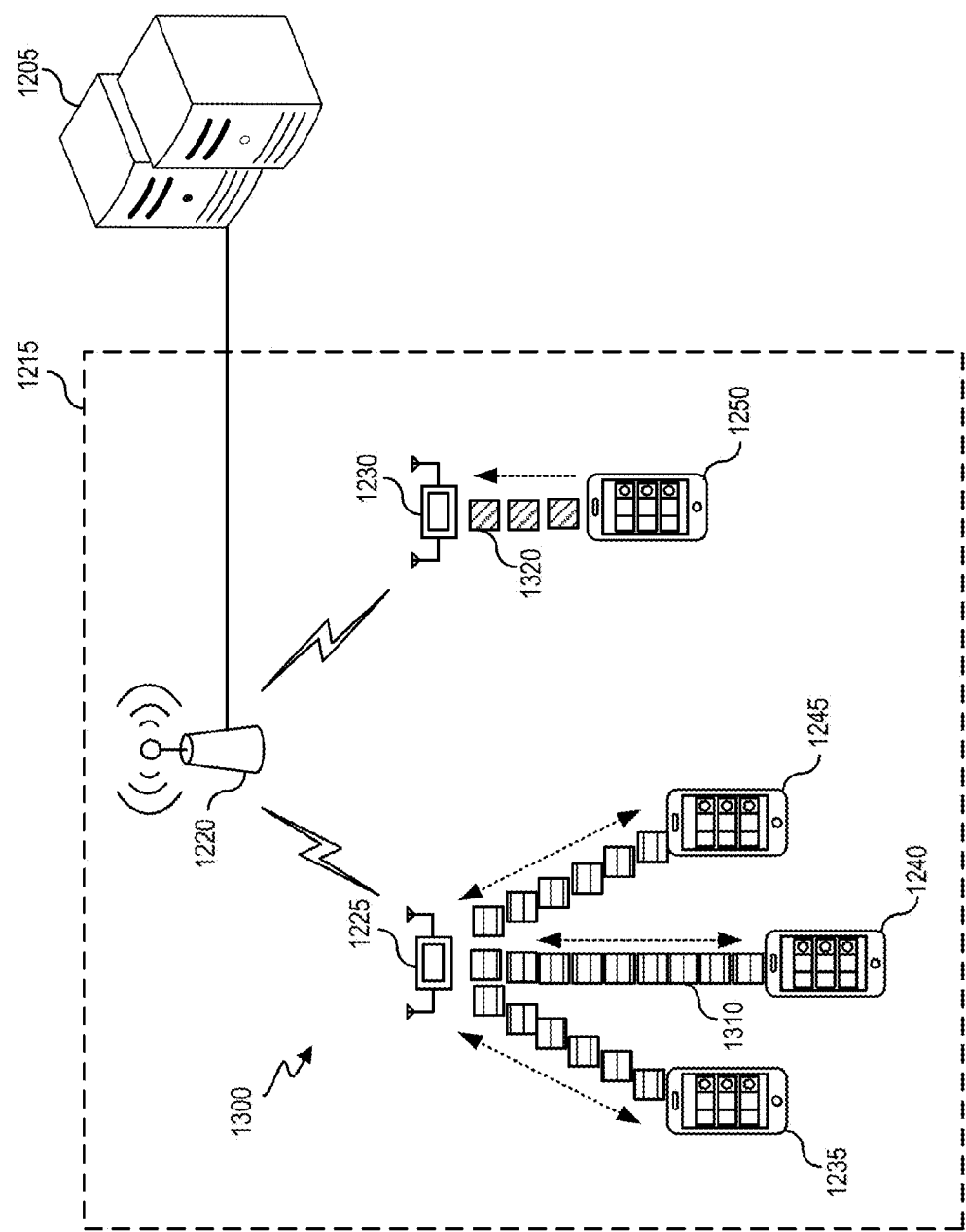
FIG. 13 is a block diagram illustrating a network interaction system according to yet another embodiment of the present disclosure.

FIG. 13 is a block diagram illustrating network interaction system 1300 according to yet another embodiment of the present disclosure. Network interaction system 1300 can include servers 1205, network 155, and defined spatial area 1215. A number of user devices and supernodes can be located within defined spatial area 1215 at a given time. For example, at a given time, user devices 1235, 1240, 1245, 1250, and 1275 can be located within defined spatial area 1215. Further, at the given time, supernodes 1225 and 1230 can also be located within defined spatial area 1215. Since user devices can be portable, at any given time, defined spatial area 1215 can include any number of user devices connected in any configuration. As illustrated in the example of FIG. 13, network interaction system 1300 illustrates the connectivity of devices at a time that is different from network interaction system 1200.

Network interaction system 1300 includes supernodes 1225 and 1230. At a given time, user devices 1235, 1240, and 1245 can be wirelessly connected to supernode 1225. Further, user device 1250 can be connected to supernode 1230. In the example of FIG. 13, user devices 1235, 1240, and 1245 can be transmitting data streams 1310 of a first data type to supernode 1225. User devices 1235, 1240, and 1245 can also be receiving data streams 1310 of a first data type. For example, data streams 1310 can include text data representing chat communications between users within defined spatial area 1215. While FIG. 13 illustrates that supernode 1225 is wirelessly connected to user devices 1235, 1240, and 1245, supernode 1225 can be connected to a large number of user devices (not shown). In this example, supernode 1225 can be experiencing a significant processing burden. For example, the bandwidth usage of supernode 1225 can be at a very high percentage (e.g., 85%, 90%, etc.). In this case, even though supernode 1225 is receiving or transmitting data streams 1310 of a first data type (which is prioritized and reliably transmitted in network interaction system 1300), supernode 1225 may be reaching bandwidth capacity.

In another area of defined spatial area 1215, user device 1250 can be connected to supernode 1230. In this example, user device 1250 can be transmitting data stream 1320 of a third data type to supernode 1230. For example, data stream 1320 can include live video feed captured at a camera of user device 1250. In this example, the user operating user device 1250 may seek to post the live stream video of an event associated with defined spatial area 1215. User device 1250 can identify that data stream 1320 is associated with the third tiering protocol that is stored in servers 1205. In some instances, the third data type may be prioritized below the first data type and the second data type because the third data type may be known to overload networks (e.g., video files or streaming). For example, the third tiering protocol can include data that represents limits on the rate of data transfer (e.g., upload or download rate in megabits per second (Mbps)). In this example, the third tiering protocol may be limiting the data transfer rate of data stream 1320 because data stream 1320 includes data of a third data type.

In some instances, if supernode 1230 is using a small percentage of bandwidth capacity because only user device 1250 is connected to supernode 1230 and because the third tiering protocol is limiting the data transfer rate of data stream 1320, servers 1205 can dynamically modify the third tiering protocol for user device 1250 to improve throughput of data stream 1320. For instance, servers 1205 can identify a network characteristic of each supernode in defined spatial area 1215. Examples of a network characteristic include a network bandwidth, a network bandwidth capacity, hardware specifications of a device, and other suitable network characteristics. Further, servers 1205 can identify which data types of tiering protocols are currently being implemented on each supernode. For example, servers 1205 can identify supernode 1230, the network bandwidth capacity of supernode 1230, and that supernode 1230 is receiving data of a third data type (or that a third tiering protocol is being implemented at supernode 1230). In this example, servers 1205 can compare the identified network bandwidth capacity of supernode 1230 with a threshold value (e.g., 10%, 25%, 50%, 75%, and the like). Further, servers 1205 can compare the identified type of data being received at supernode 1230 against a list of data types. In some instances, if the identified network bandwidth capacity is below the threshold (e.g., below 25%) and/or if the identified data type is low-prioritized data type (e.g., third data type, fourth data type, and so on), then servers 1205 can dynamically modify the third tiering protocol for user device 1250 so that data stream 1320 can be reliably transferred to the Internet via supernode 1230. For example, modifying the third tiering protocol for user device 1250 can include increasing the limit on data transfer (e.g., from 0.5 Mbps to 2 Mbps), or modifying the communication channel type to a communication channel with a higher data transfer rate (e.g., from a Bluetooth channel to a Wi-Fi channel). Depending on the situation, this modification of the third tiering protocol can be temporary (e.g., until the data stream 1320 has stopped being transmitted, or until the network bandwidth capacity of supernode increases above the threshold, etc.) or permanent.

Advantageously, servers 1205 can dynamically modify tiering protocols to improve network throughput or to improve user experience. For instance, user device 1250 may experience very slow data transfer rates when transmitting data stream 1320, but servers 1205 can dynamically improve the data transfer rates when user device 1250 is connected to a supernode that has the capacity for higher data transfer rates (e.g., when the network bandwidth usage is low).

Figure 14:
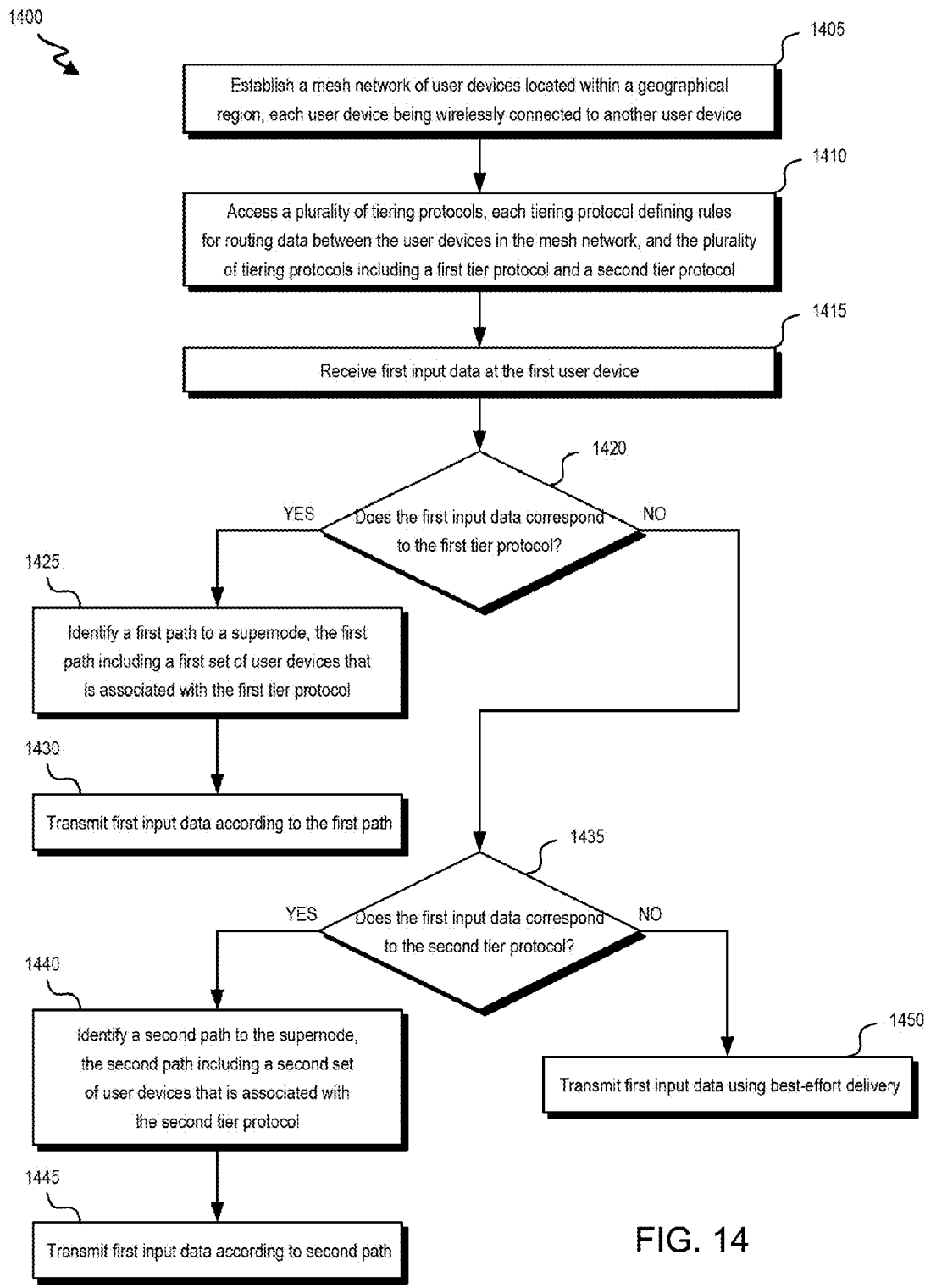
FIG. 14 is a flowchart illustrating an embodiment of a process for data tiering in a mesh network according to an embodiment of the present disclosure.

FIG. 14 is a flowchart illustrating an embodiment of process 1400 for data tiering in a mesh network according to an embodiment of the present disclosure. Process 1400 can be performed entirely or in part by any of a user device (e.g., user device 1235) or an access management system (which can include servers 1205). Further, process 1400 can facilitate data transmission over a mesh network. For example, execution of process 1400 can facilitate the tiering of data in the mesh network, such that certain data types are prioritized over others and reliably transmitted over the mesh network.

Process 1400 begins at block 1405 where a mesh network is established within a defined spatial area (e.g., a venue, stadium, or other geographical region). In some instances, the mesh network can include user devices (e.g., nodes), supernodes, and one or more access points to a network. User devices can be wirelessly connected to other user devices or supernodes, thereby establishing the mesh network.

At block 1410, a plurality of tiering protocols can be accessed. For example, the plurality of tiering protocols can be stored in one or more servers. The plurality of tiering protocols can be defined by an administrator, for example, using a client device to access the one or more servers. A tiering protocol can include data representing a workflow, decision tree, or set of operations for tiering data transmitted over the mesh network. For example, the plurality of tiering protocols can include at least a first protocol and a second protocol. The first protocol can define the transmission prioritizations of a first data type when it is transmitted over the mesh network.

At block 1415, a user device can receive first input data. For example, a user can type in a message on a keyboard of the user device, and an application that is being executed on the user device can determine that the input data (e.g., inputted text) corresponds to a first data type (e.g., text data). In some instances, the input data can be a selection of an audio or video file. In these instances, the input data can be the selected audio or video file. Examples of input data can include a selection of a button displayed on the user device, a selection of an access right indicated on the display of the user device, a selection of a feature available on the application being executed on the user device, and other suitable input data.

At block 1420, the access management system (or the application being executed on the user device) can determine whether the input data corresponds to the first tiering protocol. In some instances, the application can determine the type of data inputted at the user device by using one or more algorithms or analysis techniques (e.g., text recognition). In the example of the input data being a selection of a file (e.g., selection of an audio file), the application can identify an extension of a file name of the selected file.

If the first input data corresponds to the first tiering protocol (e.g., "YES" out of block 1420), then process 1400 proceeds to block 1425. At block 1425, a first path to a supernode can be identified. In some instances, the first path to a supernode can include a first set of user devices. The first set of user devices (e.g., nodes) can include one or more user devices. In other instances, the path may be a direct connection from the user device to a supernode. Each user device in the first set of user devices can be associated with the first tiering protocol. For instance, the first set of user devices can correspond to the path from the user device to the supernode. At block 1430, the first input data can be transmitted to the supernode in accordance with the first path. Transmitting the first input data in accordance with the first path can include routing the first input data through each of the user devices or supernodes in the first path. When the first input data is received at a device (e.g., either a user device or a supernode) included in the first path, the receiving device can forward or relay the device onward to the next device in the first path. For example, the first path can include data representing a list of devices which create a path to a supernode.

Referring again to block 1420, if the first input data does not correspond to the first tiering protocol (e.g., "NO" out of block 1420), then process 1400 proceeds to block 1435. At block 1435, the access management system (or the application being executed on the user device) can determine whether the first input data corresponds to the second tiering protocol. If the first input data corresponds to the second tiering protocol, then process 1400 proceeds to block 1440 (e.g., "YES" out of block 1435). At block 1440, a second path to the supernode may be identified. In some instances, the second path may be to the same supernode as in block 1425. In other instances, the second path may be to a different supernode as in block 1425. The second path can include a second set of devices (e.g., user devices or supernodes). Each of the devices in the second path may be associated with the second tiering protocol. For example, if the second path to supernode A includes user device A and user device B, user devices A and B can be selected such that these devices support the second tiering protocol.

It will be appreciated that the first set of devices and the second set of devices can include some or all of the same user devices or supernodes. For example, the first set of devices and second set of devices can have any amount of overlap in user devices. The first set of devices and the second set of devices can be completely different from each other. Further, as an example, the first set of devices or the second set of devices can include only one device (e.g., a user device or a supernode). In this example, the first user device can be one hop away from a supernode, and as such, the path to the supernode would simply include the supernode itself. It will be appreciated that the first path and the second path can include data identifying the devices in the paths. For example, the first path can include MAC addresses or phone numbers of the devices included in the first path. Other identifying information can be included in the first path, such as a unique identifier assigned to the user devices (e.g., by the application being executed on the user device). At block 1445, the first input data can be transmitted to a supernode in accordance with the second path. Transmitting the first input data in accordance with the second path can include routing the first input data through each of the user devices or supernodes included in the second path. When the first input data is received at a device (e.g., either a user device or a supernode) included in the second path, the receiving device can forward or relay the device onward to the next device in the second path. For example, the second path can include data representing a list of devices which create a path to a supernode.

It will also be appreciated that if a device included in the first path or second path is no longer available (e.g., out of short-range communication), the first path device or the second path device that is one hop away from the out-of-range next first path device or next second path device can re-determine a path to a supernode. For example, if the first path includes a first user device, second user device, and third device before a supernode, and if the third user device has become unavailable, the second user device can re-determine a path to the supernode. In some instances, the second user device can query the one or more servers 1205 (or another remote server) for instructions on determining a new path to the supernode. Every transmission received at a user device or supernode is responded to with an acknowledgment message. A user device can determine whether the next device in the path has not received the transmission by assessing whether or not an acknowledgment message has been received from the next device in the path within a defined time period.

Referring again to block 1435, if the first input data does not correspond to the second tiering protocol (e.g., "NO" out of block 1435), then process 1400 proceeds to block 1450 where the first input data is transmitted using best-effort delivery. In some instances, the first input data can be transmitted using any non-guaranteed transmission technique. In other instances, an attempt to transmit the first input data can be made using a cellular Internet connection of the user device, if available. It will be appreciated that any number decision branches (e.g., blocks 1420 and 1435) can be included in process 1400. For instance, if process 1400 proceeds to "NO" out of block 1435, process 1400 can then proceed to another decision branch to determine whether the first input data corresponds to a third tiering protocol, and so on. After all of the tiering protocols have been evaluated using decision branches, then process 1400 can proceed to best-effort delivery or the user devices cellular connection (e.g., 3G, 4G, etc.).

It will be appreciated that the selection of the tiering protocol can determine the characteristics of the transmission of the first input data over the mesh network. For example, each tiering protocol of the plurality of tiering protocols can correspond to one or more characteristics of transmitting data over the mesh network. For example, a first tiering protocol can correspond to a first set of characteristics, a second tiering protocol can correspond to a second set of characteristics, and so on. Examples of characteristics of data transmission can include a path the first input data takes to get from a user device to a supernode (e.g., a path can include network devices that relay the first input data along towards the supernode), a communication link used to transmit the first input data along the path towards the supernode, the data transfer rate of the first input data to the next device in the path, and other suitable characteristics of data transmissions over mesh networks.

Figure 15:
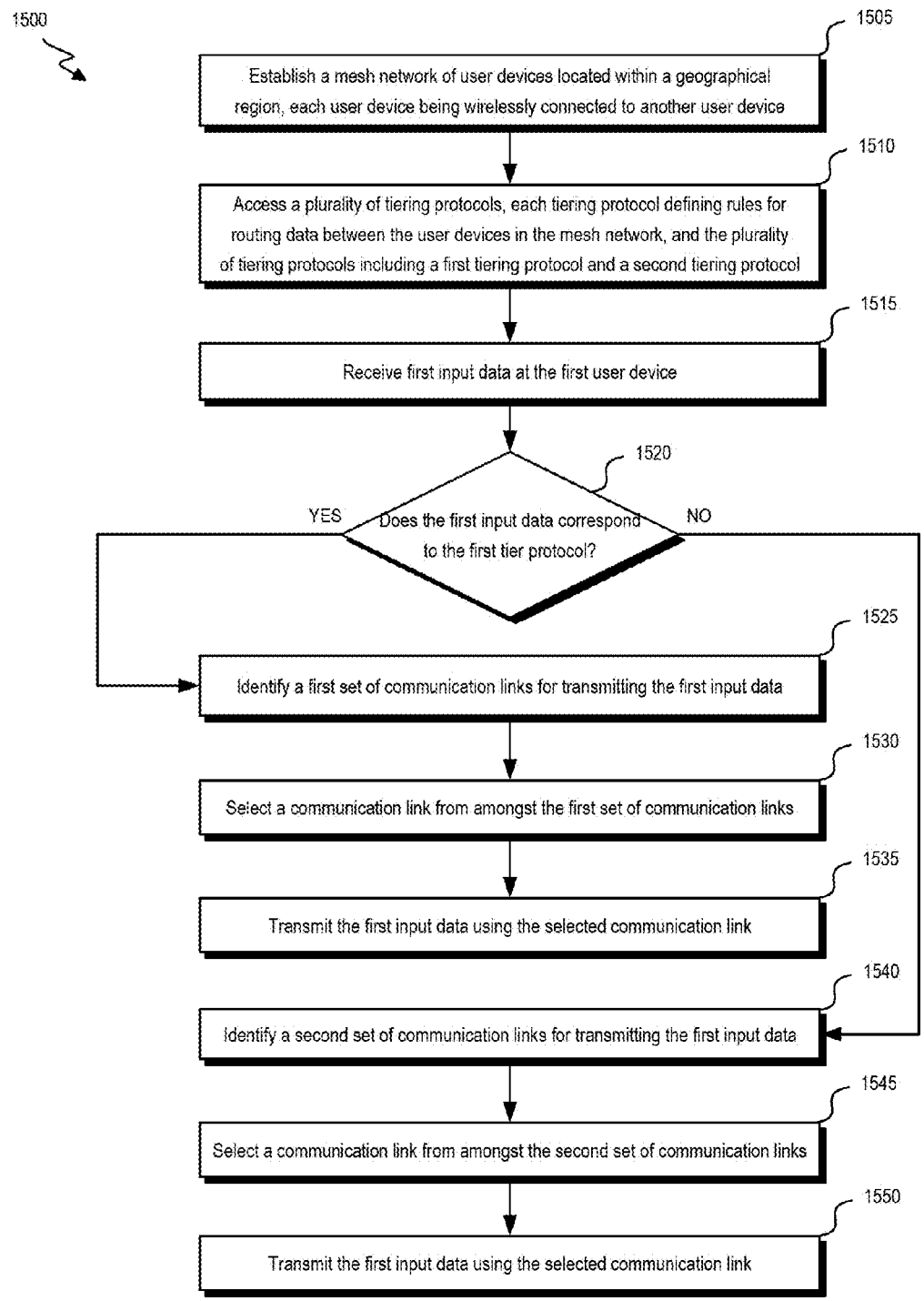
FIG. 15 is a flowchart illustrating an embodiment of a process for selectively restricting communication types based on data tier according to an embodiment of the present disclosure.

FIG. 15 is a flowchart illustrating an embodiment of process 1500 for selectively restricting communication types based on data tier according to an embodiment of the present disclosure. Process 1500 can be performed entirely or in part by any of a user device (e.g., user device 1235) or an access management system (which can include servers 1205). Process 1500 can dynamically select communication links for transmitting data in accordance with tiering protocols. Process 1500 begins at block 1505 where a mesh network of user devices and supernodes is established within a geographical region. For instance the geographical region can be a defined spatial area (e.g., defined spatial area 1215), such as an event space, stadium, or venue. Each user device and supernode in the mesh network can be configured to wirelessly communicate with other user devices or supernodes, thereby establishing the mesh network.

At block 1510, a plurality of tiering protocols can be accessed. For example, the plurality of tiering protocols can be stored in one or more servers. The plurality of tiering protocols can be defined by an administrator, for example, using a client device to access the one or more servers. A tiering protocol can include data representing a workflow, decision tree, or set of operations for tiering data transmitted over the mesh network. For example, the plurality of tiering protocols can include at least a first protocol and a second protocol. The first protocol can define the transmission prioritizations of a first data type when it is transmitted over the mesh network.

At block 1515, a user device can receive first input data. For example, a user can type in a message on a keyboard of the user device, and an application that is being executed on the user device can determine that the input data (e.g., inputted text) corresponds to a first data type (e.g., text data). In some instances, the input data can be a selection of an audio or video file. In these instances, the input data can be the selected audio or video file. Examples of input data can include a selection of a button displayed on the user device, a selection of an access right indicated on the display of the user device, a selection of a feature available on the application being executed on the user device, and other suitable input data.

At block 1520, whether the first input data corresponds to the first tier protocol can be determined. In some instances, the determination in block 1520 can be performed at the one or more servers 1205 (e.g., as part of the access management system), or can be performed at the user device. Block 1520 can be a decision branch. If the first input data corresponds to the first tiering protocol, the process 1500 proceeds to block 1525 where a first set of communication links for transmitting the first input data is identified. In some instances, when the first input data corresponds to the first tiering protocol, the transmission of the first input data is prioritized, such that the first input data is reliably transmitted over the mesh network. In this case, when the first input data is prioritized (e.g., the first input data corresponds to the first tiering protocol), then the user device that originally transmits the first input data can use any communication link available so that the first data can be reliably transmitted over the mesh network. For example, user device A can transmit a video clip of a replay (e.g., for a sporting event) in accordance with the first tiering protocol (e.g., the most prioritized tiering protocol). In this example, user device A can identify that Wi-Fi, Bluetooth, and Zigbee communication channels are available to wirelessly communicate with other user devices or supernodes. Thus, the first set of communication links in this example would be the Wi-Fi channel, Bluetooth channel, and Zigbee channel.

As another example, user device A can transmit a live video feed to the user's social media account. The live video feed can require a large bandwidth, and thus, to avoid overloading the mesh network, the live video feed can be associated with a third tiering protocol (e.g., having a low priority in the mesh network). In this example, while user device A can identify that Wi-Fi, Bluetooth, and Zigbee communication channels are available, the third tiering protocol can include data restricting the transmission of live video feeds to certain communication channels. Thus, in this example, the live video feed can be restricted to Bluetooth or Zigbee communication links to other user devices or supernodes. Accordingly, the Wi-Fi channels can remain available for data streams of a first data type. In some instances, various data types can correspond to different priority levels. For example, a first priority can correspond to a first data type and can have the highest priority of the different priority levels. Further, a second priority can correspond to a second data type and can have a priority that is lower than the highest priority of the first priority level. It will be appreciated that any number of priority levels can be defined. In some instances, the tiering protocols can also correspond to the different priority levels. For example, the first priority level can correspond to a first tiering protocol. In this example, the first tiering protocol can implement data transmissions over the mesh network, such that the data transmissions have the highest priority. Examples of having a higher priority can include a larger set of available communication links for transmitting data over the mesh network, a shorter path of nodes (e.g., user devices) to a supernode can be determined, and the like.

At block 1530, a communication link from the first set of communication links can be selected, and at block 1535, the first input data can be transmitted over the mesh network using the selected communication link. The first set of communication links can include all available communication links (e.g., a first set of available communication links). In some instances, the communication link can be automatically and dynamically selected so that the best data rate is experienced during the transfer of the data stream. In some instances, the communication link can be selected based on a determination of which communication links are currently not being used by nearby user devices or supernodes.

Referring again to block 1520, if the first input data does not correspond to the first tiering protocol (e.g., "NO" out of block 1520), then process 1500 may proceed to block 1540, where a second set of communication links for transmission of the first input data can be identified. Similar to the example described above, each data tiering protocol can be associated with a set of communication links for transmitting data over the mesh network. The second set of communication links can correspond to a tiering protocol other than the first tiering protocol. In some instances, the second set of communication links can include some or all of the communication links in the first set of communication links. In these instances, the set of communication links available for data transmission can correspond to the type of data being transmitted. If text data, chat messages, and short video clips (e.g., replays) are determined to be important (e.g., associated with the first tiering protocol), then the set of communication channels that can transmit the text data, chat messages, and short video clips can be larger than other data transmissions that are determined to be less prioritized or to impose a high-demand on the bandwidth of the mesh network (e.g., live video streaming). At block 1545, a communication link can be selected from amongst the second set of communication links. At block 1550, the first input data can be transmitted over the mesh network using the selected communication link.

Figure 16:
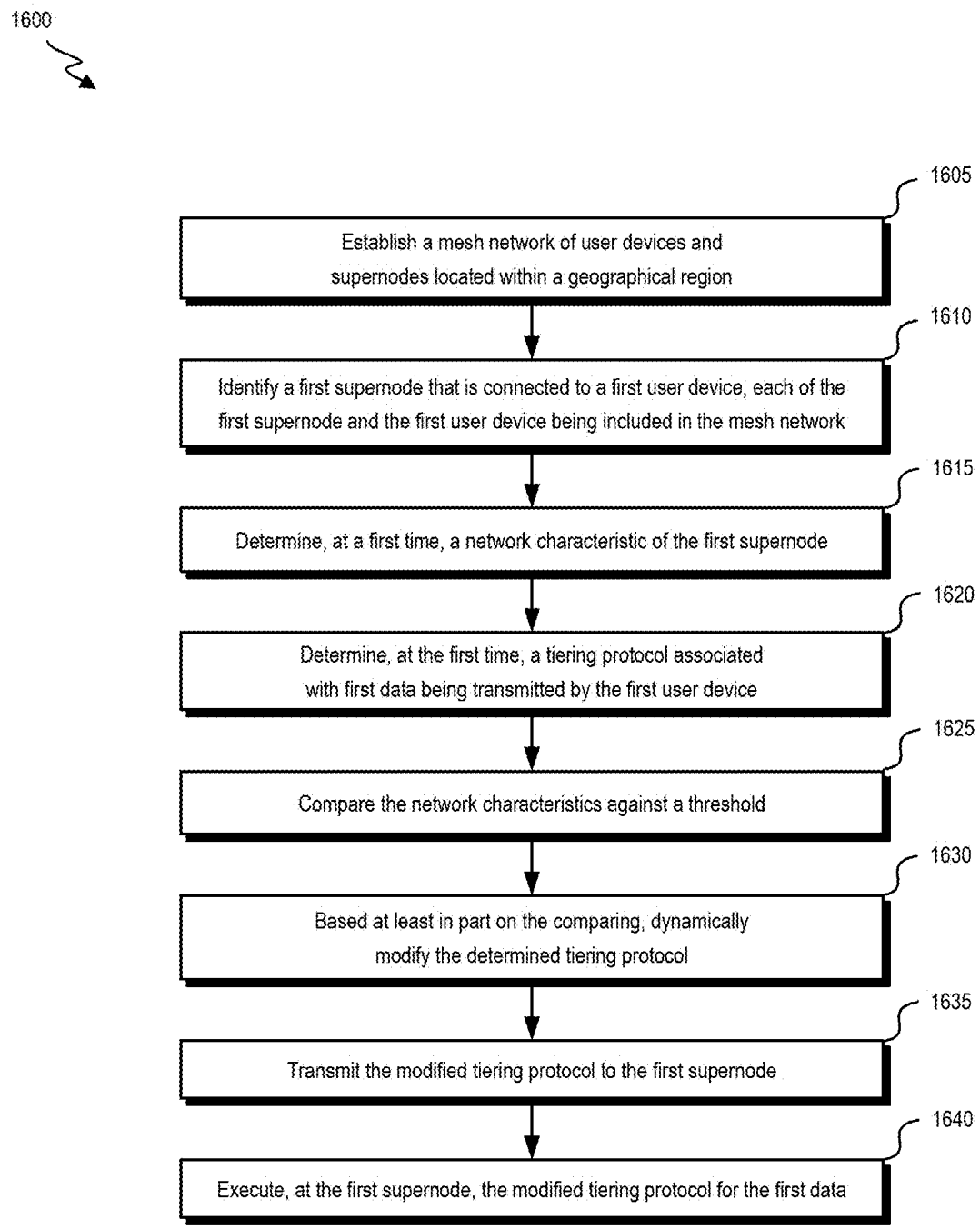
FIG. 16 is a flowchart illustrating an embodiment of a process for dynamically modifying tiering protocols to facilitate improved throughput according to an embodiment of the present disclosure.

FIG. 16 is a flowchart illustrating an embodiment of process 1600 for dynamically modifying tiering protocols according to an embodiment of the present disclosure. Process 1600 can be performed entirely or in part by any of a user device (e.g., user device 1235) or an access management system (which can include servers 1205). Further, process 1600 can be performed to facilitate improved throughput over a mesh network of user devices and supernodes. For example, if a user device is transmitting data in accordance with a low-prioritized tiering protocol, and if the supernode receiving the data from the user device has a low network bandwidth capacity usage at a given time, the low-prioritized tiering protocol can be modified to improve the throughput of the data transfer to more effectively use the supernodes network bandwidth capacity.

Process 1600 begins at block 1605 where a mesh network of user devices and supernodes is established within a geographical region. For instance the geographical region can be a defined spatial area (e.g., defined spatial area 1215), such as an event space, stadium, or venue. Each user device and supernode in the mesh network can be configured to wirelessly communicate with other user devices or supernodes, thereby establishing the mesh network.

At block 1610, a first supernode that is connected to a first user device can be identified. Each of the first supernode and the first user device can be included in the mesh network. In some instances, the one or more servers 1205 can continuously monitor characteristics (e.g., network characteristics, hardware specifications, and so on) of the various devices in the mesh network (e.g., user devices, supernodes, access points, and so on).

At block 1615, as part of the monitoring of the supernodes, a network characteristic of the first supernode can be determined at a first time. For example, the first time can correspond to a current time or any previous time. Examples of a network characteristic include a network bandwidth, a network bandwidth capacity, hardware specifications of a device, and other suitable network characteristics. Further, as part of the monitoring of supernodes, a tiering protocol associated with first data being transmitted by the first user device can be determined at block 1620. For example, the one or more servers 1205 can determine that the first supernode is communicating with the first user device to transfer a data stream of a live video feed captured at a camera of the first user device. In this example, the one or more servers 1205 can identify that the data stream of the live video feed is associated with a low-prioritized tiering protocol so as to prevent high processing loads on the mesh network.

At block 1625, the determined network characteristic of block 1615 can be compared against a threshold value. For example, if the network characteristic of the first supernode is a network bandwidth usage, the identified network bandwidth usage (e.g., currently at 27%) can be compared against a threshold (e.g., 15%, 25%, 50%, and so on). At block 1630, based at least in part on the comparing of block 1625, the tiering protocol determined at block 1620 can be dynamically modified. In some instances, if the identified network bandwidth usage is below the threshold (e.g., network bandwidth usage of 27% and a threshold of 50%), then the tiering protocol can be dynamically modified to more efficiently use the processing resources of the first supernode. Advantageously, the dynamic modification of the tiering protocol can improve the throughput of the data transfer from the first user device to the first supernode.

In some instances, modifying tiering protocol determined at block 1620 can include increasing a limit on the data transfer rate (e.g., from 0.5 Mbps to 2 Mbps), or modifying the communication channel type to a communication channel with a higher data transfer rate (e.g., from a Bluetooth channel to a Wi-Fi channel). Depending on the situation, this modification of the third tiering protocol can be temporary (e.g., until the data stream has stopped being transmitted, or until the network bandwidth capacity of supernode increases above the threshold, etc.) or permanent.

At block 1635, the modified tiering protocol can be transmitted to the first supernode, and at block 1640, the modified tiering protocol can be executed at the first supernode. It will be appreciated that the modified tiering protocol can also be transmitted to the first user device and executed at the first user device. In some instances, when either the first supernode or the first user devices executes the modified tiering protocol, the data transfer rate can be increased (e.g., from 0.5 Mbps to 2 Mbps) or the communication link can be changed to another (e.g., from a Bluetooth communication link to a Wi-Fi communication link), which may correspond to a higher data transfer rate. The modifications to the tiering protocol can be temporary or permanent.

Figure 17:
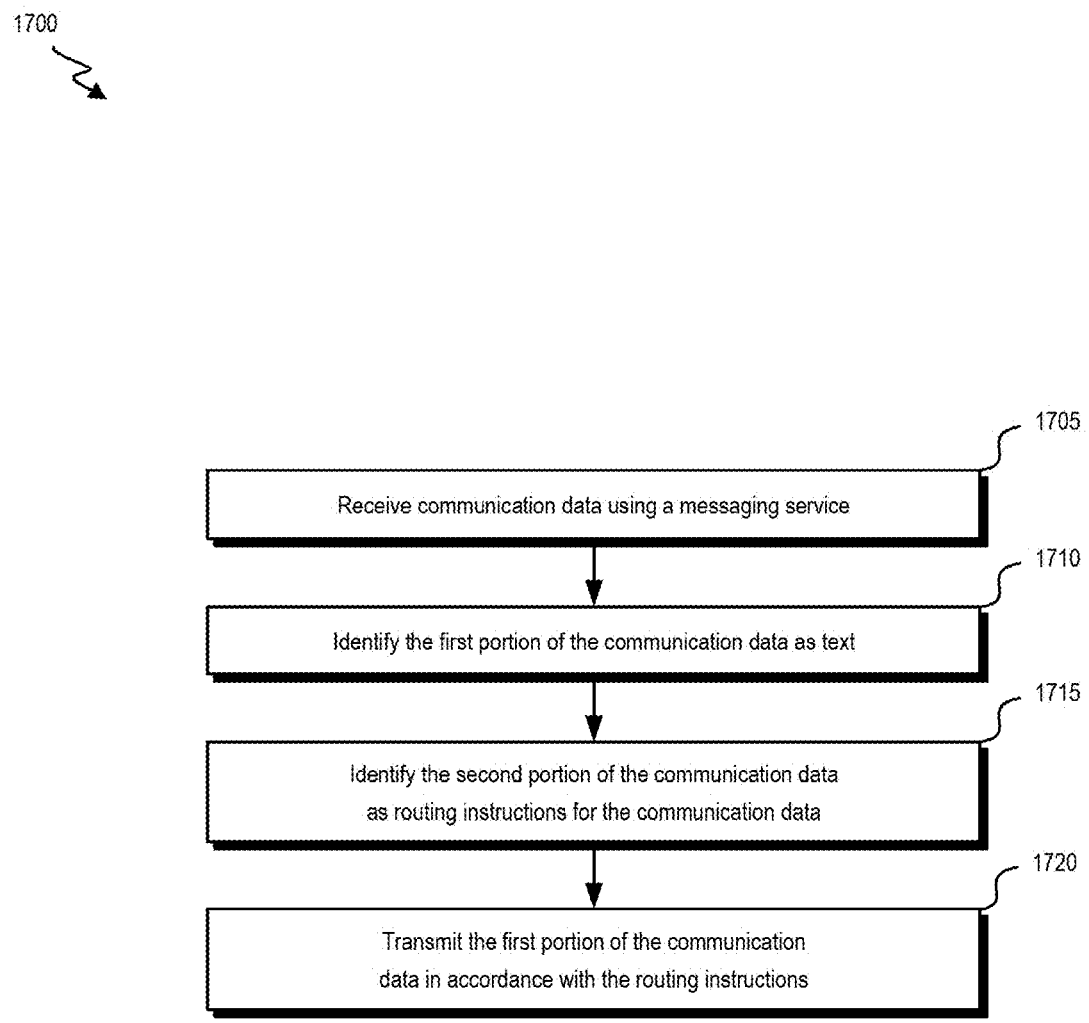
FIG. 17 is a flowchart illustrating an embodiment of a process for text-channel routing in a mesh network according to an embodiment of the present disclosure.

FIG. 17 is a flowchart illustrating an embodiment of process 1700 for text-channel routing in a mesh network according to an embodiment of the present disclosure. Process 1700 can be performed entirely or in part by any of a user device (e.g., user device 1235) or an access management system (which can include servers 1205). Further, process 1700 can be executed to reliably facilitate data transmission over a mesh network using a messaging service.

Process 1700 begins at block 1705 where a supernode receives communication data using a messaging service. In some instances, the one or more servers 1205 can transmit communication data to the supernodes within a defined spatial area. For example, the one or more servers 1205 can transmit to one or more user devices the updated scores for an event occurring within the defined spatial area. In another example, a video clip (e.g., a replay of a scene during the event) can be transmitted to one or more user devices connected to the mesh network.

In some instances, the communication data can correspond to data having a high priority, such that the tiering protocols are configured to reliably transmit the communication data over the mesh network. Further, in these examples, the communication data may include the updated scores or the video clip. In some instances, the communication data can include a first portion and a second portion. For example, the first portion can correspond to human-readable code (e.g., letters in the English language), and the second portion can correspond to machine-readable code (e.g., a routing path, a multicast instruction, a broadcast instruction, and so on). In some instances, the communication data can include a string of data, of which a first portion is human-readable code (e.g., an updated score "3-2") and a second portion is machine-readable code (e.g., instructions to broadcast or multicast the first portion).

At block 1710, when the communication data is received at the supernode, the communication data can be analyzed. For example, analyzing the communication data can include identifying the first portion of the communication data as text data that is human readable. For example, the supernode can read the string of data that is the communication data and extract the first portion of the communication data as the text data. In this example, the communication data can include an identifiable string of code that corresponds to the end of the first portion and the beginning of the second portion (e.g., hexadecimal code of 16 zeros). At block 1715, the second portion of the communication data can be identified as the routing instructions for the first portion. Examples of the routing instructions can include a routing path of user devices to reach to a particular user device or a particular group of user devices, an instruction to multicast the first portion (e.g., the text data) to a group of user devices located in a particular area of the defined spatial area, an instruction to broadcast the first portion to all user devices over the mesh network, instruction to transmit the first portion to user devices having addresses (e.g., MAC addresses) within a certain range or connected to a particular access point, and other suitable routing instructions.

At block 1720, the first portion (e.g., the text data) of the communication data can be transmitted to one or more user devices within the mesh network in accordance with the routing instructions of the second portion of the communication data. For example, if the routing instructions are to multicast the text data to a group of user devices (e.g., user devices located within a region of a defined spatial area), then the supernode can transmit the first portion to the group of user devices. In this example, the supernode can identify a path of devices to reach each of the user devices in the group of user devices, and then transmit the text data along the identified path of devices.

Figure 18:
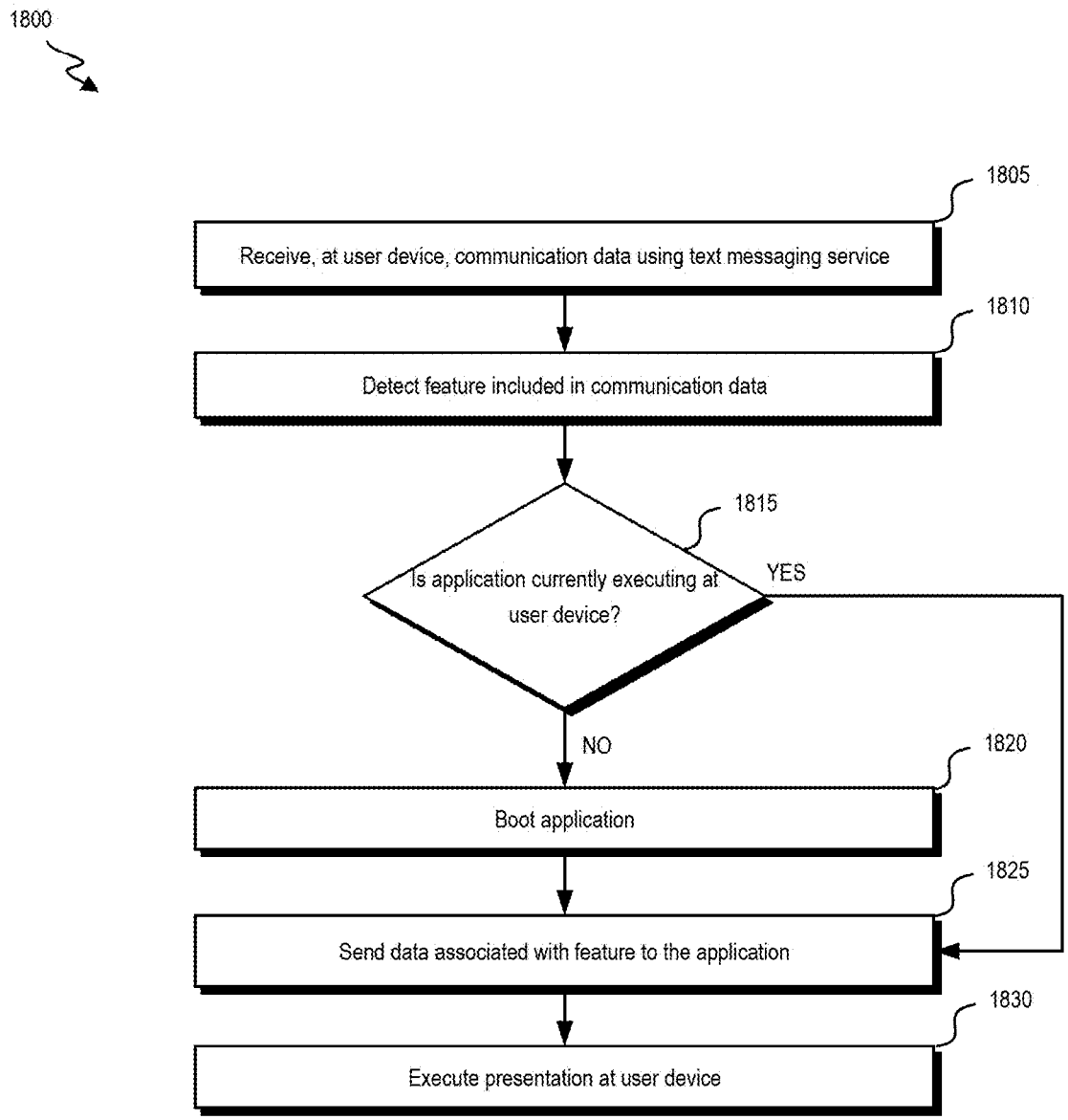
FIG. 18 is a flowchart illustrating an embodiment of a process for text-channel processing according to an embodiment of the present disclosure.

FIG. 18 is a flowchart illustrating an embodiment of process 1800 for processing text messages received at user devices. Process 1800 can be performed entirely or in part by any of a user device (e.g., user device 1235) or an access management system (which can include servers 1205). Further, process 1800 can be performed to reliably transmit data to a plurality of user devices located within a defined spatial area. Process 1800 begins at block 1805 where communication data is received at a user device using a text messaging service. For example, a plurality of user devices can be located within a defined spatial area. The defined spatial location can be associated with a resource (e.g., an event). Each of the user devices located within the defined spatial area can be associated with an access right that grants access to the defined spatial area associated with the resource.

Some (e.g., a group of user devices) or all of the user devices located within the defined spatial area can receive the communication data as one or more text messages. For example, the access management system (using servers 1205) can transmit the communication data to a messaging service (e.g., short messaging service (SMS)), and the messaging service can transmit the communication data to some or all of the user devices as a text message (e.g., SMS message, MMS message, etc.). The text message including the communication data can be received at the user devices located within the defined spatial area. In some instances, the access management system can generate the communication data so as to be specific for a user device of the plurality of user devices. For example, the communication data can include data specific to the user device that will receive the text message that includes the communication data. In other instances, the access management system can generate the communication data so that the communication data is the same for all of the user devices that receive the text message.

In some instances, the communication data can include data corresponding to the resource. For example, the communication data can include current data associated with an aspect of the resource (e.g., the communication data can include the current scores for one or more sporting events). In addition, the communication data can include a detectable feature associated with an application being executed on a user device. For example, a portion of the communication data can include a specific code that can be extracted, read, and processed by a user device. In this example, when the user device receives the text message that includes the communication data, the user device can detect the feature included in the communication data of the text message, and process the communication data using the application and not the standard text messaging application stored on the user device.

At block 1810, the user device can detect the feature included in the communication data of the text message. In some instances, upon receiving the text message, the user device can read the data of the text message. For example, if the text message corresponds to a data string, the user device can read the data string to determine whether the data string includes any detectable code. In this example, the user device can read the data string and detect the feature included in the communication data. Detecting the feature can include reading a specific code that corresponds to the feature, and identifying that the specific code has been detected. In some instances, detecting the feature can be performed at the user device by one or more processors, which can process the text message using process 1800 when the text message is received. For instance, when a user device receives text messages that do not include the feature (e.g., text messages from other user devices), the user device can process the text message using a text message application stored on the user device. However, when the user devices receives a text message that includes the feature, the user device can process the text message using process 1800. For example, when the user device detects the feature at block 1810, process 1800 can proceed to block 1815.

At block 1815, the user device can determine whether an application associated with the feature is currently executing on the user device. In some instances, detecting the feature can prompt execution of one or more operations. For example, the one or more operations can include detecting whether the application associated with the feature is currently being executed on the user device. Detecting whether the application associated with the feature is currently executing on the user device can include analyzing a list of all applications that are currently running on the user device to determine whether the list of applications includes the specific application associated with the feature. As another example, upon detecting the feature in the data string of the received text message, one or more processors of the user device can execute operations to search for .APK files stored on the user device to identify whether one of the .APK files corresponds to the specific application associated with the detected feature. In this example, if an .APK file is found, the one or more processors of the user device can identify the status of the .APK filed (e.g., currently executing, not currently executing, idle, and other suitable statuses). It will be appreciated that other techniques may be used for detecting whether a specific application is currently executing (e.g., currently running) on the user device. It will also be appreciated that file types other than a .APK file can correspond to an executable file of an application stored on the user device.

If it is determined that the application associated with the detected feature is stored on the user device, but is not currently executing (e.g., corresponding to "NO" out of block 1815), then process 1800 may proceed to block 1820 where the application can be booted. For example, if the one or more processors of the user device detects that the application associated with the detected feature is stored on the user device (e.g., the user device stores an executable .APK file corresponding to the application), and it is determined that the application is not currently executing, then the one or more processors of the user device can execute the executable .APK file. In some instances, after the one or more processors determines that the application associated with the feature is stored on the user device, the one or more processors can identify whether the application is using any processing resources. For example, the one or more processors of the user device can determine a percentage of processor usage for the application (e.g., 10% usage of the processing resources, CPU usage, and the like). If the percentage of processor usage associated with the application is below a threshold value (e.g., 5% of total processor resources), the one or more processors of the user device can determine that the application is not currently executing on the user device. Further, if the percentage of processor usage associated with the application is equal to or above the threshold value, the one or more processors of the user device can determine that the application is currently executing (e.g., running) on the user device.

If it is determined that the application associated with the detected feature is currently executing on the user device (e.g., corresponding to "YES" out of block 1815), then process 1800 may proceed to block 1825 where data associated with the feature can be sent to the application for processing. In some instances, sending data associated with the feature to the application can include transmitting the data associated with the feature to the one or more processors of the user device to be processed by the application. In other instances, sending data associated with the feature to the application can include storing the communication data that includes the feature in a data structure of the user device. For example, upon detecting the feature in the communication data and determining that the application associated with the feature is currently executing on the user device, the one or more processors of the user device can store the communication data in a storage device (e.g., a data structure stored in a storage area) of the user device. The application can retrieve the data associated with the feature from the data structure.

In some instances, the data associated with the feature can include the communication data received as a text message. The data associated with the feature can include one or more data packets that comprise the communication data. For example, if servers 1205 transmitted current information about the resource (e.g., current scores of a sporting event) to the user device using one or more text messages communicated over a text messaging channel, the one or more text messages received at the user device can be stored as the data associated with the feature. In some instances, the data associated with the feature can include a portion or segment of the communication data. For example, the communication data received at the user device can include at least a first portion and a second portion of data. The first portion can correspond to a first segment of the communication data and the second portion can correspond to a second segment of the communication data. In this example, the first portion of the communication data can correspond to updated information about the resource (e.g., current scores for an event), and the second portion of the communication data can correspond to instruction data.

For example, instruction data can indicate instructions for how the user device is to process the first portion of data. A non-limiting example of instruction data can include instructions to present an illustration on the user device using data in the first portion of the communication data. In this example, the first portion of the communication data can include updated information associated with the resource (e.g., current scores), and the second portion of the communication data can include instructions for presenting an illustration that includes the updated information of the first portion (e.g., a dashboard that includes the updated scores). In some instances, the first portion of data can include web data (e.g., a link to a webpage, a partial link to a webpage, an extension of a webpage), and the second portion of the data can include instructions for accessing the webpage that corresponds to the web data. For example, the instructions included in the second portion of the communication data can include instructions to paste the link included in the first portion of communication data into a web browser and access the webpage associated with the link. It will be appreciated that the webpage can be accessed through the application or through an independent web browser stored on the user device.

At block 1830, a presentation can be executed at the user device. In some instances, executing a presentation at the user device can include displaying an illustration on the user device. Examples of illustrations can include images, dashboards, logos, and other suitable presentations. The illustration can incorporate the data included in the first portion of the communication data. For example, the first portion of the communication data can include updated information associated with the resource (e.g., a current score for an event), and the second portion of the communication data can include instructions indicating that the updated information is to be displayed as an illustration on the user device (e.g., as a dashboard on a page of the application displayed on the user device). In this example, the illustration can incorporate the updated information (e.g., the updated scores can be included in the illustration).

In some instances, executing a presentation on the user device can include displaying a webpage. For example, the first portion of the communication data can include a link to a webpage associated with the resource, and the second portion of the communication data can include instructions for accessing the webpage. In some instances, the second portion can include data representing instructions to access the webpage included in the first portion using the application or using a third-party browser application. The webpage can be automatically loaded either through the application or through a third-party browser application.

In some instances, executing a presentation can include displaying an interactive or non-interactive video at the user device. For example, the first portion of the communication data can include updated information associated with the resource (e.g., a team that is currently winning), and the second portion of the communication data can include data representing instructions for presenting the updated information as an interactive or non-interactive video at the user device.

It will be appreciated that the first portion and the second portion of the communication data can refer to segments of the data string that comprises the communication data. For example, the first portion can correspond to the first 132 bits of the communication data, and the second portion can correspond to the second 132 bits of the communication data. It will also be appreciated that the communication data can include any number of portions, and in any order (e.g., the second portion can correspond to the first 132 bits of the communication data). Further, the communication data can include a plurality of data fields that include the first portion and second portion of the communication data.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method for selecting tiered protocols based on data transmitted over mesh networks within venues during events, comprising:

broadcasting, at a first user device, a network initiation request that facilitates establishment of a mesh network within a venue;

in response to the broadcasting, receiving a first acknowledgment message from a first network device and a second acknowledgment message from a second network device, the first acknowledgment message indicating that the first network device is located within a defined proximity from the first user device, and the second acknowledgment message indicating that the second network device is located within the defined proximity from the first user device;

establishing a first communication link between the first user device and the first network device;

establishing a second communication link between the first user device and the second network device, the first user device being configured to relay data transmissions over the mesh network using each of the first communication link and the second communication link;

accessing a plurality of tiered protocols, each tiered protocol of the plurality of tiered protocols defining one or more characteristics for transmitting generated data over the mesh network;

generating first data using a user input received at the first user device, the first data being generated during an event within the venue;

analyzing the first data to determine one or more defined parameters of the first data, each defined parameter of the one or more defined parameters including an attribute of the first data that defines a data type of the first data;

classifying the first data using the determined one or more parameters of the first data;

selecting a tiered protocol from amongst the plurality of tiered protocols, the selection of the tiered protocol being based on a result of classifying the first data, and the selected tiered protocol corresponding to the identified data type of the first data;

in response to selecting the tiered protocol, determining the one or more characteristics associated with the selected tiered protocol;

identifying a supernode from amongst a plurality of supernodes located within the defined spatial area;

determining that the supernode is a destination device for the first data;

determining a path between the first user device and the supernode, the path including one or more network devices, and each network device of the one or more network devices being associated with the selected tiered protocol;

generating path data that includes an identifier for each network device of the one or more network devices included in the path; and transmitting the first data over the mesh network, the transmission of the first data being in accordance with the determined one or more characteristics and the path data.

2. The computer-implemented method for selecting tiering protocols based on data transmitted over mesh networks within defined spatial areas, as recited in claim 1, wherein each of the first and second network devices is a user device or a supernode, the supernode corresponding to an Internet-facing proxy server that is connected to the Internet.

3. The computer-implemented method for selecting tiering protocols based on data transmitted over mesh networks within defined spatial areas, as recited in claim 1, wherein determining the one or more characteristics comprises:

identifying a set of available communication links for transmitting the first data over the mesh network; and selecting an available communication link from amongst the set of available communication links, the selection of the available communication link being based on the selected tiered protocol.

4. The computer-implemented method for selecting tiering protocols based on data transmitted over mesh networks within defined spatial areas, as recited in claim 1, wherein the selected tiered protocol corresponds to a set of operations for identifying a path to a supernode and for selecting a communication link from amongst a set of communication links.

5. The computer-implemented method for selecting tiering protocols based on data transmitted over mesh networks within defined spatial areas, as recited in claim 1, wherein analyzing the first data using one or more defined parameters comprises:

evaluating an attribute of the first data using the one or more defined parameters, the one or more defined parameters being used to classify the data type associated with the first data.

6. The computer-implemented method for selecting tiering protocols based on data transmitted over mesh networks within defined spatial areas, as recited in claim 1, wherein:

the plurality of tiered protocols includes a first tiered protocol and a second tiered protocol, the first tiered protocol includes a first set of operations for identifying a first path of one or more network devices to a supernode of the mesh network, the first path having a first priority, and the second tiered protocol includes a second set of operations for identifying a second path of the one or more network devices to the supernode, the second path having a second priority, and the first priority being higher than the second priority.

7. A system for selecting tiering protocols based on data transmitted over mesh networks within defined spatial areas, comprising:

one or more data processors; and a non-transitory computer-readable storage medium containing instructions which, when executed on the one or more data processors, cause the one or more data processors to perform operations including:

broadcasting, at a first user device, a network initiation request that facilitates establishment of a mesh network within a venue;

in response to the broadcasting, receiving a first acknowledgment message from a first network device and a second acknowledgment message from a second network device, the first acknowledgment message indicating that the first network device is located within a defined proximity from the first user device, and the second acknowledgment message indicating that the second network device is located within the defined proximity from the first user device;

establishing a first communication link between the first user device and the first network device;

establishing a second communication link between the first user device and the second network device, the first user device being configured to relay data transmissions over the mesh network using each of the first communication link and the second communication link;

accessing a plurality of tiered protocols, each tiered protocol of the plurality of tiered protocols defining one or more characteristics for transmitting generated data over the mesh network;

generating first data using a user input received at the first user device, the first data being generated during an event within the venue;

analyzing the first data to determine one or more defined parameters of the first data, each defined parameter of the one or more defined parameters including an attribute of the first data that defines a data type of the first data;

classifying the first data using the determined one or more parameters of the first data;

selecting a tiered protocol from amongst the plurality of tiered protocols, the selection of the tiered protocol being based on a result of classifying the first data, and the selected tiered protocol corresponding to the identified data type of the first data;

in response to selecting the tiered protocol, determining the one or more characteristics associated with the selected tiered protocol;

identifying a supernode from amongst a plurality of supernodes located within the defined spatial area;

determining that the supernode is a destination device for the first data;

determining a path between the first user device and the supernode, the path including one or more network devices, and each network device of the one or more network devices being associated with the selected tiered protocol;

generating path data that includes an identifier for each network device of the one or more network devices included in the path; and transmitting the first data over the mesh network, the transmission of the first data being in accordance with the determined one or more characteristics and the path data.

8. The system for selecting tiering protocols based on data transmitted over mesh networks within defined spatial areas, as recited in claim 7, wherein each of the first and second network devices is a user device or a supernode, the supernode corresponding to an Internet-facing proxy server that is connected to the Internet.

9. The system for selecting tiering protocols based on data transmitted over mesh networks within defined spatial areas, as recited in claim 7, wherein determining the one or more characteristics comprises:
identifying a set of available communication links for transmitting the first data over the mesh network; and
selecting an available communication link from amongst the set of available communication links, the selection of the available communication link being based on the selected tiered protocol.

10. The system for selecting tiering protocols based on data transmitted over mesh networks within defined spatial areas, as recited in claim 7, wherein the selected tiered protocol corresponds to a set of operations for identifying a path to a supernode and for selecting a communication link from amongst a set of communication links.

11. The system for selecting tiering protocols based on data transmitted over mesh networks within defined spatial areas, as recited in claim 7, wherein analyzing the first data using one or more defined parameters comprises:
evaluating an attribute of the first data using the one or more defined parameters, the one or more defined parameters being used to classify the data type associated with the first data.

12. The system for selecting tiering protocols based on data transmitted over mesh networks within defined spatial areas, as recited in claim 7, wherein:
the plurality of tiered protocols includes a first tiered protocol and a second tiered protocol,
the first tiered protocol includes a first set of operations for identifying a first path of one or more network devices to a supernode of the mesh network, the first path having a first priority, and
the second tiered protocol includes a second set of operations for identifying a second path of the one or more network devices to the supernode, the second path having a second priority, and the first priority being higher than the second priority.

13. A computer-program product tangibly embodied in a non-transitory machine-readable storage medium, including instructions configured to cause a data processing apparatus to perform operations including:
broadcasting, at a first user device, a network initiation request that facilitates establishment of a mesh network within a venue;
in response to the broadcasting, receiving a first acknowledgment message from a first network device and a second acknowledgment message from a second network device, the first acknowledgment message indicating that the first network device is located within a defined proximity from the first user device, and the second acknowledgment message indicating that the second network device is located within the defined proximity from the first user device;
establishing a first communication link between the first user device and the first network device;
establishing a second communication link between the first user device and the second network device, the first user device being configured to relay data transmissions over the mesh network using each of the first communication link and the second communication link;
accessing a plurality of tiered protocols, each tiered protocol of the plurality of tiered protocols defining one or more characteristics for transmitting generated data over the mesh network;
generating first data using a user input received at the first user device, the first data being generated during an event within the venue;
analyzing the first data to determine one or more defined parameters of the first data, each defined parameter of the one or more defined parameters including an attribute of the first data that defines a data type of the first data;
classifying the first data using the determined one or more parameters of the first data;
selecting a tiered protocol from amongst the plurality of tiered protocols, the selection of the tiered protocol being based on a result of classifying the first data, and the selected tiered protocol corresponding to the identified data type of the first data;
in response to selecting the tiered protocol, determining the one or more characteristics associated with the selected tiered protocol;
identifying a supernode from amongst a plurality of supernodes located within the defined spatial area;
determining that the supernode is a destination device for the first data;
determining a path between the first user device and the supernode, the path including one or more network devices, and each network device of the one or more network devices being associated with the selected tiered protocol;
generating path data that includes an identifier for each network device of the one or more network devices included in the path; and
transmitting the first data over the mesh network, the transmission of the first data being in accordance with the determined one or more characteristics and the path data.

14. The computer-program product, as recited in claim 13, wherein each of the first and second network devices is a user device or a supernode, the supernode corresponding to an Internet-facing proxy server that is connected to the Internet.

15. The computer-program product, as recited in claim 13, wherein determining the one or more characteristics comprises:
identifying a set of available communication links for transmitting the first data over the mesh network; and
selecting an available communication link from amongst the set of available communication links, the selection of the available communication link being based on the selected tiered protocol.

16. The computer-program product, as recited in claim 13, wherein the selected tiered protocol corresponds to a set of operations for identifying a path to a supernode and for selecting a communication link from amongst a set of communication links.

17. The computer-program product, as recited in claim 13, wherein analyzing the first data using one or more defined parameters comprises:

evaluating an attribute of the first data using the one or more defined parameters, the one or more defined parameters being used to classify the data type associated with the first data.

* * * * *